US012652113B2

(12) United States Patent (10) Patent No.: US 12,652,113 B2
MolavianJazi et al. (45) Date of Patent: Jun. 9, 2026

(54) RADIO FREQUENCY EXPOSURE MITIGATION

(71) Applicant: Samsung Electronics Co., Ltd., Suwon-si (KR)

(72) Inventors: Ebrahim MolavianJazi, San Jose, CA (US); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1065 days.

(21) Appl. No.: 17/662,957

(22) Filed: May 11, 2022

(65) Prior Publication Data

US 2022/0385381 A1 Dec. 1, 2022

Related U.S. Application Data

(60) Provisional application No. 63/191,881, filed on May 21, 2021.

(51) Int. Cl.
| | |
|---|---|
| *H04B 17/327* | (2015.01) |
| *H04L 1/18* | (2023.01) |
| *H04W 72/23* | (2023.01) |
| *H04W 72/54* | (2023.01) |
| *H04W 74/0833* | (2024.01) |
| *H04W 74/0836* | (2024.01) |
| *H04W 74/0838* | (2024.01) |

(52) U.S. Cl.
CPC ............. *H04B 17/327* (2015.01); *H04L 1/18* (2013.01); *H04W 72/23* (2023.01); *H04W*

*72/54* (2023.01); *H04W 74/0833* (2013.01); *H04W 74/0836* (2024.01); *H04W 74/0838* (2024.01)

(58) Field of Classification Search
CPC .... H04B 17/327; H04W 72/23; H04W 72/54; H04W 74/0833; H04L 1/18
See application file for complete search history.

(56) References Cited

U.S. PATENT DOCUMENTS

| | | | |
|---|---|---|---|
| 2021/0051707 A1* | 2/2021 | Rastegardoost | .......... H04L 5/10 |
| 2021/0058971 A1 | 2/2021 | MolavianJazi et al. | |

FOREIGN PATENT DOCUMENTS

WO WO-2018063326 A1 * 4/2018 .............. H04W 4/70

OTHER PUBLICATIONS

Extended European Search Report issued Feb. 13, 2025 regarding Application No. 22805043.1, 12 pages.

(Continued)

*Primary Examiner* — Siming Liu

(57) ABSTRACT

Methods and apparatuses for radio frequency exposure mitigation. A method for a user equipment (UE) to transmit a first channel includes receiving first information for a first downlink reference signal (DL RS) and a set of numbers of repetitions. The method further includes determining a first reference signal received power (RSRP) value for the first DL RS, a first spatial filter corresponding to the first DL RS, a first exposure value for the first spatial filter, and a first number of repetitions from the set of numbers of repetitions based on the first RSRP value and the first exposure value. The method further includes transmitting the first channel with the first number of repetitions using the first spatial filter.

20 Claims, 11 Drawing Sheets

(56)    References Cited

OTHER PUBLICATIONS

International Search Report and Written Opinion issued Aug. 31, 2022 regarding International Application No. PCT/KR2022/007303, 8 pages.
Nokia et al., "Enhancements for Multi-TRP URLLC schemes", 3GPP TSG RAN WG1 #105-e Meeting, R1-2105274, May 2021, 19 pages.
Qualcomm Incorporated, "Type-A PUSCH repetition for Msg3", 3GPP TSG RAN WG1 #105e, R1-2104689, May 2021, 6 pages.
Vivo, "Further discussion on multi beam enhancement", 3GPP TSG RAN WG1 #104-e, R1-2100421, Jan. 2021, 29 pages.
Apple Inc., "On Beam Management Enhancement", 3GPP TSG-RAN WG1 Meeting #105-e, R1-2105087, May 2021, 23 pages.
"5G; NR; Physical channels and modulation (3GPP TS 38.211 version 16.5.0, Release 16)", ETSI TS 138 211 V16.5.0, Apr. 2021, 138 pgs.
"5G; NR; Multiplexing and channel coding (3GPP TS 38.212 version 16.5.0 Release 16)", ETSI TS 138 212 V16.5.0, Apr. 2021, 155 pages.
"5G; NR; Physical layer procedures for control (3GPP TS 38.213 version 16.5.0 Release 16)", ETSI TS 138 213 V16.5.0, Apr. 2021, 188 pages.
"5G; NR; Physical layer procedures for data (3GPP TS 38.214 version 16.5.0 Release 16)", ETSI TS 138 214 V16.5.0, Apr. 2021, 173 pages.
"5G; NR; Medium Access Control (MAC) protocol specification (3GPP TS 38.321 version 16.4.0 Release 16)", ETSI TS 138 321 V16.4.0, Apr. 2021, 159 pages.
"5G; NR; Radio Resource Control (RRC); Protocol specification (3GPP TS 38.331 version 16.4.1 Release 16)", ETSI TS 138 331 V16.4.1, Apr. 2021, 932 pages.
"5G; NR; NR and NG-RAN Overall description; Stage-2 (3GPP TS 38.300 version 16.5.0 Release 16)", ETSI TS 138 300 V16.5.0, Apr. 2021, 153 pages.
"5G; NR; User Equipment (UE) radio transmission and reception; Part 1: Range 1 Standalone (3GPP TS 38.101-1 version 16.7.0 Release 16)", ETSI TS 138 101-1 V16.7.0, May 2021, 452 pages.
"5G; NR; User Equipment (UE) radio transmission and reception; Part 2: Range 2 Standalone (3GPP TS 38.101-2 version 16.7.0 Release 16)", ETSI TS 138 101-2 V16.7.0, Apr. 2021, 184 pages.
"5G; NR; User Equipment (UE) radio transmission and reception; Part 3: Range 1 and Range 2 Interworking operation with other radios (3GPP TS 38.101-3 version 16.7.0 Release 16)", ETSI TS 138 101-3 V16.7.0, Apr. 2021, 532 pages.
"5G; NR; Requirements for support of radio resource management (3GPP TS 38.133 version 16.7.0 Release 16)", ETSI TS 138 133 V16.7.0, Jun. 2021, 2196 pages.

* cited by examiner

600

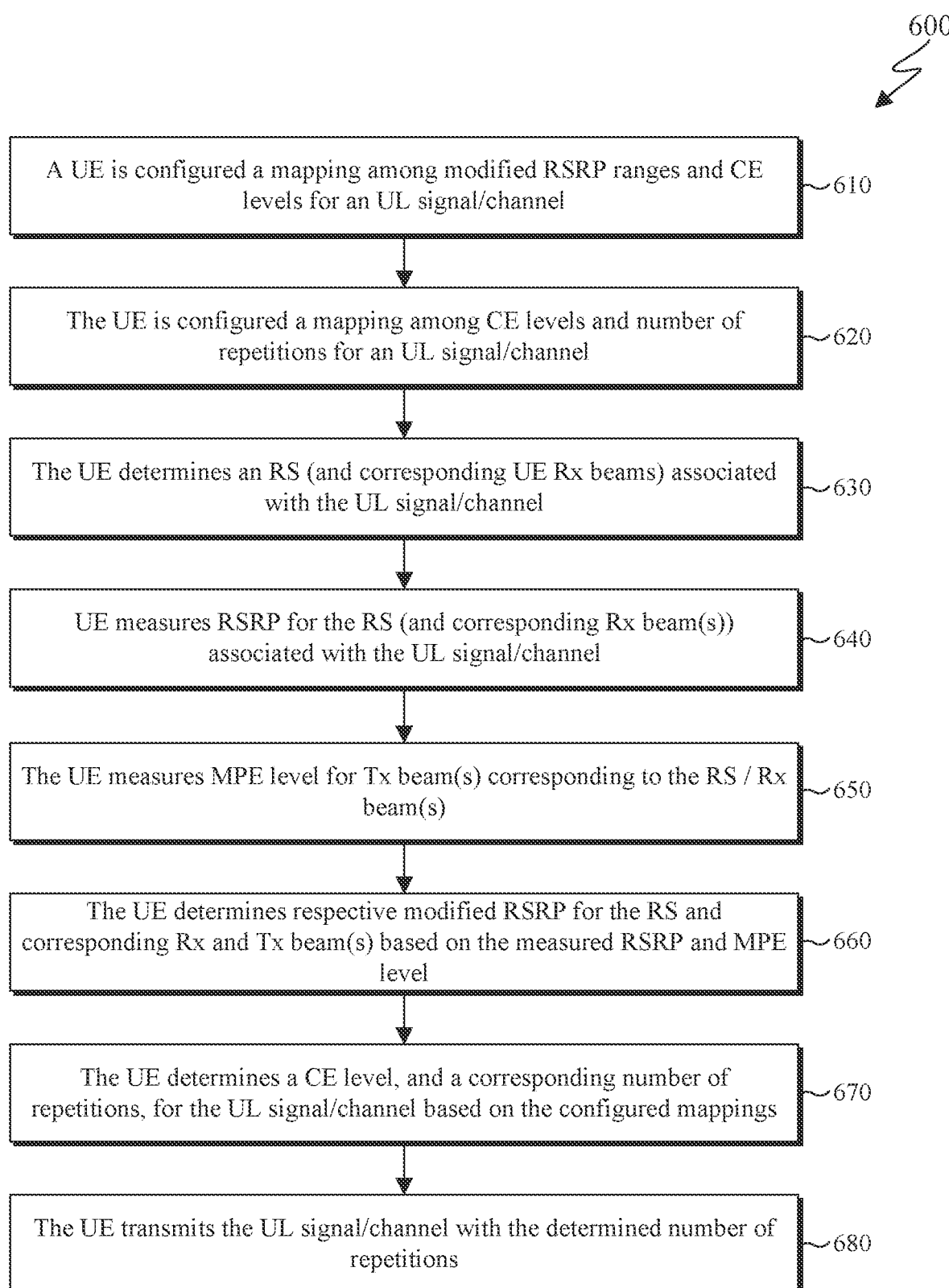

A UE is configured a mapping among modified RSRP ranges and CE levels for an UL signal/channel ～610

The UE is configured a mapping among CE levels and number of repetitions for an UL signal/channel ～620

The UE determines an RS (and corresponding UE Rx beams) associated with the UL signal/channel ～630

UE measures RSRP for the RS (and corresponding Rx beam(s)) associated with the UL signal/channel ～640

The UE measures MPE level for Tx beam(s) corresponding to the RS / Rx beam(s) ～650

The UE determines respective modified RSRP for the RS and corresponding Rx and Tx beam(s) based on the measured RSRP and MPE level ～660

The UE determines a CE level, and a corresponding number of repetitions, for the UL signal/channel based on the configured mappings ～670

The UE transmits the UL signal/channel with the determined number of repetitions ～680

FIG. 6

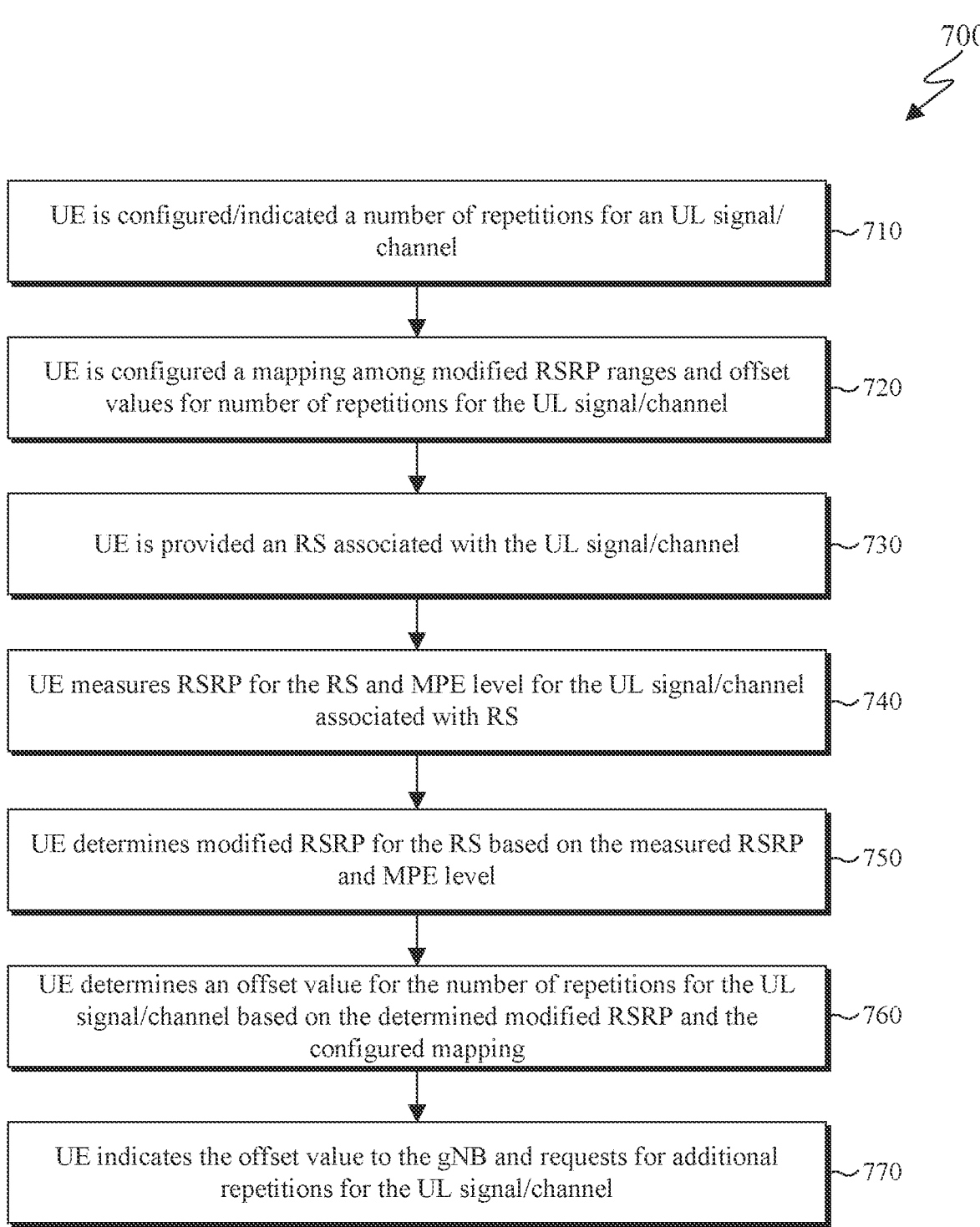

700

UE is configured/indicated a number of repetitions for an UL signal/
channel — 710

UE is configured a mapping among modified RSRP ranges and offset
values for number of repetitions for the UL signal/channel — 720

UE is provided an RS associated with the UL signal/channel — 730

UE measures RSRP for the RS and MPE level for the UL signal/channel
associated with RS — 740

UE determines modified RSRP for the RS based on the measured RSRP
and MPE level — 750

UE determines an offset value for the number of repetitions for the UL
signal/channel based on the determined modified RSRP and the
configured mapping — 760

UE indicates the offset value to the gNB and requests for additional
repetitions for the UL signal/channel — 770

FIG. 7

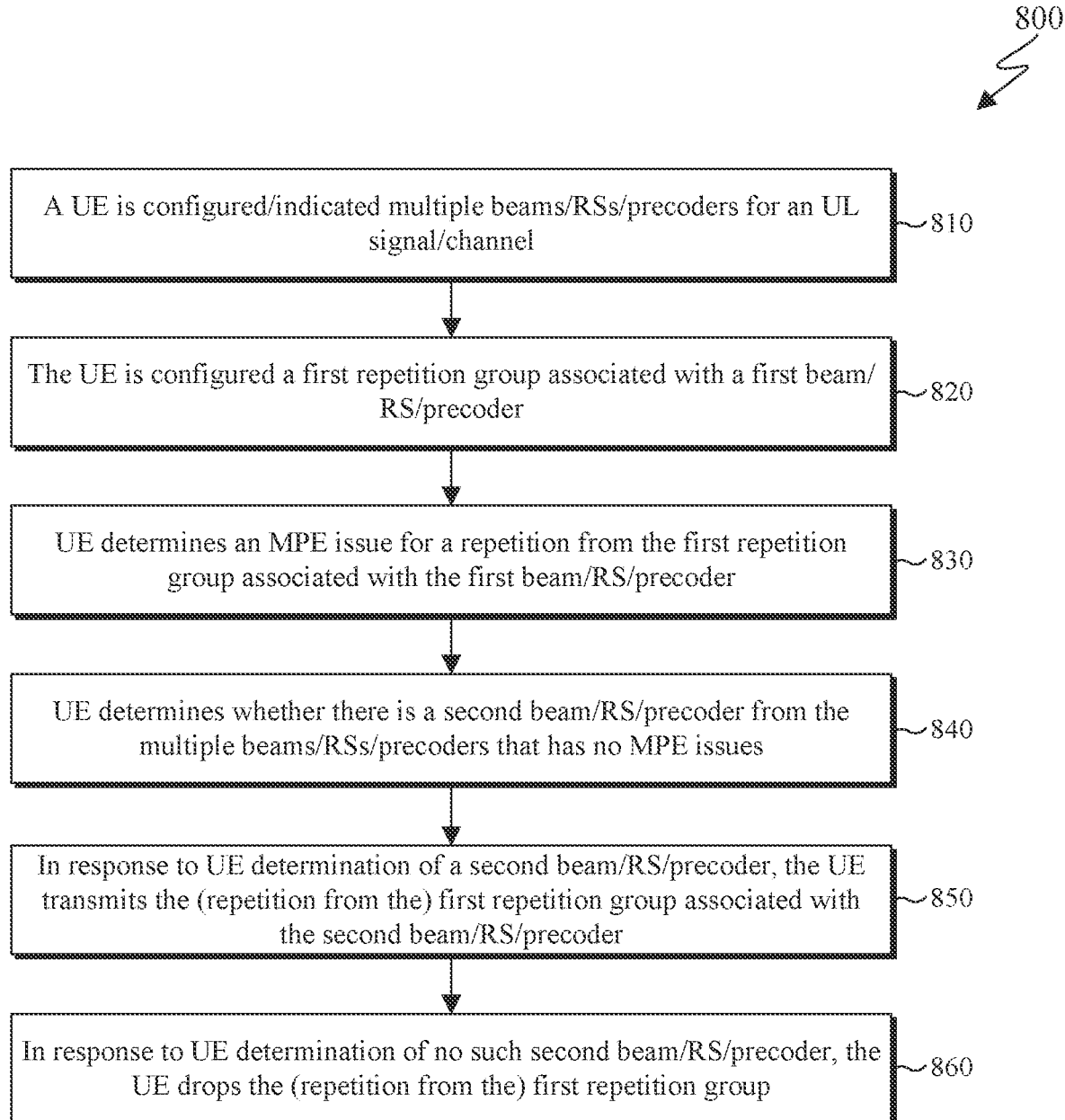

800

A UE is configured/indicated multiple beams/RSs/precoders for an UL signal/channel ~810

The UE is configured a first repetition group associated with a first beam/RS/precoder ~820

UE determines an MPE issue for a repetition from the first repetition group associated with the first beam/RS/precoder ~830

UE determines whether there is a second beam/RS/precoder from the multiple beams/RSs/precoders that has no MPE issues ~840

In response to UE determination of a second beam/RS/precoder, the UE transmits the (repetition from the) first repetition group associated with the second beam/RS/precoder ~850

In response to UE determination of no such second beam/RS/precoder, the UE drops the (repetition from the) first repetition group ~860

FIG. 8

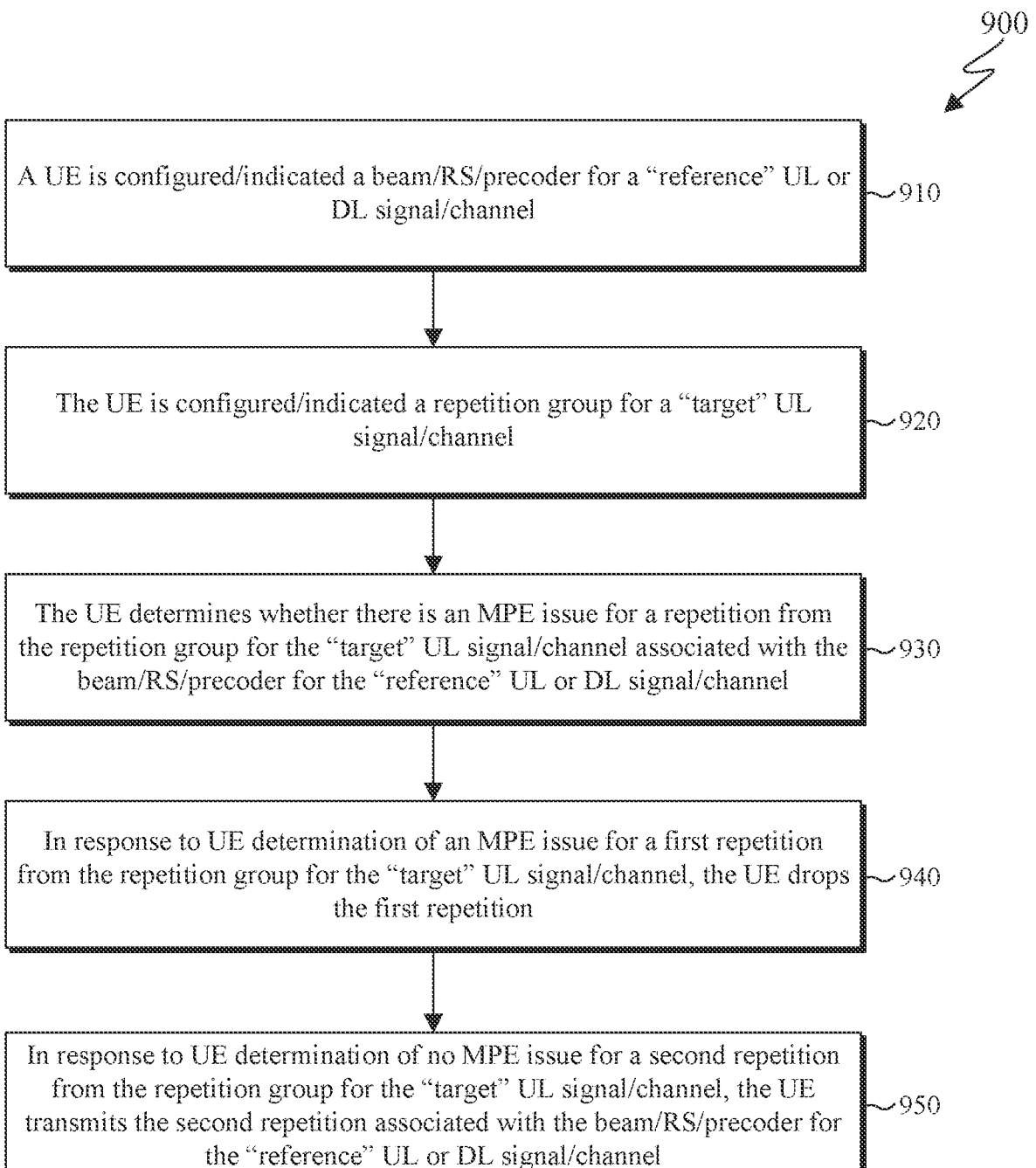

900

A UE is configured/indicated a beam/RS/precoder for a "reference" UL or DL signal/channel — 910

The UE is configured/indicated a repetition group for a "target" UL signal/channel — 920

The UE determines whether there is an MPE issue for a repetition from the repetition group for the "target" UL signal/channel associated with the beam/RS/precoder for the "reference" UL or DL signal/channel — 930

In response to UE determination of an MPE issue for a first repetition from the repetition group for the "target" UL signal/channel, the UE drops the first repetition — 940

In response to UE determination of no MPE issue for a second repetition from the repetition group for the "target" UL signal/channel, the UE transmits the second repetition associated with the beam/RS/precoder for the "reference" UL or DL signal/channel — 950

FIG. 9

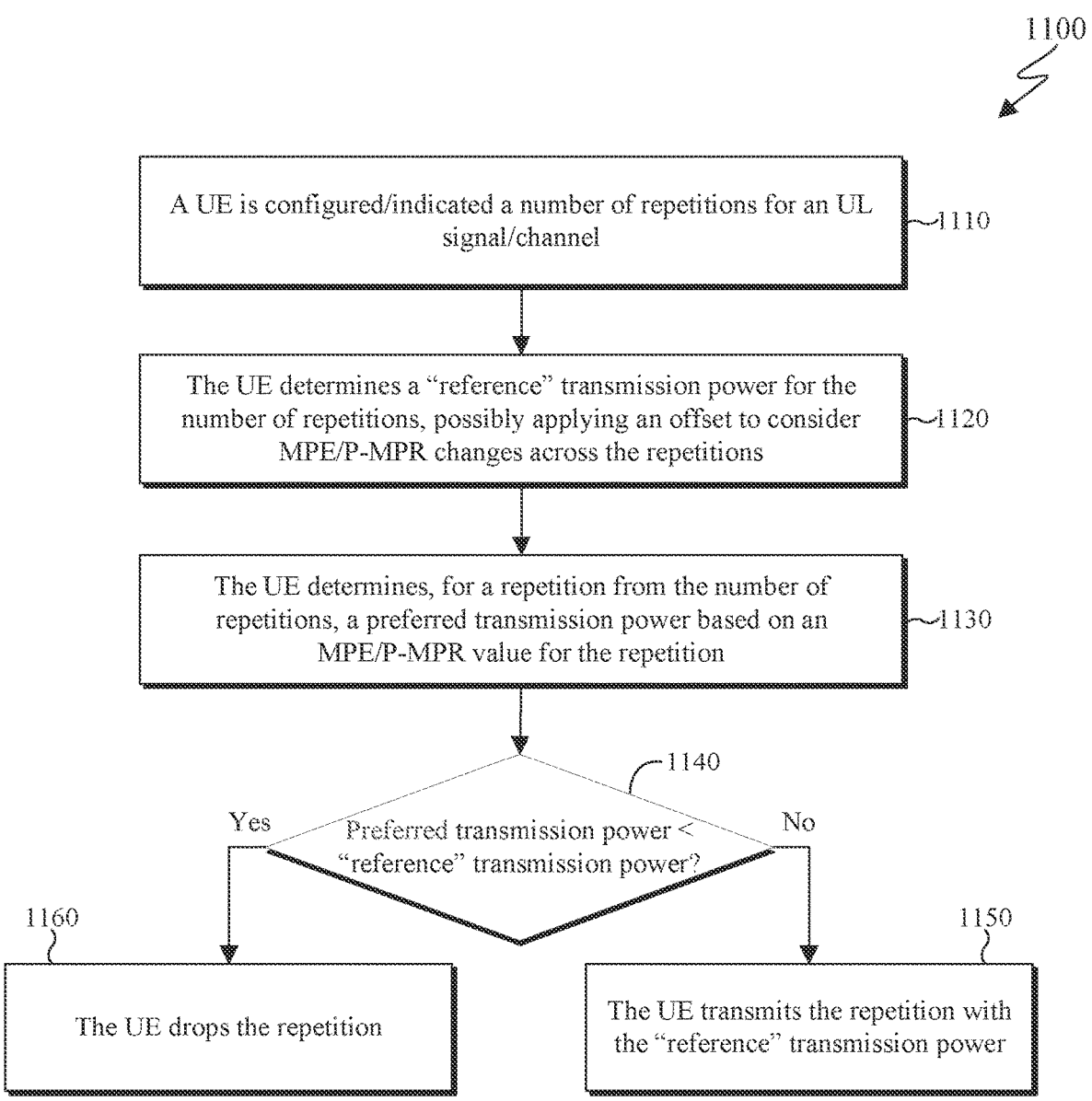

1100

A UE is configured/indicated a number of repetitions for an UL signal/channel ~1110

The UE determines a "reference" transmission power for the number of repetitions, possibly applying an offset to consider MPE/P-MPR changes across the repetitions ~1120

The UE determines, for a repetition from the number of repetitions, a preferred transmission power based on an MPE/P-MPR value for the repetition ~1130

1140

Preferred transmission power < "reference" transmission power?

Yes                    No 1160                    1150

The UE drops the repetition

The UE transmits the repetition with the "reference" transmission power

FIG. 11

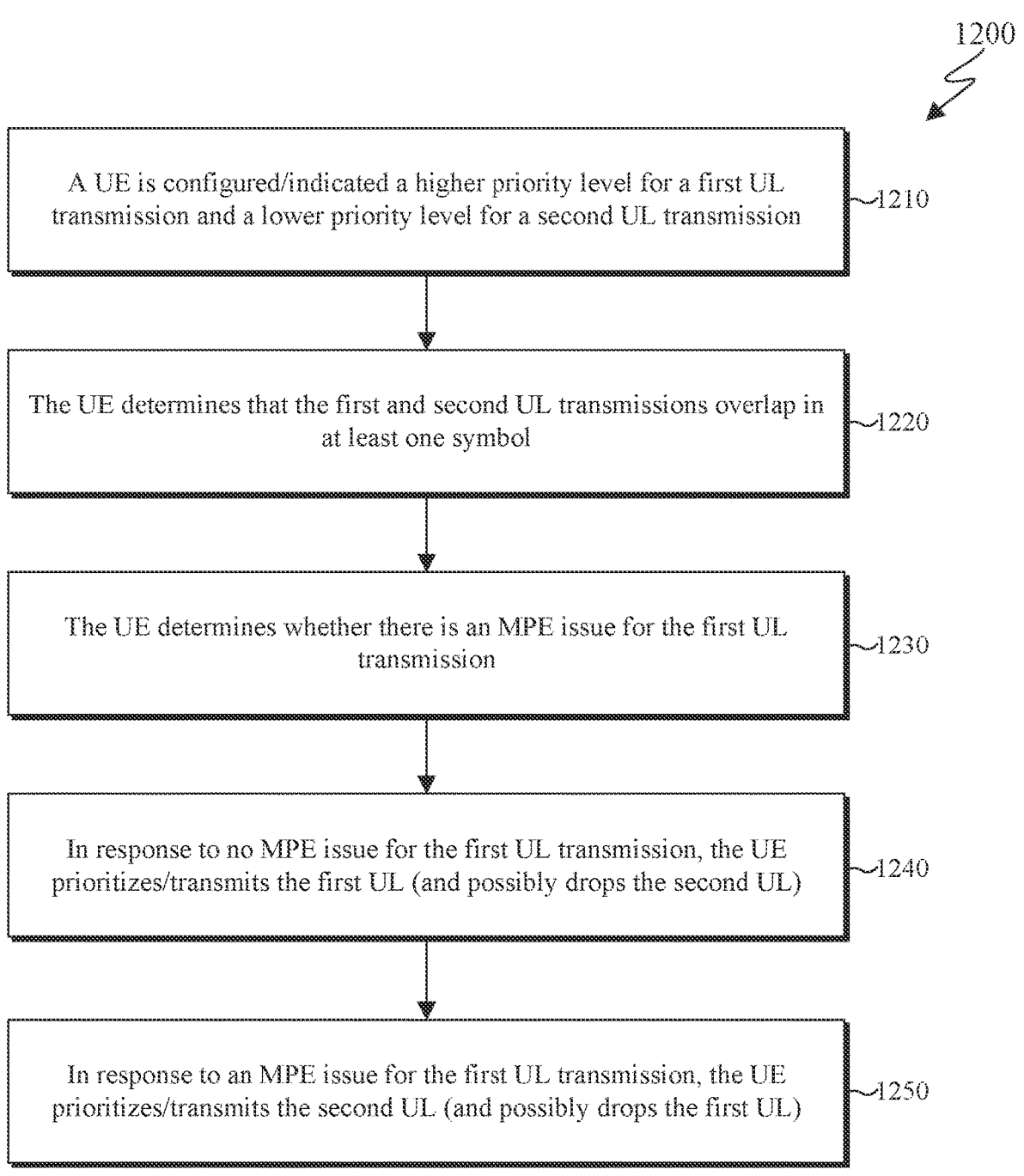

1200

A UE is configured/indicated a higher priority level for a first UL transmission and a lower priority level for a second UL transmission ~1210

The UE determines that the first and second UL transmissions overlap in at least one symbol ~1220

The UE determines whether there is an MPE issue for the first UL transmission ~1230

In response to no MPE issue for the first UL transmission, the UE prioritizes/transmits the first UL (and possibly drops the second UL) ~1240

In response to an MPE issue for the first UL transmission, the UE prioritizes/transmits the second UL (and possibly drops the first UL) ~1250

FIG. 12

RADIO FREQUENCY EXPOSURE MITIGATION

CROSS-REFERENCE TO RELATED APPLICATION AND CLAIM OF PRIORITY

This application claims priority under 35 U.S.C. § 119(e) to U.S. Provisional Patent Application No. 63/191,881 filed on May 21, 2021. The above-identified provisional patent applications are hereby incorporated by reference in their entirety.

TECHNICAL FIELD

The present disclosure relates generally to wireless communication systems and, more specifically, the present disclosure relates to radio frequency exposure mitigation.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to radio frequency exposure mitigation.

In one embodiment, a method for transmitting a first channel is provided. The method includes receiving first information for a first downlink reference signal (DL RS) and a set of numbers of repetitions. The method further includes determining a first reference signal received power (RSRP) value for the first DL RS, a first spatial filter corresponding to the first DL RS, a first exposure value for the first spatial filter, and a first number of repetitions from the set of numbers of repetitions based on the first RSRP value and the first exposure value. The method further includes transmitting the first channel with the first number of repetitions using the first spatial filter.

In another embodiment, a user equipment (UE) comprising is provided. The UE includes a transceiver configured to receive first information for a first DL RS and a set of numbers of repetitions. The UE further includes a processor operably coupled to the transceiver. The processor is configured to determine a first RSRP value for the first DL RS, a first spatial filter corresponding to the first DL RS, a first exposure value for the first spatial filter, and a first number of repetitions from the set of numbers of repetitions based on the first RSRP value and the first exposure value. The transceiver is further configured to transmit a first channel with the first number of repetitions using the first spatial filter.

In yet another embodiment, a base station is provided. The base station includes a processor configured to identify first information for a set of ranges of exposure values. The base station further includes a transceiver operably coupled to the processor. The transceiver is configured to transmit second information for a first DL RS, a set of ranges of RSRP values for the first DL RS, a set of numbers of repetitions for reception of a first channel, and a first mapping among: ranges of RSRP values, from the set of ranges of RSRP values, ranges of exposure values, from the set of ranges of exposure values, and the set of numbers of repetitions. The transceiver is further configured to receive the first channel with a first number of repetitions from the set of numbers of repetitions.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates an example method for determining a number of repetitions for an uplink (UL) signal/channel according to embodiments of the present disclosure;

FIG. 7 illustrates an example method for requesting additional repetitions for an UL signal/channel due to maximum permissible exposure (MPE) issues according to embodiments of the present disclosure;

FIG. 8 illustrates an example method for changing a beam/RS/precoder for a group of repetitions or dropping a group of repetitions that experience MPE issues according to embodiments of the present disclosure;

FIG. 9 illustrates an example method for dropping a repetition of a "target" UL signal/channel when a beam/reference signal/precoder for a "reference" signal/channel causes MPE issues for the "target" UL signal/channel according to embodiments of the present disclosure;

FIG. 11 illustrates an example method for transmitting a number of UL repetition with a same "reference" power level according to embodiments of the present disclosure; and FIG. 12 illustrates an example method for assigning priority levels among overlapping UL transmissions in the presence of MPE issues according to embodiments of the present disclosure.

DETAILED DESCRIPTION

Figure 1:
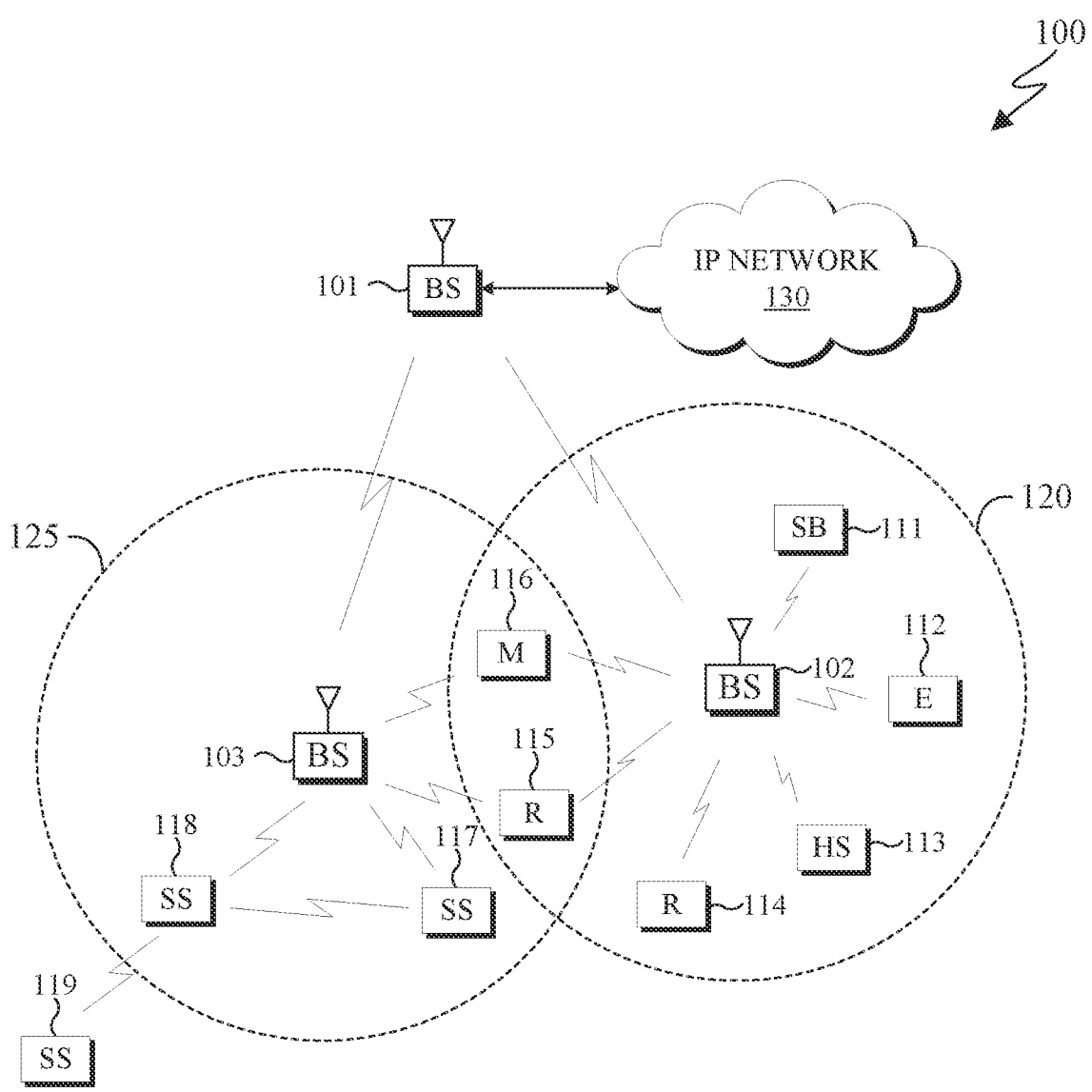
FIG. 1 illustrates an example wireless network according to embodiments of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 Rel-16 v16.5.0, "NR; Physical channels and modulation" ("REF1"); 3GPP TS 38.212 Rel-16 v16.5.0, "NR; Multiplexing and channel coding" ("REF2"); 3GPP TS 38.213 Rel-16 v16.5.0, "NR; Physical layer procedures for control" ("REF3"); 3GPP TS 38.214 Rel-16 v16.5.0, "NR; Physical layer procedures for data" ("REF4"); 3GPP TS 38.321 Rel-16 v16.4.0, "NR; Medium Access Control (MAC) protocol specification" ("REF5"); 3GPP TS 38.331 Rel-16 v16.4.1, "NR; Radio Resource Control (RRC) protocol specification" ("REF6"); 3GPP TS 38.300 Rel-16 v16.5.0, "NR; NR and NG-RAN Overall Description; Stage 2" ("REF7"); 3GPP TS 38.101-1 Rel-16 v16.7.0, "NR; User Equipment (UE) radio transmission and reception; Part 1: Range 1 Standalone" ("REF8"); 3GPP TS 38.101-2 Rel-16 v16.7.0, "NR; User Equipment (UE) radio transmission and reception; Part 2: Range 2 Standalone" ("REF9"); 3GPP TS 38.101-3 Rel-16 v16.7.0, "NR; User Equipment (UE) radio transmission and reception; Part 3: Range 1 and Range 2 Interworking operation" ("REF10"); and 3GPP TS 38.133 Rel-16 v16.7.0, "NR; Requirements for support of radio resource management" ("REF11").

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long-term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like. For the sake of convenience, the terms "user equipment" and "UE" are used in this patent document to refer to remote wireless equipment that wirelessly accesses an gNB, whether the UE is a mobile device (such as a mobile telephone or smartphone) or is normally considered a stationary device (such as a desktop computer or vending machine). The UE may also be a car, a truck, a van, a drone, or any similar machine or a device in such machines.

Figure 2:
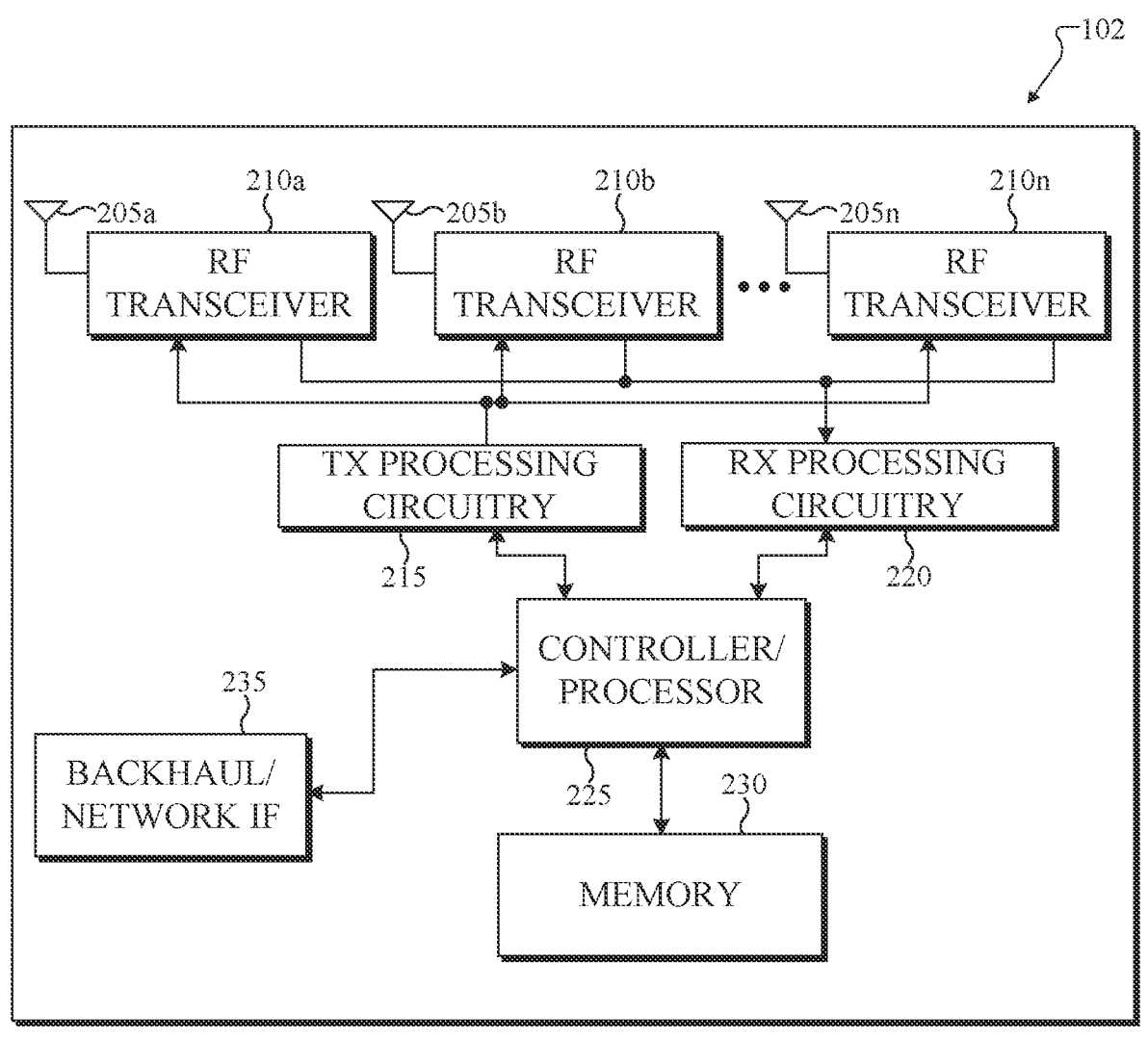
FIG. 2 illustrates an example base station (BS) according to embodiments of the present disclosure.
Figure 3:
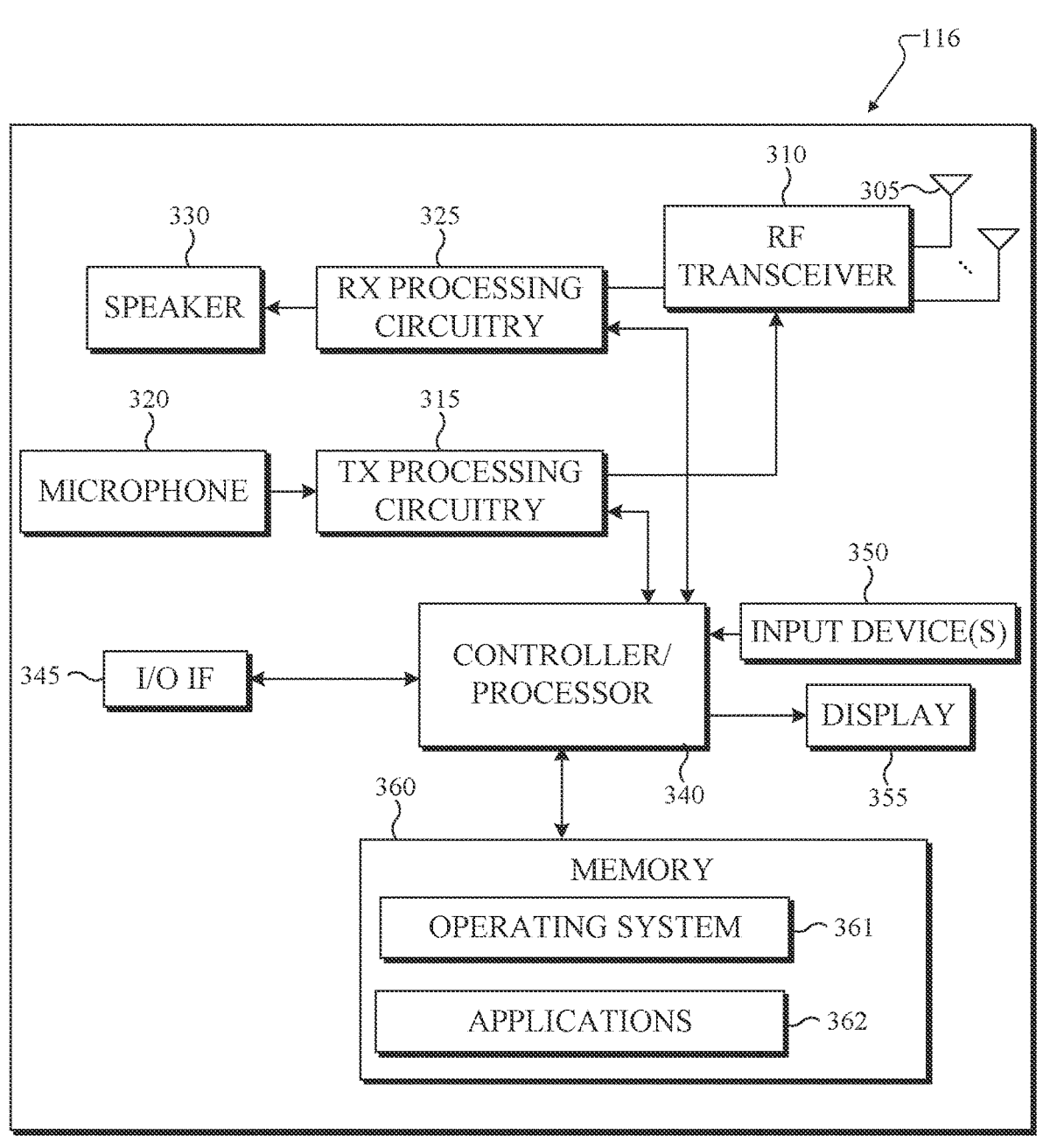
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes various gNodeB (bNG) such a base station, BS 101, a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115, the UE 116, the UE 117, and the UE 118. In some embodiments, one or more of the BSs 101-103 may communicate with each other and with the UEs 111-118 using 5G/NR, long term evolution (LTE), long term evolution-advanced (LTE-A), WiMAX, WiFi, or other wireless communication techniques.

In certain embodiments, multiple UEs (such as the UE 117, the UE 118, and the UE 119) may communicate directly with each other through device-2-device communication. In some embodiments, a UE, such as UE 119, is outside the coverage area of the network, but can communicate with other UEs inside the coverage area of the network, such as UE 118, or outside the coverage area of the network.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, in some embodiments, one or more of BS 101, BS 102 and BS 103 radio frequency exposure mitigation via repetition. Additionally, as described in more detail below, one or more of the UEs 111-119 include circuitry, circuitry, programing, or a combination thereof for radio frequency exposure mitigation via repetition. In certain embodiments, and one or more of the BSs 101-103 includes circuitry, programing, or a combination thereof for radio frequency exposure mitigation via repetition.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of uplink channel signals and the transmission of downlink channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support radio frequency exposure mitigation via repetition. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. In certain embodiments, the controller/processor 225 supports communication between entities, such as web real time communications (RTC). For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BSs over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

As described in more detail below, the transmit and receive paths of the BS 102 (implemented using the RF transceivers 210a-210n, TX processing circuitry 275, and/or RX processing circuitry 270) support communication with aggregation of frequency division duplex (FDD) cells and time division duplex (TDD) cells.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 and 117-119 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of uplink channel signals and the transmission of downlink channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figures 4, 5:
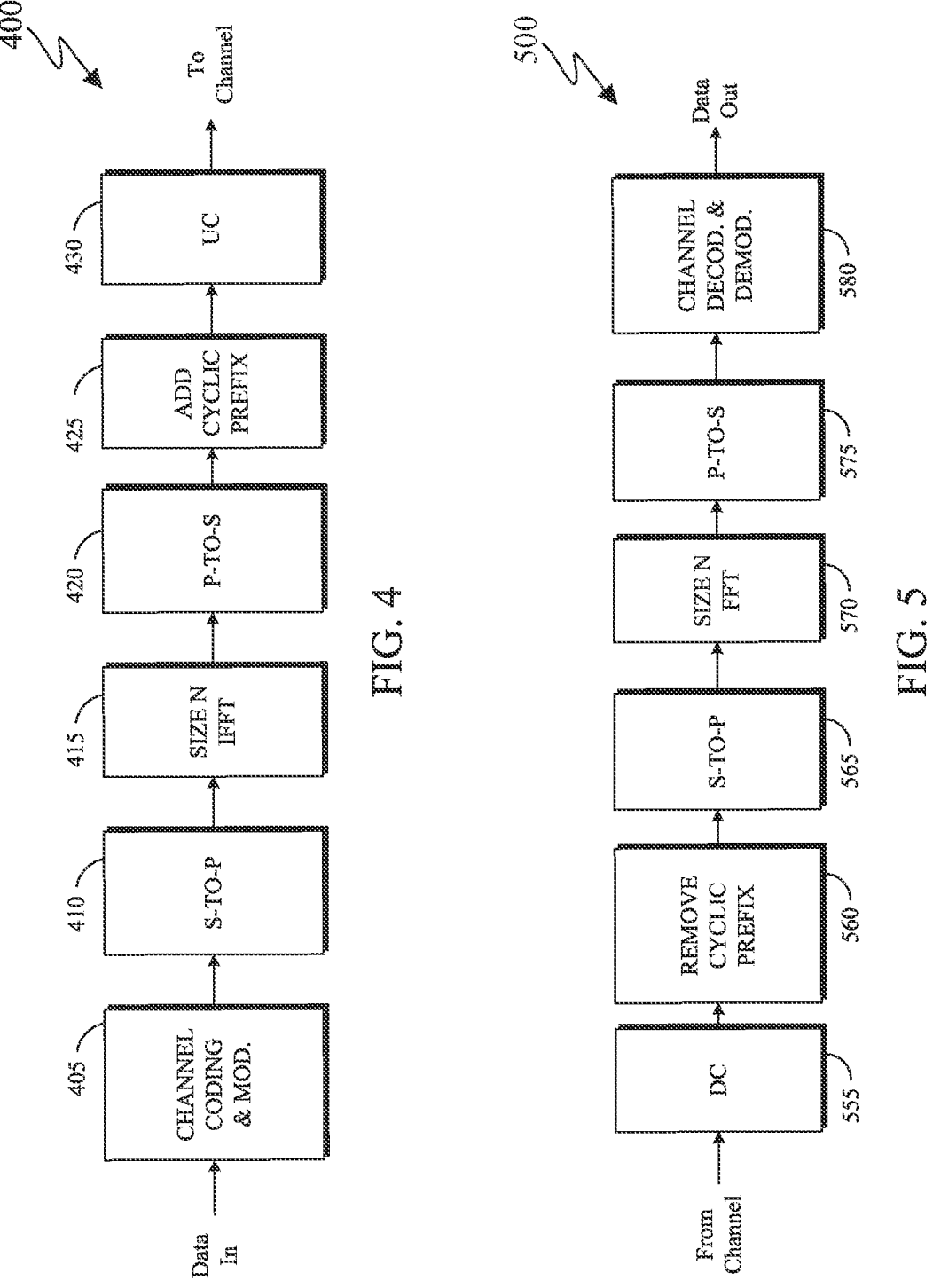
FIGS. 4 and 5 illustrate example wireless transmit and receive paths according to embodiments of the present disclosure.

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support radio frequency exposure mitigation via repetition as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-118. Similarly, each of UEs 111-118 may implement the transmit path 400 for transmitting in the uplink to the BSs 101-103 and may implement the receive path 500 for receiving in the downlink from the BSs 101-103.

Furthermore, each of UEs 111-119 may implement a transmit path 400 for transmitting in the sidelink to another one of UEs 111-119 and may implement a receive path 500 for receiving in the sidelink from another one of UEs 111-119.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Embodiments of the present disclosure relate to a pre-5th-Generation (5G) or 5G or beyond 5G communication system to be provided for supporting one or more of: higher data rates, lower latency, higher reliability, improved coverage, and massive connectivity, and so on. Various embodiments apply to UEs operating with other RATs and/or standards, such as different releases/generations of 3GPP standards (including beyond 5G, 5G Advanced, 6G, and so on), IEEE standards (such as 802.16 WiMAX and 802.11 Wi-Fi and so on), and so forth.

Embodiments of the present disclosure can be applicable to NR specifications Rel-17/18 and beyond to coverage enhancement when additionally considering regulatory requirements such as maximum permissible exposure (MPE) effects, for both UEs during initial/random access procedure, as well as UEs in RRC_CONNECTED state. Such an approach can enable the UE to fully satisfy the MPE requirements, while achieving an increased coverage via repetitions.

Embodiments of the present disclosure describe coverage enhancement for uplink transmissions via repetition, while incorporating regulatory requirements for radio frequency (RF) exposure issues such as MPE in mm-wave frequency bands, also referred to as frequency range 2 (FR2). Such requirements restrict the UE beamforming operation or limit the transmission power for uplink transmissions in certain directions, such as towards a human body.

In legacy 5G NR systems, MPE limitations are primarily resolved via UE implementation solutions. For example, when determining a maximum configured transmission power (Pcmax), a UE can apply a regulatory-based power back-off term, referred to as power management maximum power reduction (P-MPR). Later releases of 5G NR consider more effective methods for MPE mitigation. NR Rel-16 supports a new UE reporting mechanism so that the UE can report a P-MPR value that the UE applies to meet the regulatory MPE limitations in FR2. In NR Rel-17, for a connected mode UE, mechanisms are being developed so that the UE can report an existing or anticipated MPE event and initiate a fast uplink (UL) panel selection procedure, so that the UE can operate with an alternative UL panel without MPE issues.

However, embodiments of the present disclosure take into consideration that existing methods for MPE mitigation are not applicable to a random access (RA) procedure by a UE (such as the UE 116), especially for initial access. Before RRC connection, the UE may not be configured reference signals (RSs) for panel association/selection, and it may not be possible for the UE to report to a serving gNB (such as the BS 102) an existing or anticipated MPE event that can serve as a request for the gNB to resolve the MPE issues.

Embodiments of the present disclosure also take into consideration that existing methods for coverage enhancement such as repetitions have not considered MPE issues. Coverage enhancement methods typically aim to resolve coverage issues that are caused by environment issues, such as blockage by physical objects or operation in remote/secluded locations or deep down/inside buildings, that cause bad channel/signal conditions towards the UE; or UE capability issues, such as high noise figure, reduced bandwidth capability, reduced number of RF chains/antennas, half-duplex operation, lower power class, and so on, that cause a low received signal to interference and noise ratio (SINR) at the UE or a low transmission power by the UE.

Embodiments of the present disclosure further take into consideration that another set of uplink coverage issues can be caused by regulatory requirements such as specific absorption rate (SAR) or MPE that limit the uplink transmission power. For example, the UE cannot transmit with high/full power (omnidirectional or in a certain direction) due to RF exposure issues. Other related example can include network-enforced scenarios, such as requirements for lower transmission power (omnidirectional or in a certain direction) to limit the interference to a private network, or a neighbor cell, and so on.

In such regulatory-driven (or network enforced) scenarios for lower transmission power, a reduced uplink coverage may not be necessarily due to environment conditions or UE capability issues. Therefore, the UE may operate with a corresponding downlink (DL) beam with high signal/channel quality such as large reference signal received power (RSRP) or SINR, but the uplink beam may not be operable due to MPE issues. For example, a number of repetitions for an uplink signal or channel can be configured by higher layers, only based on channel/channel state information (CSI) measurements or DL RSRP/SINR reports, before/without considering any MPE issues/events. In addition, an MPE situation can change over time, such as during repetitions of the UL signal/channel, so that spatial transmission filters or transmission power levels for the repetitions can be impacted by whether or not a repetition has MPE issues, while the DL beam/coverage may remain the same across all repetitions.

Consequently, enhancements to the UL repetition schemes are needed to consider/mitigate the MPE effects. Coverage enhancement solutions such as repetitions need to consider both environment issues and UE capability issues, such as downlink RSRP, as well as any power backoff due to MPE issues.

Therefore, embodiments of the present disclosure take into consideration that there is a need for coverage enhancement solutions such as repetitions to consider both environment issues and UE capability issues, such as downlink RSRP, as well as any power backoff due to MPE issues. Such consideration needs to include various transmission parameters, such as number of repetitions, spatial transmission filters for the repetitions, and transmission power levels for the repetition.

Embodiments of the present disclosure also take into consideration that there is need to consider change of MPE situation/issues across different repetitions. The UE needs to follow a consistent behavior across different repetitions or perform suitable behavior for each individual repetition when the UE determines an MPE issues for some repetitions of an UL signal/channel, but not for some other repetitions.

Embodiments of the present disclosure further take into consideration that there is need for solutions that treat coverage enhancement jointly with MPE mitigation, considering UEs during initial/random access procedure, as well as UEs in RRC_CONNECTED state.

The present disclosure provides methods and apparatus for coverage enhancement via repetition when additionally considering regulatory requirements such as MPE effects, for both UEs during initial/random access procedure, as well as UEs in RRC_CONNECTED state. Various enhancements are considered for determination or adjustment of a number of repetitions, beam selection aspects, and transmission power allocation by a UE that experiences MPE limitations. The enhancements enable the UE to satisfy the MPE requirements while increasing coverage for the uplink transmission via repetitions.

The disclosure describes methods for the UE to determine a number of repetitions based on both a signal/channel quality such as a DL RSRP as well as an MPE state/level/range. The UE can extend such methods to reduce or increase (or to request an increase for) a previously configured/indicated number of repetitions for an UL transmission. Several methods are described to handle beam/RS/precoder selection for UL transmissions with repetitions based on MPE issues, or when MPE situation changes across UL repetitions, so that the UE can switch a beam/RS/precoder associated with an UL repetition with MPE issues to drop some such UL repetitions. Various approaches are explained to achieve a same transmission power across repetitions or to enable different transmission power levels among repetitions, when MPE situation changes over time. In addition, methods are described for handling overlapping UL transmission when considering both transmission priority levels and MPE issues.

One motivation for a random-access procedure with MPE handling is to increase coverage in frequency bands above 6 GHz, referred to as FR2. In general, the embodiments apply to any deployments, verticals, or scenarios including for operation in frequency bands below 6 GHz, for enhanced mobile broadband (eMBB), ultrareliable and low latency communication (URLLC) and industrial internet of things (IIoT) and eXtended reality (XR), massive machine type communication (mMTC) and internet of things (IoT), for sidelink/vehicle to anything (V2X) communications, with multi-TRP/beam/panel, in unlicensed/shared spectrum (NR-U), for non-terrestrial networks (NTN), for aerial systems such as unmanned aerial vehicles (UAVs) such as drones, for private or non-public networks (NPN), for operation with reduced capability (RedCap) UEs, and so on.

Various embodiments of the disclosure describe improving the operation of 3GPP 5G NR system by enhanced uplink repetition schemes with regulatory/MPE considerations to achieve increased coverage in frequency bands above 6 GHz. The embodiments are can also apply to various frequency bands in different frequency ranges (FR) such as FR1, FR2, FR3, and FR4, e.g., low frequency bands such as below 1 GHz, mid frequency bands, such as 1-7 GHz, and high/millimeter frequency bands, such as 24-100 GHz and beyond. In addition, the embodiments are generic and can apply to various use cases and settings as well, such as single-panel UEs and multi-panel UEs, eMBB, URLLC and IIoT, mMTC and IoT, sidelink/V2X, operation with multi-TRP/beam/panel, operation in NR-U, NTN, aerial systems such as drones, operation with RedCap UEs, private or NPN, and the like.

Various embodiments of the disclosure for supporting uplink repetition with MPE handling are summarized below.

For example, an embodiment, described in greater detail below, denoted as E-0, describes MPE determination. For example, a UE (such as the UE 116) can determine an RF exposure issue or event, herein referred to as an MPE issue or event, for an UL transmission based on an MPE state or an MPE level, wherein the MPE issue/event or the MPE state/level can be specific to a UE Tx beam-/panel corresponding to the UL transmission by the UE. The UE can use various methods to determine an MPE issue for an UL transmission, such as an applicable P-MPR, an actual or virtual power headroom (PH), or a modified RSRP or SINR.

For another example, an embodiment, described in greater detail below, denoted as E-1, describes scenarios for repetition in presence of MPE. For example, a UE (such as the UE 116) can operate with a repetition scheme for an uplink transmission to achieve coverage enhancement, while the UE is mitigating an existing or anticipated MPE issue/event associated with the uplink transmission. The repetition of the uplink transmission can be configured/indicated by the gNB or can be determined by the UE, before or after the UE determines the MPE issue/event. Therefore, the UE needs to consider the impact on MPE issue before an uplink repetition scheme is configured/indicated/determined, or the UE can attempt to adjust a previously configured/indicated/determined uplink repetition scheme after an MPE issue/event is detected. In addition, an MPE issue/event can change over time, therefore a UE that operates with uplink repetition can consider such MPE change across different repetitions.

For another example, an embodiment, described in greater detail below, denoted as E-2, describes determining a number of repetitions in presence of MPE. For example, a UE (such as the UE 116) can determine a number of repetitions, or adjustments to a configured/indicated number of repetitions, for an uplink transmission based on an MPE state/level/range that the UE determines for the uplink transmission.

For another example, an embodiment, described in greater detail below, denoted as E-3, describes increasing a number of repetitions or early termination of repetitions in presence of MPE. For example, for a UE (such as the UE 116) that is configured/indicated repetitions for transmission of an UL signal/channel, the UE can transmit the UL signal or channel with an increased or reduced number of repetitions compared to a configured/indicated number of repetitions, based on an MPE state/level/range corresponding to the UL transmission. Such increase or reduction of number of repetitions can be based on a UE determination of an MPE state/level/range before or at the time of transmission compared to a reference MPE state/level/range or can be based on a UE determination of a change to an MPE state/level/range after the start and during the UL repetitions. An increase or reduction of number of repetitions can be left to a UE determination (per configured mappings) or can be indicated by the gNB upon UE request for such change.

For another example, an embodiment, described in greater detail below, denoted as E-4, describes handling missed repetitions due to MPE. For example, for a UE (such as the UE 116) that is configured/indicated a number of repetitions for an UL signal or channel, when a UE cannot transmit a repetition from the configured/indicated number of repetitions due to a change to an MPE state/level/range during the repetitions, the UE can consider the missed repetitions for determination of UL transmission characteristic(s), such as counting a number of repetitions, or determination of a redundancy version, and so on.

For another example, an embodiment, described in greater detail below, denoted as E-5, describes resources for uplink repetition in presence of MPE. For example, a UE (such as the UE 116) can be configured with transmission occasions, including a number of repetitions, for an UL signal/channel that are CE-level-specific or CE-mode-specific, wherein the UE determines a CE level, or a CE mode based on an MPE state/level/range corresponding to the UL signal/channel. For example, the UE is configured with a first number of repetitions and a corresponding first set of transmission occasions for transmission of the UL signal/channel with a first CE level/mode or a first MPE state/level/range, and the UE is configured with a second number of repetitions and a corresponding second set of transmission occasions for transmission of the UL signal/channel with a second CE level/mode or a second MPE state/level/range. Such CE-/MPE-specific configuration applies at least to physical random-access channel (PRACH) transmission, configured grant physical uplink shared channel (PUSCH), and periodic or semi-persistent physical uplink control channel (PUCCH) or sounding reference signal (SRS).

For another example, an embodiment, described in greater detail below, denoted as E-6, describes beam/RS/precoder selection for repetitions in presence of MPE. For example, a UE (such as the UE 116) can be configured/indicated to transmit an UL repetition with beam/RS/precoder sweeping, wherein the UE can transmit a first group of repetitions associated with a first beam/RS/precoder and transmit a second group of repetitions associated with a second beam/RS/precoder. Such beam/RS/precoder sweeping can be originally for MPE mitigation reasons or can be due to other reasons (for example, MIMO transmission schemes, such as spatial diversity or spatial multiplexing schemes, with or without multi-TRP/beam/panel operation) but impacted by MPE issues/event. The UE should transmit the UL repetitions associated with beams/RSs/precoders that do not cause MPE issues.

For another example, an embodiment, described in greater detail below, denoted as E-7, describes beam/RS/precoder selection across different transmissions with repetitions in presence of MPE. For example, when a UE (such as the UE 116) is configured/indicated repetition with beam/RS/precoder sweeping for a "target" UL transmission that follows a spatial transmission filter of a "reference" UL/DL transmission which is also configured/indicated repetition with beam/RS/precoder sweeping, the UE considers MPE issues/events determined for the repetitions of the "reference" UL/DL transmissions or the repetitions of the "target" UL transmissions. Such behavior is beneficial, for example, when an MPE state/level/range changes over time in a time scale that is smaller than a time gap between the "reference" transmissions and the "target" transmissions.

For another example, an embodiment, described in greater detail below, denoted as E-8, describes transmission power for repetitions in presence of MPE. For example, when a UE (such as the UE 116) is configured/indicated a number of repetitions for an UL signal/channel, and the UE determines that one or more repetition(s) from the number of repetitions have MPE issues, the UE determines a transmission power for the repetitions by taking into account the MPE issue for the one or more repetition(s). Accordingly, the UE can determine a same or different transmission power across different repetitions.

For another example, an embodiment, described in greater detail below, denoted as E-9, describes handling of overlapping transmissions with or without repetitions in presence of MPE. For example, when a UE (such as the UE 116) is configured/indicated to transmit multiple UL signals/channels in overlapping symbols of a slot (or overlapping symbols across different slots), and the UE is provided with or determines priority levels for the multiple overlapping UL transmissions, the UE considers any MPE issues/events corresponding to any of UL transmissions, in addition to the priority levels, when prioritizing among the multiple the multiple overlapping and potentially dropping some of them, if necessary. When one or more of the multiple overlapping UL transmissions are also configured/indicated respective number of repetitions, the UE can apply such prioritization/dropping due to MPE reasons separately for each repetition or jointly across all repetitions.

Throughout the present disclosure, the term "configuration" or "higher layer configuration" and variations thereof (such as "configured" and so on) are used to refer to one or more of: a system information signaling such as by a Master information block (MIB) or a system information block (SIB) (such as SIB1), a common or cell-specific higher layer/RRC signaling, or a dedicated or UE-specific or bandwidth part (BWP)—specific higher layer/RRC signaling.

Throughout the present disclosure, the term signal quality is used to refer to e.g. RSRP, reference signal received quality (RSRQ), received signal strength indicator (RSSI), signal to noise (SNR) or SINR, with or without filtering such as L1 or L3 filtering, of a channel or a signal such as a RS including synchronized signal (SS)/physical broadcast channel (PBCH) block (it is noted that SS/PBCH block can also be denoted as SSB), CSI-RS, or SRS.

Throughput the disclosure, the term "beam" or variants thereof such as "(UE) Rx beam" or "(UE) Tx beam" and so on, refer to spatial reception filter or spatial transmission filter that the UE can use for a downlink or uplink reference signal or channel. Accordingly, the UE can generate a spatial pattern to allocate/focus its transmission or reception power in a certain direction or area. A beam can refer to an analogue beam or a digital beam or a hybrid beam. The UE can generate a beam using one or multiple antenna elements/panels/arrays/sub-arrays along with the corresponding RF chain(s), phase shift operator(s), and so on. A beam or spatial filter can be based on or associated with a spatial filter that the UE used for reception or transmission of another downlink or uplink signal or channel. For example, a spatial transmission/reception for a first signal or channel can be based on a spatial relation, or a quasi-co-location (QCL) assumption/relationship such as a QCL Type-D, or a transmission configuration indication (TCI) state such as a downlink/uplink/joint TCI state, associated with a second channel or signal, such as an SSB or CSI-RS or an SRS, or QCL assumptions of a control resource set (CORESET), and so on.

An antenna port is defined such that the channel over which a symbol on the antenna port is conveyed can be inferred from the channel over which another symbol on the same antenna port is conveyed.

For demodulation (DM)—RS associated with a physical downlink shared channel (PDSCH), the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same precoding resource block group (PRG).

For DM-RS associated with a physical downlink control channel (PDCCH), the channel over which a PDCCH symbol on one antenna port is conveyed can be inferred from the channel over which a DM-RS symbol on the same antenna port is conveyed only if the two symbols are within resources for which the UE may assume the same precoding being used.

For DM-RS associated with a physical broadcast channel (PBCH), the channel over which a PBCH symbol on one antenna port is conveyed can be inferred from the channel over which a DM-RS symbol on the same antenna port is conveyed only if the two symbols are within a SS/PBCH block transmitted within the same slot, and with the same block index.

Two antenna ports can be said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

The UE (such as the UE 116) may assume that SS/PBCH blocks transmitted with the same block index on the same center frequency location are quasi co-located with respect to Doppler spread, Doppler shift, average gain, average delay, delay spread, and, when applicable, spatial Rx parameters. The UE shall not assume quasi co-location for any other SS/PBCH block transmissions.

In absence of CSI-RS configuration, and unless otherwise configured, the UE (such as the UE 116) may assume PDSCH DM-RS and SS/PBCH block to be quasi co-located with respect to Doppler shift, Doppler spread, average delay, delay spread, and, when applicable, spatial Rx parameters.

The UE may assume that the PDSCH DM-RS within the same code division multiplexing (CDM) group are quasi co-located with respect to Doppler shift, Doppler spread, average delay, delay spread, and spatial Rx. The UE may also assume that DM-RS ports associated with a PDSCH are quasi co-located (QCL) with QCL Type A, Type D (when applicable) and average gain. The UE may further assume that no DM-RS collides with the SS/PBCH block.

A UE (such as the UE 116) can be configured with a list of up to M TCI-State configurations within the higher layer parameter PDSCH-Config to decode PDSCH according to a detected PDCCH with downlink control information (DCI) intended for the UE and the given serving cell, where M depends on the UE capability maxNumberConfiguredTCl-statesPerCC. Each TCI-State contains parameters for configuring a QCL relationship between one or two downlink reference signals and the DM-RS ports of the PDSCH, the DM-RS port of PDCCH or the CSI-RS port(s) of a CSI-RS resource. The quasi-co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi-co-location types corresponding to each DL RS are given by the higher layer parameter qcl-Type in QCL-Info.

For example, a quasi-co-location type of 'QCL-TypeA' can correspond to {Doppler shift, Doppler spread, average delay, delay spread}. For another example, a quasi-co-location type of 'QCL-TypeB' can correspond to {Doppler shift, Doppler spread}. For another example, a quasi-co-location type of 'QCL-TypeC' can correspond to {Doppler shift, average delay}. For yet another example, a quasi-co-location type of 'QCL-TypeD' can correspond to 'QCL-TypeD': {Spatial Rx parameter}.

In certain embodiments, a UE (such as the UE 116) receives a MAC-CE activation command to map up to N, e.g., N=8 TCI states to the codepoints of the DCI field 'Transmission Configuration Indication'. When the hybrid automatic repeat request (HARM)—acknowledgement (ACK) information corresponding to the PDSCH carrying the (MAC-CE) activation command is transmitted in slot n, the indicated mapping between TCI states and codepoints of the DCI field 'Transmission Configuration Indication' should be applied after a MAC-CE application time, e.g., starting from the first slot that is after $$\text{slot } n + 3N_{slot}^{subframe,\mu}.$$

Here, $$N_{slot}^{subframe,\mu}$$

is a number of slot per subframe for subcarrier spacing (SCS) configuration μ.

Throughput the present disclosure, the terms "SSB" and "SS/PBCH block" are used interchangeably.

A gNB (such as the BS 102) can transmit multiple SSBs within a cell bandwidth or within the frequency span of a carrier. The physical cell identifications (PCIs) of SSBs transmitted in different frequency locations can have different PCIs. When an SSB is associated with a SIB such as a remaining minimum SI (RMSI), the SSB is referred to as a Cell-Defining SSB (CD-SSB). A primary cell (PCell) is associated to a CD-SSB located on the synchronization raster. From a UE perspective, each serving cell is associated with at most a single SSB.

For a UE in RRC_CONNECTED state, the BWPs configured to the UE by a serving cell may overlap in frequency with BWPs configured to other UEs by other cells within a carrier.

CORESET #0 refers to a control resource set used for PDCCH transmission for at least SIB1 scheduling. CORESET #0 can be configured either by the MIB or by UE-dedicated RRC signaling.

System Information (SI) consists of a MIB and a number of SIBs. Here, minimum SI includes information required for initial access and information for acquiring any other SI. Minimum SI consists of MIB and a first SIB (SIB1). It is noted that MIB contains cell barred status information and essential physical layer information of the cell required to receive further system information, e.g., CORESET #0 configuration. MIB is periodically broadcast on BCH. Additionally, SIB1 defines the scheduling of other system information blocks and contains information required for initial access. SIB1 is also referred to as RMSI and is periodically broadcasted on DL-SCH or transmitted in a UE-dedicated manner on DL-SCH to a UE in RRC_CONNECTED state.

Other SIBs can either be periodically broadcasted on DL-shared channel (SCH), broadcasted on-demand on DL-SCH (i.e. upon request from UEs in RRC_IDLE, RRC_I-NACTIVE, or RRC_CONNECTED), or provided in a dedicated manner on DL-SCH to a UE in RRC_CONNECTED state (i.e., upon request, if configured by the network, from UEs in RRC_CONNECTED or when the UE has an active BWP with no common search space configured).

For a cell/frequency that is considered for camping by the UE, the UE is not required to acquire the contents of MIB/SIB1 of that cell/frequency from another cell/frequency layer. This does not preclude the case that the UE applies stored SI from previously visited cell(s).

If the UE cannot determine the full contents of the MIB/SIB1 of a cell by receiving from that cell, the UE shall consider that cell as barred.

In case of bandwidth adaptation and BWP operation, the UE only acquires SI on the active BWP. An initial BWP can be for example 24, 48, or 96 RBs in the frequency domain.

The MIB is mapped on broadcast control channel the (BCCH) and carried on BCH while all other SI messages mapped on the BCCH, where they are dynamically carried on DL-SCH.

For a UE to be allowed to camp on a cell, the UE needs to have acquired the MIB/SIB1 from that cell. There may be cells in the system that do not broadcast MIB/SIB1 and therefore a UE cannot camp on such cells.

Xn interface refers to a network interface between NG-RAN nodes. F1 interface refers to a network interface between a gNB central unit (CU) and a gNB distributed unite (DU).

A dual active protocol stack (DAPS) handover refers to a handover procedure that maintains the source gNB connection after reception of RRC message for handover and until releasing the source cell after successful random access to the target gNB.

A MAC entity is defined per cell group, one for the master cell group (MCG) and one for the secondary cell group (SCG). Two MAC entities can be considered for a UE when the UE is configured with DAPS handover: one for the source cell (source MAC entity) and one for the target cell (target MAC entity).

A UE has at most one ongoing Random-Access procedure at a given time in a MAC entity. It is up to UE implementation whether to continue with an ongoing procedure or start a new procedure (e.g., for SI request). PRACH initiation on a PCell can be by RRC (e.g., for SI request), MAC entity, or PDCCH order. PRACH initiation on a secondary cell (SCell) can by a PDCCH order.

A random access procedure (for PCell) can be triggered by a number of events such as the following: (i) Initial access from RRC_IDLE to establish RRC connection→contention-based random access (CB-RA); (ii) RRC Connection Re-establishment procedure (after radio link failure (RLF))→CB-RA; (iii) Transition from RRC_INACTIVE to RRC_CONNECTED→CB-RA (iv) Request by RRC upon synchronous reconfiguration (e.g. handover)→CB-RA or contention-free random access (CFRA); (v) Request for other (on-demand) system information (OSI)→CB-RA or CFRA; (vi) DL data arrival during RRC_CONNECTED when UL synchronisation status is "non-synchronised" i.e., Out-of-Sync→CB-RA or CFRA; (vii) UL data arrival during RRC_CONNECTED when UL synchronisation status is "non-synchronised" i.e., Out-of-Sync→CB-RA; (viii) To establish time alignment for a secondary TAG→CB-RA or CFRA; (ix) Scheduling request "SW" issues, such as UL data arrival during RRC_CONNECTED when there are no PUCCH resources for SR available, or failure of PUCCH-based SR→CB-RA; (x) Link recovery procedure—also known as beam failure recovery (BFR)→CB-RA or CFRA; and (xi) Consistent UL Listen before-talk (LBT) failure on special cell (SpCell).

For PRACH on a SCell, some of the above triggers may not apply. For example, a PRACH trigger for SCell can include Out-of-sync and BFR.

Two types of random-access procedure are supported. A first type, denoted as 4-step RA type with MSG1 and a second type, denoted as 2-step RA type with MSGA. Both types of RA procedure support CB-RA and CFRA.

There can be a number of cases for selection of a RA procedure type (4-step RA or 2-step RA). For example, a UE can select a 2-step RA when only 2-step RA resources are provided, or when both 2-step and 4-step RA resources are provided and a RSRP that a UE measures is larger than a threshold, or when a PRACH transmission is triggered by reconfiguration with sync (for example, for handover purposes) and CFRA resources for a 2-step RA procedure are provided. Otherwise, the UE can select a 4-step RA procedure including when a PRACH transmission is triggered by PDCCH order, or by RRC for SI request with explicit RACH resources, or by BFR with explicit CFRA resources for 4-step RA procedure, or by reconfiguration with sync (e.g., handover) with explicit CFRA resources for 4-step RA procedure.

For example, when CFRA resources are not configured, a UE uses an RSRP threshold to select between 2-step RA type and 4-step RA type. In another example, when CFRA resources for 4-step RA type are configured, the UE performs random access with 4-step RA type. In yet another example, when CFRA resources for 2-step RA type are configured, the UE performs random access with 2-step RA type. In a further example, CFRA with 2-step RA type is only supported for handover. In one example, the network does not configure CFRA resources for 4-step and 2-step RA types at the same time for a bandwidth part (BWP).

The UE selects the RA procedure type at the initiation of the RA procedure based on network configuration. For example, when CFRA resources are not configured, the UE uses an RSRP threshold to select between 2-step RA type and 4-step RA type, depending on whether (or not) an RSRP measurement is larger than the RSRP threshold, respectively. For another example, when CFRA resources for 4-step RA type are configured, the UE performs random access with 4-step RA type. For yet another example, when CFRA resources for 2-step RA type are configured, the UE performs random access with 2-step RA type.

In certain embodiments, msgA-RSRP-Threshold is an RSRP threshold for selection between 2-step RA type and 4-step RA type when both 2-step and 4-step RA type Random Access Resources are configured in the UL BWP. Syntax (1), below, describes a random-access procedure. Syntax (1)

1> if the Random Access procedure is initiated by PDCCH order and if the ra-PreambleIndex explicitly provided by PDCCH is not 0b000000; or 1> if the Random Access procedure was initiated for SI request (as specified in REF6) and the Random Access Resources for SI request have been explicitly provided by RRC; or 1> if the Random Access procedure was initiated for SpCell beam failure recovery (as specified in REF5) and if the contention-free Random Access Resources for beam failure recovery request for 4-step RA type have been explicitly provided by RRC for the BWP selected for Random Access procedure; or 1> if the Random Access procedure was initiated for reconfiguration with sync and if the contention-free Random Access Resources for 4-step RA type have been explicitly provided in rach-ConfigDedicated for the BWP selected for Random Access procedure:

2> set the RA_TYPE to 4-stepRA.

1> else if the BWP selected for Random Access procedure is configured with both 2-step and 4-step RA type Random Access Resources and the RSRP of the downlink pathloss reference is above msgA-RSRP-Threshold; or 1> if the BWP selected for Random Access procedure is only configured with 2-step RA type Random Access resources (i.e. no 4-step RACH RA type resources configured); or 1> if the Random Access procedure was initiated for reconfiguration with sync and if the contention-free Random Access Resources for 2-step RA type have been explicitly provided in rach-ConfigDedicated for the BWP selected for Random Access procedure:

2> set the RA_TYPE to 2-stepRA.

1> else:

2> set the RA_TYPE to 4-stepRA.

The network does not configure CFRA resources for 4-step and 2-step RA types at the same time for a BWP. CFRA with 2-step RA type is only supported for handover.

Msg1 refers to PRACH preamble transmission of the RA procedure for 4-step RA type. MsgA refers to PRACH preamble and PUSCH transmissions of the RA procedure for 2-step RA type.

Msg3 refers to first scheduled transmission of the RA procedure. MsgB refers to response to MsgA in the 2-step RA procedure. MsgB may consist of response(s) for contention resolution, fallback indication(s), and backoff indication.

The MSG1 of the 4-step RA type includes a preamble on PRACH. After MSG1 transmission, the UE (such as the UE 116) monitors PDCCH for scheduling of a random-access response (RAR) reception within a configured window. For CFRA, the UE is assigned by the network a dedicated preamble for MSG1 transmission and, upon receiving RAR from the network, the UE ends the RA procedure. For CB-RA, upon RAR reception, the UE transmits a MSG3 PUSCH that is scheduled by an UL grant in the RAR response and monitors PDCCH for scheduling of a MSG4 PDSCH reception that provides contention resolution (can be a first PDSCH reception or a later PDSCH reception after MSG3 PUSCH transmission). If contention resolution is not successful after MSG3 (re)transmission(s), the UE goes back to MSG1 transmission and repeats the RA procedure.

The MSGA of the 2-step RA type includes a preamble on PRACH and a payload on PUSCH. After MSGA transmission, the UE monitors PDCCH for scheduling a PDSCH reception providing a RAR within a configured window. For CFRA, dedicated preamble and PUSCH resource are configured for MSGA transmission and, upon receiving a RAR from the network, the UE ends the RA procedure. For CB-RA, if contention resolution is successful upon receiving the RAR, the UE ends the RA procedure; while if fallback indication is received in MSGB, the UE transmits a MSG3 PUSCH using the UL grant in the fallback indication and monitors PDCCH for scheduling of PDSCH receptions for contention resolution. If contention resolution is not successful after MSG3 (re)transmission(s), the UE goes back to MSGA transmission.

In certain embodiments, if the UE does not complete a RA procedure with 2-step RA type after a number of MSGA transmissions, the UE can be configured to switch to CB-RA with 4-step RA type.

For random access on a cell configured with a supplementary uplink (SUL) carrier, the network can indicate which carrier to use (UL or SUL). Otherwise, the UE selects the SUL carrier when the measured RSRP is smaller than a broadcast RSRP threshold. The UE performs carrier selection before selecting between a 2-step and a 4-step RA type. The RSRP threshold for selecting between a 2-step and a 4-step RA type can be configured separately for UL and SUL carriers. The UE performs all transmissions of a RA procedure on the selected carrier. In one example, the UE can perform some of the RA steps on a different UL carrier, based on gNB configuration or indication.

In certain embodiments, when a UE (such as the UE 116) is configured with carrier aggregation (CA) operation, the UE performs a 2-step RA type only on the PCell while a PDSCH reception for contention resolution can be cross-scheduled on a SCell by the PCell.

In certain embodiments, when a UE (such as the UE 116) is configured for CA operation and for a 4-step RA type, the UE performs the first three steps of CB-RA on the PCell while PDSCH reception for contention resolution (step 4) can be cross-scheduled by the PCell. For a CFRA on PCell, the UE performs all RA steps on the PCell. CFRA on SCell can (only) be initiated by the gNB to establish timing advance for a secondary TAG; the gNB initiates the CFRA with a PDCCH order (step 0) on a scheduling cell of an activated SCell of the secondary TAG, the UE transmits a PRACH (step 1) on the SCell indicated by the PDCCH order, and receives a PDSCH with RAR (step 2) on the PCell. In one example, for CFRA on PCell or SCell, the UE can receive a PDSCH reception with RAR on an SCell that is configured by the network or indicated in the PDCCH scheduling the RAR.

The PRACH preamble sequences can be of different lengths such as four lengths. For example, a sequence length 839 applies with subcarrier spacing (SCS) of 1.25 kHz or 5 kHz, a sequence length 139 applies with SCS of 15, 30, 60 or 120 kHz, and sequence lengths of 571 and 1151 apply with SCS of 30 kHz and 15 kHz, respectively. For another example, sequence length 839 supports unrestricted sets and restricted sets of Type A and Type B, while sequence lengths 139, 571, and 1151 support unrestricted sets only. In certain embodiments, a sequence length 839 is only used for operation with licensed channel access while sequence length 139 can be used for operation with either licensed or shared spectrum channel access. Sequence lengths of 571 and 1151 can be used only for operation with shared spectrum channel access.

A long PRACH preamble with L=839 subcarriers and an SCS=1.25 kHz or SCS=5 kHZ can span a bandwidth of about 6 RBs or 24 RBs (with respect to a 15-kHz frequency grid), respectively. For FR2, a short PRACH preamble with L=139 subcarriers can span about 12 RBs in the numerology of the PRACH preamble.

In certain embodiments, multiple PRACH preamble formats are defined with one or more symbols and different cyclic prefix and guard time. A UE (such as the UE 116) is indicated a PRACH preamble configuration to use by system information.

The UE calculates the PRACH transmit power for a PRACH retransmission based on a most recent pathloss estimate and a value of a power ramping counter. If prior to a PRACH retransmission, a UE (such as the UE 116) changes the spatial domain transmission filter, Layer 1 notifies higher layers to suspend the power ramping counter. If the UE transmits a PRACH with reduced power in a transmission occasion, or if the UE does not transmit a PRACH in a transmission occasion, due a CA/DC power allocation, Layer 1 may notify higher layers to suspend the corresponding power ramping counter.

System information provides to a UE (such as the UE 116) information for an association between a corresponding SSB and resources for a RA procedure. The RSRP threshold for SSB selection for RACH resource association is configurable by the network.

During the RA procedure, the following identities are also used. One identity, denoted as RA-radio network temporary identifier (RA-RNTI), corresponds to an identification of the DCI format scheduling a PDSCH reception with a RAR. Another identity denoted as temporary cell-RNTI (C-RNTI), corresponds to a UE identification temporarily used for scheduling during the RA procedure. Another identity denoted as random value for contention resolution (also known as a contention resolution identity), corresponds to a UE identification temporarily used for contention resolution purposes during the RA procedure.

Random access preambles can only be transmitted in the time resources obtained from predetermined Tables depending on a frequency range and a spectrum type (shared or non-shared). The PRACH configuration index is given by the higher-layer parameter prach-ConfigurationIndex, or by msgA-PRACH-ConfigurationIndex if configured.

Random access preambles can only be transmitted in the frequency resources given by either the higher-layer parameter msg1-FrequencyStart or msgA-RO-FrequencyStart, if configured. The PRACH frequency resources $n_{RA} \in \{0, 1, \ldots, M-1\}$, where M equals the higher-layer parameter msg1-FDM or msgA-RO-FDM if configured, are numbered in increasing order within the initial uplink bandwidth part during initial access, starting from the lowest frequency. Otherwise, $n_{RA}$ are numbered in increasing order within the active uplink bandwidth part, starting from the lowest frequency.

For the purpose of slot numbering, subcarrier spacing can be based on 15 kHz for FR1 and 60 kHz for FR2.

During initialization of a random-access procedure, when the Random Access procedure is initiated on a Serving Cell, to determine an uplink carrier for the random access procedure, the MAC entity shall perform a task, as described in Syntax (2).

Syntax (2)

1> if the carrier to use for the Random Access procedure is explicitly signaled:

2> select the signaled carrier for performing Random Access procedure;

2> set the PCMAX to PCMAX,f,c of the signaled carrier.

1> else if the carrier to use for the Random Access procedure is not explicitly signaled; and 1> if the Serving Cell for the Random Access procedure is configured with supplementary uplink as specified in REF6; and 1> if the RSRP of the downlink pathloss reference is less than rsrp-ThresholdSSB-SUL:

2> select the SUL carrier for performing Random Access procedure;

2> set the PCMAX to PCMAX,f,c of the SUL carrier.

1> else:

2> select the normal upink (NUL) carrier for performing Random Access procedure;

2> set the PCMAX to PCMAX,f,c of the NUL carrier.

In certain embodiments, msgA-RSRP-Threshold is an RSRP threshold for selection between 2-step RA type and 4-step RA type when both 2-step and 4-step RA type Random Access Resources are configured in the UL BWP.

When the Random-Access procedure is initiated on a Serving Cell, for selection of RA type between Type-1 RA (2-step RA) vs. Type-2 RA (4-step RA), the MAC entity shall perform a task, as described in Syntax (3).

Syntax (3)

1> if the Random Access procedure is initiated by PDCCH order and if the ra-PreambleIndex explicitly provided by PDCCH is not 0b000000; or 1> if the Random Access procedure was initiated for SI request (as specified in REF6) and the Random Access Resources for SI request have been explicitly provided by RRC; or 1> if the Random Access procedure was initiated for SpCell beam failure recovery (as specified in REF5) and if the contention-free Random Access Resources for beam failure recovery request for 4-step RA type have been explicitly provided by RRC for the BWP selected for Random Access procedure; or 1> if the Random Access procedure was initiated for reconfiguration with sync and if the contention-free Random Access Resources for 4-step RA type have been explicitly provided in rach-ConfigDedicated for the BWP selected for Random Access procedure:

2> set the RA_TYPE to 4-stepRA.

1> else if the BWP selected for Random Access procedure is configured with both 2-step and 4-step RA type Random Access Resources and the RSRP of the downlink pathloss reference is above msgA-RSRP-Threshold; or 1> if the BWP selected for Random Access procedure is only configured with 2-step RA type Random Access resources (i.e., no 4-step RACH RA type resources configured); or 1> if the Random Access procedure was initiated for reconfiguration with sync and if the contention-free Random Access Resources for 2-step RA type have been explicitly provided in rach-ConfigDedicated for the BWP selected for Random Access procedure:

2> set the RA_TYPE to 2-stepRA.

1> else:

2> set the RA_TYPE to 4-stepRA.

In certain embodiments the UE performs random access resource selection as follows.

If the selected RA_TYPE is set to 4-stepRA, the MAC entity shall perform a task, as described in Syntax (4).

Syntax (4)

1> if the Random Access procedure was initiated for SpCell beam failure recovery; and 1> if the beamFailureRecoveryTimer is either running or not configured; and 1> if the contention-free Random Access Resources for beam failure recovery request associated with any of the SSBs and/or CSI-RSs have been explicitly provided by RRC; and 1> if at least one of the SSBs with SS-RSRP above rsrp-ThresholdSSB amongst the SSBs in candidateBeamRSList or the CSI-RSs with CSI-RSRP above rsrp-ThresholdCSI-RS amongst the CSI-RSs in candidateBeamRSList is available:

2> select an SSB with SS-RSRP above rsrp-ThresholdSSB amongst the SSBs in candidateBeamRSList or a CSI-RS with CSI-RSRP above rsrp-ThresholdCSI-RS amongst the CSI-RSs in candidateBeamRSList;

2> if CSI-RS is selected, and there is no ra-PreambleIndex associated with the selected CSI-RS:

3> set the PREAMBLE_INDEX to a ra-PreambleIndex corresponding to the SSB in candidateBeamRSList which is quasi-colocated with the selected CSI-RS as specified in REF4.

2> else:

3> set the PREAMBLE_INDEX to a ra-PreambleIndex corresponding to the selected SSB or CSI-RS from the set of Random Access Preambles for beam failure recovery request.

1> else if the ra-PreambleIndex has been explicitly provided by PDCCH; and

1> if the ra-PreambleIndex is not 0b000000:

2> set the PREAMBLE_INDEX to the signaled ra-PreambleIndex;

2> select the SSB signaled by PDCCH.

1> else if the contention-free Random Access Resources associated with SSBs have been explicitly provided in rach-ConfigDedicated and at least one SSB with SS-RSRP above rsrp-ThresholdSSB amongst the associated SSBs is available:

2> select an SSB with SS-RSRP above rsrp-ThresholdSSB amongst the associated SSBs;

2> set the PREAMBLE_INDEX to a ra-PreambleIndex corresponding to the selected SSB.

1> else if the contention-free Random Access Resources associated with CSI-RSs have been explicitly provided in rach-ConfigDedicated and at least one CSI-RS with CSI-RSRP above rsrp-ThresholdCSI-RS amongst the associated CSI-RSs is available:

2> select a CSI-RS with CSI-RSRP above rsrp-ThresholdCSI-RS amongst the associated CSI-RSs;

2> set the PREAMBLE_INDEX to a ra-PreambleIndex corresponding to the selected CSI-RS.

1> else if the Random Access procedure was initiated for SI request (as specified in REF6); and 1> if the Random Access Resources for SI request have been explicitly provided by RRC:

2> if at least one of the SSBs with SS-RSRP above rsrp-ThresholdSSB is available:

3> select an SSB with SS-RSRP above rsrp-ThresholdSSB.

2> else:

3> select any SSB.

2> select a Random Access Preamble corresponding to the selected SSB, from the Random Access Preamble(s) determined according to ra-Preamble-StartIndex as specified in REF6];

2> set the PREAMBLE_INDEX to selected Random Access Preamble.

1> else (i.e. for the contention-based Random Access preamble selection):

2> if at least one of the SSBs with SS-RSRP above rsrp-ThresholdSSB is available:

3> select an SSB with SS-RSRP above rsrp-ThresholdSSB.

2> else:

3> select any SSB.

If the selected RA_TYPE is set to 2-stepRA, the MAC entity shall perform a task, as described in Syntax (5).

Syntax (5)

1> if the contention-free 2-step RA type Resources associated with SSBs have been explicitly provided in rach-ConfigDedicated and at least one SSB with SS-RSRP above msgA-RSRP-ThresholdSSB amongst the associated SSBs is available:

2> select an SSB with SS-RSRP above msgA-RSRP-ThresholdSSB amongst the associated SSBs;

2> set the PREAMBLE_INDEX to a ra-PreambleIndex corresponding to the selected SSB.

1> else (i.e. for the contention-based Random Access Preamble selection):

2> if at least one of the SSBs with SS-RSRP above msgA-RSRP-ThresholdSSB is available:

3> select an SSB with SS-RSRP above msgA-RSRP-ThresholdSSB.

2> else:

3> select any SSB.

In certain embodiments, prior to initiation of the physical random-access procedure, Layer 1 receives from higher layers a set of SS/PBCH block indexes and provides to higher layers a corresponding set of RSRP measurements.

In certain embodiments, prior to initiation of the physical random-access procedure, Layer 1 may receive from higher layers an indication to perform a Type-1 random access procedure or a Type-2 random access procedure.

In certain embodiments, prior to initiation of the physical random-access procedure, Layer 1 receives information from the higher layers. For example, Layer 1 can receives information from the higher that includes configuration of physical random-access channel (PRACH) transmission parameters (PRACH preamble format, time resources, and frequency resources for PRACH transmission). For example, Layer 1 can receives information from the higher that includes parameters for determining the root sequences and their cyclic shifts in the PRACH preamble sequence set (index to logical root sequence table, cyclic shift ($N_{CS}$), and set type (unrestricted, restricted set A, or restricted set B)).

From the physical layer perspective, the Type-1 L1 random access procedure includes the transmission of random-access preamble (Msg1) in a PRACH, RAR message with a PDCCH/PDSCH (Msg2), and when applicable, the transmission of a PUSCH scheduled by a RAR UL grant, and PDSCH for contention resolution.

From the physical layer perspective, the Type-2 L1 random access procedure includes the transmission of random-access preamble in a PRACH and of a PUSCH (MsgA) and the reception of a RAR message with a PDCCH/PDSCH (MsgB), and when applicable, the transmission of a PUSCH scheduled by a fallback RAR UL grant, and PDSCH for contention resolution.

If a random-access procedure is initiated by a PDCCH order to the UE, a PRACH transmission is with a same SCS as a PRACH transmission initiated by higher layers.

If a UE is configured with two UL carriers for a serving cell and the UE detects a PDCCH order, the UE uses the UL/SUL indicator field value from the detected PDCCH order to determine the UL carrier for the corresponding PRACH transmission.

Physical random-access procedure is triggered upon request of a PRACH transmission by higher layers or by a PDCCH order. A configuration by higher layers for a PRACH transmission includes (i) a configuration for PRACH transmission and (ii) a preamble index, a preamble SCS, $P_{PRACH,target}$, a corresponding RA-RNTI, and a PRACH resource.

A PRACH is transmitted using the selected PRACH format with transmission power $P_{PRACH,b,f,c}(i)$ on the indicated PRACH resource.

For Type-1 random access procedure, a UE is provided a number N of SS/PBCH block indexes associated with one PRACH occasion and a number R of contention-based preambles per SS/PBCH block index per valid PRACH occasion by ssb-perRACH-OccasionAndCB-PreamblesPerSSB.

For Type-2 random access procedure with common configuration of PRACH occasions with Type-1 random access procedure, a UE is provided a number N of SS/PBCH block indexes associated with one PRACH occasion by ssb-perRACH-OccasionAndCB-PreamblesPerSSB and a number Q of contention-based preambles per SS/PBCH block index per valid PRACH occasion by msgA-CB-PreamblesPerSSB-PerSharedRO. The PRACH transmission can be on a subset of PRACH occasions associated with a same SS/PBCH block index within an SSB-random access channel (RACH) occasion (it is noted that RACH occasion can also be referred to as RO) mapping cycle for a UE provided with a PRACH mask index by msgA-SSB-SharedRO-MaskIndex.

For Type-2 random access procedure with separate configuration of PRACH occasions with Type-1 random access procedure, a UE is provided a number N of SS/PBCH block indexes associated with one PRACH occasion and a number R of contention-based preambles per SS/PBCH block index per valid PRACH occasion by msgA-SSB-PerRACH-OccasionAndCB-PreamblesPerSSB when provided; otherwise, by ssb-perRACH-OccasionAndCB-PreamblesPerSSB.

For Type-1 random access procedure, or for Type-2 random access procedure with separate configuration of PRACH occasions from Type 1 random access procedure, if N<1, one SS/PBCH block index is mapped to 1/N consecutive valid PRACH occasions and R contention based preambles with consecutive indexes associated with the SS/PBCH block index per valid PRACH occasion starting from preamble index 0. If N≥1, R contention based preambles with consecutive indexes associated with SS/PBCH block index n, $0 \leq n \leq N-1$, per valid PRACH total occasion start from preamble index $$n \cdot N_{preamble}^{total} / N \text{ where } N_{preamble}^{total}$$

is provided by totalNumberOfRA-Preambles for Type-1 random access procedure, or by msgA-TotalNumberOfRA-Preambles for Type-2 random access procedure with separate configuration of PRACH occasions from a Type 1 random access procedure, and is an integer multiple of N.

For Type-2 random access procedure with common configuration of PRACH occasions with Type-1 random access procedure, if N<1, one SS/PBCH block index is mapped to 1/N consecutive valid PRACH occasions and Q contention-based preambles with consecutive indexes associated with the SS/PBCH block index per valid PRACH occasion start from preamble index R. If $N \geq 1$, Q contention based preambles with consecutive indexes associated with SS/PBCH block index n, $0 \leq n \leq N-1$, per valid PRACH occasion start from preamble index $$n \cdot N_{preamble}^{total} / N + R, \text{ where } N_{preamble}^{total}$$

is provided by totalNumberOfRA-Preambles for Type-1 random access procedure.

For link recovery, a UE is provided N SS/PBCH block indexes associated with one PRACH occasion by ssb-perRACH-Occasion in BeamFailureRecoveryConfig. For a dedicated RACH configuration provided by RACH-ConfigDedicated, if cfra is provided, a UE is provided N SS/PBCH block indexes associated with one PRACH occasion by ssb-perRACH-Occasion in occasions. If N<1, one SS/PBCH block index is mapped to 1/N consecutive valid PRACH occasions. If $N \geq 1$, all consecutive N SS/PBCH block indexes are associated with one PRACH occasion.

In certain embodiments, SS/PBCH block indexes provided by ssb-PositionsInBurst in SIB1 or in ServingCell-ConfigCommon are mapped to valid PRACH occasions in the following order. First, in increasing order of preamble indexes within a single PRACH occasion. Second, in increasing order of frequency resource indexes for frequency multiplexed PRACH occasions. Third, in increasing order of time resource indexes for time multiplexed PRACH occasions within a PRACH slot. Fourth, in increasing order of indexes for PRACH slots.

An association period, starting from frame zero, for mapping SS/PBCH block indexes to PRACH occasions is the smallest value in the set determined by the PRACH configuration period such that $$N_{Tx}^{SSB}$$

SS/PBCH block indexes are mapped at least once to the PRACH occasions within the association period, where a UE obtains $$N_{Tx}^{SSB}$$

from the value of ssb-PositionsInBurst in SIB1 or in Serv-ingCellConfigCommon. If after an integer number of SS/PBCH block indexes to PRACH occasions mapping cycles within the association period there is a set of PRACH occasions or PRACH preambles that are not mapped to $$N_{Tx}^{SSB}$$

SS/PBCH block indexes, no SS/PBCH block indexes are mapped to the set of PRACH occasions or PRACH preambles. An association pattern period includes one or more association periods and is determined so that a pattern between PRACH occasions and SS/PBCH block indexes repeats at most every 160 msec. PRACH occasions not associated with SS/PBCH block indexes after an integer number of association periods, if any, are not used for PRACH transmissions.

For a PRACH transmission triggered by a PDCCH order, the PRACH mask index field, if the value of the random-access preamble index field is not zero, indicates the PRACH occasion for the PRACH transmission where the PRACH occasions are associated with the SS/PBCH block index indicated by the SS/PBCH block index field of the PDCCH order.

For a PRACH transmission triggered by higher layers, if ssb-ResourceList is provided, the PRACH mask index is indicated by ra-ssb-OccasionMaskIndex which indicates the PRACH occasions for the PRACH transmission where the PRACH occasions are associated with the selected SS/PBCH block index.

The PRACH occasions are mapped consecutively per corresponding SS/PBCH block index. The indexing of the PRACH occasion indicated by the mask index value is reset per mapping cycle of consecutive PRACH occasions per SS/PBCH block index. The UE selects for a PRACH transmission the PRACH occasion indicated by PRACH mask index value for the indicated SS/PBCH block index in the first available mapping cycle.

In certain embodiments, for the indicated preamble index, the ordering of the PRACH occasions is based on the following. First, in increasing order of frequency resource indexes for frequency multiplexed PRACH occasions. Second, in increasing order of time resource indexes for time multiplexed PRACH occasions within a PRACH slot. Third, in increasing order of indexes for PRACH slots.

For a PRACH transmission triggered upon request by higher layers, a value of ra-OccasionList, if csirs-Re-sourceList is provided, indicates a list of PRACH occasions for the PRACH transmission where the PRACH occasions are associated with the selected CSI-RS index indicated by csi-RS. The indexing of the PRACH occasions indicated by ra-OccasionList is reset per association pattern period.

In response to a PRACH transmission, a UE attempts to detect a DCI format 1_0 with cyclic redundancy check (CRC) scrambled by a corresponding RA-RNTI during a window controlled by higher layers REF5. The window starts at the first symbol of the earliest CORESET the UE is configured to receive PDCCH for Type1-PDCCH common search space (CSS) set, that is at least one symbol, after the last symbol of the PRACH occasion corresponding to the PRACH transmission, where the symbol duration corresponds to the SCS for Type1-PDCCH CSS set. The length of the window in number of slots, based on the SCS for Type1-PDCCH CSS set, is provided by ra-ResponseWin-dow.

If the UE detects the DCI format 1_0 with CRC scrambled by the corresponding RA-RNTI and least significant bits (LSBs) of a system frame number (SFN) field in the DCI format 1_0, if included and applicable, are same as corresponding LSBs of the SFN where the UE transmitted PRACH, and the UE receives a transport block in a corresponding PDSCH within the window, the UE passes the transport block to higher layers. The higher layers parse the transport block for a random-access preamble identity (RAPID) associated with the PRACH transmission. If the higher layers identify the RAPID in RAR message(s) of the transport block, the higher layers indicate an uplink grant to the physical layer. This is referred to as RAR UL grant in the physical layer.

A RAR UL grant schedules a PUSCH transmission from the UE. The contents of the RAR UL grant, starting with the most significant bit (MSB) and ending with the least significant bit (LSB), are given in Table 8.2-1 of REF3.

If the value of the frequency hopping flag is zero, the UE transmits the PUSCH without frequency hopping; otherwise, the UE transmits the PUSCH with frequency hopping.

The UE determines the modulation and coding scheme (MCS) of the PUSCH transmission from the first sixteen indexes of the applicable MCS index table for PUSCH as described in REF4.

The transmit power control (TPC) command value $\delta_{msg2,b,f,c}$ is used for setting the power of the PUSCH transmission.

The CSI request field is reserved.

The ChannelAccess-CPext field indicates a channel access type and CP extension for operation with shared spectrum channel access REF3 if ChannelAccessMode–r16="semistatic" is provided in Table (1), below. It is noted that Table (1) describes Random Access Response Grant Content field size.

TABLE 1

| RAR grant field | Number of bits |
|---|---|
| Frequency hopping flag | 1 |
| PUSCH frequency resource allocation | 14, for operation without shared spectrum channel access 12, for operation with shared spectrum channel access |
| PUSCH time resource allocation | 4 |
| MCS | 4 |
| TPC command for PUSCH | 3 |
| CSI request | 1 |
| ChannelAccess-CPext | 0, for operation without shared spectrum channel access 2, for operation with shared spectrum channel access |

In certain embodiments, a UE (such as the UE 116) transmits a transport block in a PUSCH scheduled by a RAR UL grant in a corresponding RAR message using redundancy version number 0. If a temporary cell—RNTI (TC-RNTI) is provided by higher layers, the scrambling initialization of the PUSCH corresponding to the RAR UL grant is by TC-RNTI. Otherwise, the scrambling initialization of the PUSCH corresponding to the RAR UL grant in clause 8.2 is by C-RNTI. Msg3 PUSCH retransmissions, if any, of the transport block, are scheduled by a DCI format 0_0 with CRC scrambled by a TC-RNTI provided in the corresponding RAR message REF5. The UE transmits the PUSCH scheduled by a RAR UL grant without repetitions.

In response to a PUSCH transmission scheduled by a RAR UL grant when a UE has not been provided a C-RNTI, the UE attempts to detect a DCI format 1_0 with CRC scrambled by a corresponding TC-RNTI scheduling a PDSCH that includes a UE contention resolution identity REF5. In response to the PDSCH reception with the UE contention resolution identity, the UE transmits HARQ-ACK information in a PUCCH. The PUCCH transmission is within a same active UL BWP as the PUSCH transmission. A minimum time between the last symbol of the PDSCH reception and the first symbol of the corresponding PUCCH transmission with the HARQ-ACK information is equal to $N_{T,1}+0.5$ msec. $N_{T,1}$ is a time duration of $N_1$ symbols corresponding to a PDSCH processing time for UE processing capability 1 when additional PDSCH DM-RS is configured. For $\mu=0$, the UE assumes $N_{1,0}=14$, REF4.

When detecting a DCI format in response to a PUSCH transmission scheduled by a RAR UL grant, as described in REF5, or corresponding PUSCH retransmission scheduled by a DCI format 0_0 with CRC scrambled by a TC-RNTI provided in the corresponding RAR message REF5, the UE may assume the PDCCH carrying the DCI format has the same DM-RS antenna port quasi co-location properties, as described in REF4, as for a SS/PBCH block the UE used for PRACH association, regardless of whether or not the UE is provided TCI-State for the CORESET where the UE receives the PDCCH with the DCI format.

If a UE does not have dedicated PUCCH resource configuration, provided by PUCCH-ResourceSet in PUCCH-Config, a PUCCH resource set is provided by pucch-ResourceCommon through an index to a row of a predetermined Table for transmission of HARQ-ACK information on PUCCH in an initial UL BWP of $$N_{BWP}^{size}$$

physical resource blocks (PRBs).

The PUCCH resource set includes sixteen resources, each corresponding to a PUCCH format, a first symbol, a duration, a PRB offset $$RB_{BWP}^{offset},$$

and a cyclic shift index set for a PUCCH transmission.

The UE transmits a PUCCH using frequency hopping if not provided useInterlacePUCCH-PUSCH in BWP-Uplink-Common; otherwise, the UE transmits a PUCCH without frequency hopping.

An orthogonal cover code with index 0 is used for a PUCCH resource with PUCCH format 1 in the predetermined Table.

The UE transmits the PUCCH using the same spatial domain transmission filter as for a PUSCH transmission scheduled by a RAR UL grant.

For a Type-2 random access procedure, a UE transmits a PUSCH, when applicable, after transmitting a PRACH. The UE encodes a transport block provided for the PUSCH transmission using redundancy version number 0. The PUSCH transmission is after the PRACH transmission by at least N symbols where N=2 for $\mu=0$ or $\mu=1$, N=4 for $\mu=2$ or $\mu=3$, and $\mu$ is the SCS configuration for the active UL BWP.

A UE (such as the UE 116) does not transmit a PUSCH in a PUSCH occasion if the PUSCH occasion associated with a DM-RS resource is not mapped to a preamble of valid PRACH occasions or if the associated PRACH preamble is not transmitted. A UE can transmit a PRACH preamble in a valid PRACH occasion if the PRACH preamble is not mapped to a valid PUSCH occasion.

A mapping between one or multiple PRACH preambles and a PUSCH occasion associated with a DM-RS resource is per PUSCH configuration.

A UE determines time resources and frequency resources for PUSCH occasions in an active UL BWP from msgA-PUSCH-Config for the active UL BWP. If the active UL BWP is not the initial UL BWP and msgA-PUSCH-Config is not provided for the active UL BWP, the UE uses the msgA-PUSCH-Config provided for the initial UL BWP.

For mapping one or multiple preambles of a PRACH slot to a PUSCH occasion associated with a DM-RS resource, a UE determines a first slot for a first PUSCH occasion in an active UL BWP from msgA-PUSCH-TimeDomainOffset that provides an offset, in number of slots in the active UL BWP, relative to the start of a PUSCH slot including the start of each PRACH slot. The UE does not expect to have a PRACH preamble transmission and a PUSCH transmission with a msgA in a PRACH slot or in a PUSCH slot, or to have overlapping msgA PUSCH occasions for a MsgA PUSCH configuration. The UE expects that a first PUSCH occasion in each slot has a same start and length indicator value (SLIV) for a PUSCH transmission that is provided by startSymbolAndLengthMsgA-PO or msgA-PUSCH-time-DomainAllocation.

Consecutive PUSCH occasions within each slot are separated by guardPeriodMsgA-PUSCH symbols and have same duration. A number $N_t$ of time domain PUSCH occasions in each slot is provided by nrofMsgA-PO-perSlot and a number $N_s$ of consecutive slots that include PUSCH occasions is provided by nrofSlotsMsgA-PUSCH.

A UE (such as the UE 116) is provided a DM-RS configuration for a PUSCH transmission in a PUSCH occasion in an active UL BWP by msgA-DMRS-Config.

A UE is provided an MCS for data information in a PUSCH transmission for a PUSCH occasion by msgA-MCS.

A PUSCH transmission uses a same spatial filter as an associated PRACH transmission.

A UE (such as the UE 116) determines whether (or not) to apply transform precoding for a MsgA PUSCH transmission.

A PUSCH occasion for PUSCH transmission is defined by a frequency resource and a time resource and is associated with a DM-RS resource. The DM-RS resources are provided by msgA-DMRS-Config.

Each consecutive number of $N_{preamble}$ preamble indexes from valid PRACH occasions in a PRACH slot (first, in increasing order of preamble indexes within a single PRACH occasion, second, in increasing order of frequency resource indexes for frequency multiplexed PRACH occasions, and third, in increasing order of time resource indexes for time multiplexed PRACH occasions within a PRACH slot) are mapped to a valid PUSCH occasion and the associated DM-RS resource (first, in increasing order of frequency resource indexes $f_{id}$ for frequency multiplexed PUSCH occasions, second, in increasing order of DM-RS resource indexes within a PUSCH occasion, where a DM-RS resource index $DMRS_{id}$ is determined first in an ascending order of a DM-RS port index and second in an ascending order of a DM-RS sequence index, third, in increasing order of time resource indexes $t_{id}$ for time multiplexed PUSCH occasions within a PUSCH slot, and fourth, in increasing order of indexes for $N_s$ PUSCH slots). It is noted that Equation (1), describes $N_{preamble}$.

$$N_{preamble} = \text{ceil}(T_{preamble}/T_{PUSCH}) \tag{1}$$

In Equation (1), $T_{preamble}$ is a total number of valid PRACH occasions per association pattern period multiplied by the number of preambles per valid PRACH occasion provided by rach-ConfigCommonTwoStepRA, and $T_{PUSCH}$ is a total number of valid PUSCH occasions per PUSCH configuration per association pattern period multiplied by the number of DM-RS resource indexes per valid PUSCH occasion provided by msgA-DMRS-Config.

In response to a transmission of a PRACH, if the PRACH preamble is not mapped to a valid PUSCH occasion, a UE attempts to detect a DCI format 1_0 with CRC scrambled by a corresponding MsgB-RNTI during a window controlled by higher layers REF5. The window starts at the first symbol of the earliest CORESET the UE is configured to receive PDCCH for Type1-PDCCH CSS set, which is at least one symbol, after the last symbol of the PRACH occasion corresponding to the PRACH transmission, where the symbol duration corresponds to the SCS for Type1-PDCCH CSS set. The length of the window in number of slots, based on the SCS for Type1-PDCCH CSS set, is provided by msgB-ResponseWindow.

If the UE detects the DCI format 1_0, with CRC scrambled by the corresponding MsgB-RNTI and LSBs of a SFN field in the DCI format 1_0, if applicable, are same as corresponding LSBs of the SFN where the UE transmitted PRACH, and the UE receives a transport block in a corresponding PDSCH within the window, the UE passes the transport block to higher layers. The higher layers indicate to the physical layer (i) an uplink grant if the RAR message(s) is for fallbackRAR and a random access preamble identity (RAPID) associated with the PRACH transmission is identified, and the UE procedure continues as described in a Type-1 random access procedure, when the UE detects a RAR UL grant, or (ii) transmission of a PUCCH with HARQ-ACK information having ACK value if the RAR message(s) is for successRAR. Here a PUCCH resource for the transmission of the PUCCH is indicated by PUCCH resource indicator field of 4 bits in the successRAR from a PUCCH resource set that is provided by pucch-ResourceCommon. Additionally, a slot for the PUCCH transmission is indicated by a HARQ Feedback Timing Indicator field of 3 bits in the successRAR having a value k from {1, 2, 3, 4, 5, 6, 7, 8} and, with reference to slots for PUCCH transmission having duration $T_{slot}$, the slot is determined as n+k+A, where n is a slot of the PDSCH reception and A is as defined in REF4. It is noted that the UE does not expect the first symbol of the PUCCH transmission to be after the last symbol of the PDSCH reception by a time smaller than $N_{T,1}$+0.5 msec where $N_{T,1}$ is the PDSCH processing time for UE processing capability 1 REF4. For operation with shared spectrum channel access, a channel access type and CP extension REF5 for a PUCCH transmission is indicated by a ChannelAccess-CPext field in the successRAR if ChannelAccessMode-r16="semistatic" is provided. The PUCCH transmission is with a same spatial domain transmission filter and in a same active UL BWP as a last PUSCH transmission.

For Msg1/PRACH, a UE Tx beam/spatial transmission filter can be up to UE implementation.

For Msg2/RAR, a UE Rx beam can be same as a UE Rx beam for reception of DL RS associated with PRACH. If the UE detects a DCI format 1_0 with CRC scrambled by the corresponding RA-RNTI and LSBs of a SFN field in the DCI format 1_0, if included and applicable, are same as corresponding LSBs of the SFN where the UE transmitted the PRACH, and the UE receives a transport block in a corresponding PDSCH, the UE may assume same DM-RS antenna port quasi co-location properties as for a SS/PBCH block or a CSI-RS resource the UE used for PRACH association, regardless of whether or not the UE is provided TCI-State for the CORESET where the UE receives the PDCCH with the DCI format 1_0.

For Msg2/RAR PDSCH, an MCS is provided in a scheduling DCI format 1_0 that is carried by Msg2/RAR PDCCH. In response to a PRACH transmission, a UE attempts to detect a DCI format 1_0 with CRC scrambled by a corresponding RA-RNTI during a window controlled by higher layers. The window starts at the first symbol of the earliest CORESET the UE is configured to receive PDCCH for Type1-PDCCH CSS set that is at least one symbol after the last symbol of the PRACH occasion corresponding to the PRACH transmission, where the symbol duration corresponds to the SCS for Type1-PDCCH CSS set. The length of the window in number of slots, based on the SCS for Type1-PDCCH CSS set, is provided by ra-ResponseWindow.

For Msg3/A PUSCH, a UE Tx beam can be up to UE implementation, or can be same as a UE Tx beam for Msg1/A PRACH or can be same as a refined Rx beam that the UE used for Msg2/RAR reception.

For Msg3 PUSCH in 4-step RACH, an MCS is indicated in a RAR UL grant that is carried by Msg2/RAR PDSCH. For MsgA PUSCH in 2-step RACH, higher layer signaling such as SIB or RRC configures an MCS for MsgA-PUSCH.

For Msg4 PDSCH, UE can use a same UE Rx beam that the UE used for reception of the DL RS associated with PRACH. When detecting a DCI format in response to a PUSCH transmission scheduled by a RAR UL grant, or corresponding PUSCH retransmission scheduled by a DCI format 0_0 with CRC scrambled by a TC-RNTI provided in the corresponding RAR message, the UE may assume the PDCCH carrying the DCI format has the same DM-RS antenna port quasi co-location properties as for a SS/PBCH block the UE used for PRACH association, regardless of whether or not the UE is provided TCI-State for the CORESET where the UE receives the PDCCH with the DCI format.

For Msg4 PDSCH, an MCS is indicated in a scheduling DCI format 1_0 that is carried by Msg4 PDCCH.

PRACH enhancements can be considered, including multiple PRACH transmissions with the same beam, multiple PRACH transmissions with different beams, and PRACH enhancements with finer beam based on CSI-RS resources configured during initial access.

Msg4 PDSCH enhancements can be considered, including early CSI on Msg3 PUSCH for early link adaptation based on CSI-RS resources configured during initial access, scaling factor for transport block size (TBS) determination and PDSCH repetition.

Beam reporting during initial/random access procedure is intended to enhance Msg3 re-transmission, Msg4 initial transmission, Msg4 re-transmission and PDSCH out of RACH procedure while without dedicated RRC configuration. Beam reporting during initial/random access procedure can include reporting a best SSB beam, alternative SSB beam, or early CSI report in Msg3 PUSCH based on CSI-RS resources configured during initial access, as well as beam indication for the following steps for RACH procedure.

In certain embodiments, a UE (such as the UE 116) determines a transmission power for a PRACH, $P_{PRACH,b,f,c}$ (i), on active UL BWP b of carrier f of serving cell c based on DL RS for serving cell c in transmission occasion i as described in Equation (2).

$$P_{PRACH,b,f,c}(i)=\min\{P_{CMAX,f,c}(i),P_{PRACHtarget,f,c}+PL_{b,f,c}\}[dBm] \qquad (2)$$

In Equation (2), $P_{CMAX,f,c}$ (i), is the UE configured maximum output power defined in REF5, REF5, and REF10 for carrier f of serving cell c within transmission occasion i, $P_{PRACHtarget,f,c}$ is the PRACH target reception power PREAMBLE_RECEIVED_TARGET_POWER provided by higher layers REF5 for the active UL BWP b of carrier f of serving cell c, and $PL_{b,f,c}$ is a pathloss for the active UL BWP b of carrier f based on the DL RS associated with the PRACH transmission on the active DL BWP of serving cell c and calculated by the UE in dB as referenceSignalPower—higher layer filtered RSRP in dBm, where RSRP is defined in [TS 38.215] and the higher layer filter configuration is defined in REF6. If the active DL BWP is the initial DL BWP and for SS/PBCH block and CORESET multiplexing pattern 2 or 3, the UE determines $PL_{b,f,c}$ based on the SS/PBCH block associated with the PRACH transmission.

In certain embodiments, if a PRACH transmission from a UE is not in response to a detection of a PDCCH order by the UE, or is in response to a detection of a PDCCH order by the UE that triggers a contention based random access procedure, or is associated with a link recovery procedure where a corresponding index $q_{new}$ is associated with a SS/PBCH block, referenceSignalPower is provided by ss-PBCH-BlockPower.

If a PRACH transmission from a UE (such as the UE 116) is in response to a detection of a PDCCH order by the UE that triggers a contention-free random access procedure and depending on the DL RS that the DM-RS of the PDCCH order is quasi-collocated with, referenceSignalPower is provided by ss-PBCH-BlockPower or, if the UE is configured resources for a periodic CSI-RS reception or the PRACH transmission is associated with a link recovery procedure where a corresponding index $q_{new}$ is associated with a periodic CSI-RS configuration, referenceSignalPower is obtained by ss-PBCH-BlockPower and powerControlOffsetSS where powerControlOffsetSS provides an offset of CSI-RS transmission power relative to SS/PBCH block transmission power REF4. If powerControlOffsetSS is not provided to the UE, the UE assumes an offset of 0 dB. If the active TCI state for the PDCCH that provides the PDCCH order includes two RS, the UE expects that one RS is configured with qcl-Type set to 'typeD' and the UE uses the one RS when applying a value provided by powerControlOffsetSS.

If within a random access response window, the UE does not receive a random access response that contains a preamble identifier corresponding to the preamble sequence transmitted by the UE, the UE determines a transmission power for a subsequent PRACH transmission, if any, based on the power ramping procedure REF5. For example, the UE can set PREAMBLE_RECEIVED_TARGET_POWER as described in Equation (3)

PREAMBLE_RECEIVED_TARGET_POWER=
preambleReceivedTargetPower+DELTA_PRE-
AMBLE+(PREAMBLE_POWER_RAMPING_
COUNTER−1)×PREAMBLE_POWER_RAMP-
ING_STEP+POWER_OFFSET_2STEP_RA          (3)

If prior to a PRACH retransmission, a UE changes the spatial domain transmission filter, Layer 1 notifies higher layers to suspend the power ramping counter as described in REF5.

If due to power allocation to PUSCH/PUCCH/PRACH/SRS transmissions, or due to power allocation in EN-DC or NE-DC or NR-DC operation, or due to slot format determination, or due to the PUSCH/PUCCH/PRACH/SRS transmission occasions are in the same slot or the gap between a PRACH transmission and PUSCH/PUCCH/SRS transmission is small, the UE does not transmit a PRACH in a transmission occasion, Layer 1 notifies higher layers to suspend the corresponding power ramping counter. If due to power allocation to PUSCH/PUCCH/PRACH/SRS transmissions, or due to power allocation in EN-DC or NE-DC or NR-DC operation, the UE transmits a PRACH with reduced power in a transmission occasion, Layer 1 may notify higher layers to suspend the corresponding power ramping counter.

For PUCCH formats 1, 3, or 4, a UE (such as the UE 116) can be configured a number of slots, $$N_{PUCCH}^{repeat},$$

for repetitions of a PUCCH transmission by respective nrofSlots. If a UE is provided a PUCCH-config that includes subslotLengthForPUCCH, the UE does not expect the PUCCH-config to include nrofSlots.

For example, for $$N_{PUCCH}^{repeat} > 1,$$

then the UE repeats the PUCCH transmission with the uplink control information (UCI) over $$N_{PUCCH}^{repeat}$$

slots. Additionally in this example, a PUCCH transmission in each of the $$N_{PUCCH}^{repeat}$$

slots has a same number of consecutive symbols, as provided by nrofSymbols in PUCCH-format1, nrofSymbols in PUCCH-format3, or nrofSymbols in PUCCH-format4. A PUCCH transmission in each of the $$N_{PUCCH}^{repeat}$$

slots has a same first symbol, as provided by startingSymbolIndex in PUCCH-format1, startingSymbolIndex in PUCCH-format3, or startingSymbolIndex in PUCCH-format4. In this example, the UE is configured by interslotFrequencyHopping for determining whether or not to perform frequency hopping for PUCCH transmissions in different slots. If the UE is configured to perform frequency hopping for PUCCH transmissions across different slots, then the UE performs frequency hopping per slot. The UE can transmit the PUCCH starting from a first PRB, provided by startingPRB, in slots with even number and starting from the second PRB, provided by secondHopPRB, in slots with odd number. The slot indicated to the UE for the first PUCCH transmission has number 0 and each subsequent slot until the UE transmits the PUCCH in $$N_{PUCCH}^{repeat}$$

slots is counted regardless of whether or not the UE transmits the PUCCH in the slot. It is noted that the UE does not expect to be configured to perform frequency hopping for a PUCCH transmission within a slot. If the UE is not configured to perform frequency hopping for PUCCH transmissions across different slots and if the UE is configured to perform frequency hopping for a PUCCH transmission within a slot, the frequency hopping pattern between the first PRB and the second PRB is same within each slot.

If the UE determines that, for a PUCCH transmission in a slot, the number of symbols available for the PUCCH transmission is smaller than the value provided by nrofSymbols for the corresponding PUCCH format, the UE does not transmit the PUCCH in the slot.

A SS/PBCH block symbol is a symbol of an SS/PBCH block with candidate SS/PBCH block index corresponding to the SS/PBCH block index indicated to a UE by ssb-PositionsInBurst in SIB1 or ssb-PositionsInBurst in ServingCellConfigCommon.

For unpaired spectrum, the UE determines the $$N_{PUCCH}^{repeat}$$

slots for a PUCCH transmission starting from a slot indicated to the UE for HARQ-ACK reporting, or a slot determined for SR reporting or for CSI reporting and having (i) an UL symbol or flexible symbol that is not SS/PBCH block symbol provided by startingSymbolIndex in PUCCH-format1, or in PUCCH-format3, or in PUCCH-format4 as a first symbol, and (ii)—consecutive UL symbols or flexible symbols that are not SS/PBCH block symbols, starting from the first symbol, equal to or larger than a number of symbols provided by nrofsymbols in PUCCH-format1, or in PUCCH-format3, or in PUCCH-format4.

For paired spectrum or supplementary uplink band, the UE determines the $$N_{PUCCH}^{repeat}$$

slots for a PUCCH transmission as the $$N_{PUCCH}^{repeat}$$

consecutive slots starting from a slot indicated to the UE for HARQ-ACK reporting, or a slot determined for SR reporting or for CSI reporting.

If a UE (such as the UE 116) would transmit a PUCCH over a first number $$N_{PUCCH}^{repeat} > 1$$

of slots and the UE would transmit a PUSCH with repetition Type A over a second number of slots, and the PUCCH transmission would overlap with the PUSCH transmission in one or more slots, and the conditions for multiplexing the UCI in the PUSCH are satisfied in the overlapping slots, the UE transmits the PUCCH and does not transmit the PUSCH in the overlapping slots.

If a UE (such as the UE 116) would transmit a PUCCH over a first number $$N_{PUCCH}^{repeat} > 1$$

of slots and the UE would transmit a PUSCH with repetition Type B over a second number of slots, and the PUCCH transmission would overlap with actual PUSCH repetitions in one or more slots, and the conditions for multiplexing the UCI in the PUSCH are satisfied for the overlapping actual PUSCH repetitions, the UE transmits the PUCCH and does not transmit the overlapping actual PUSCH repetitions.

In certain embodiments, a UE (such as the UE 116) does not multiplex different UCI types in a PUCCH transmission with repetitions over $$N_{PUCCH}^{repeat} > 1$$

slots. If a UE would transmit a first PUCCH over more than one slot and at least a second PUCCH over one or more slots, and the transmissions of the first PUCCH and the second PUCCH would overlap in a number of slots then, for each slot of the number of slots and with UCI type priority of HARQ-ACK>SR>CSI with higher priority>CSI with lower priority. The UE does not expect the first PUCCH and any of the second PUCCHs to start at a same slot and include a UCI type with same priority. If the first PUCCH and any of the second PUCCHs include a UCI type with same priority, the UE transmits the PUCCH starting at an earlier slot and does not transmit the PUCCH starting at a later slot. If the first PUCCH and any of the second PUCCHs do not include a UCI type with same priority, the UE transmits the PUCCH that includes the UCI type with higher priority and does not transmit the PUCCH that include the UCI type with lower priority.

In certain embodiments, a UE (such as the UE 116) does not expect a PUCCH that is in response to a DCI format detection to overlap with any other PUCCH that does not satisfy the corresponding timing conditions.

If a UE such as the UE 116) would transmit a PUCCH over $$N_{PUCCH}^{repeat}$$

slots and the UE does not transmit the PUCCH in a slot from the $$N_{PUCCH}^{repeat}$$

slots due to overlapping with another PUCCH transmission in the slot, the UE counts the slot in the number of $$N_{PUCCH}^{repeat}$$

slots.

For PUSCH scheduled by DCI format 0_1, if pusch-RepTypeIndicatorDCI-0-1 is set to 'pusch-RepTypeB', the UE applies PUSCH repetition Type B procedure when determining the time domain resource allocation. For PUSCH scheduled by DCI format 0_2, if pusch-RepTypeIndicatorDCI-0-2 is set to 'pusch-RepTypeB', the UE applies PUSCH repetition Type B procedure when determining the time domain resource allocation. Otherwise, the UE applies PUSCH repetition Type A procedure when determining the time domain resource allocation for PUSCH scheduled by PDCCH.

In certain embodiments, for PUSCH repetition Type A, the starting symbol S relative to the start of the slot, and the number of consecutive symbols L counting from the symbol S allocated for the PUSCH are determined from the start and length indicator SLIV of the indexed row as described in Syntax (6), below. It is noted that in Syntax (6), $0 < L \leq 14\text{-}S$.

Syntax (6)

if $(L-1) \leq 7$, then $$SLIV = 14 \cdot (L-1) + S$$

else $$SLIV = 14 \cdot (14 - L + 1) + (14 - 1 - S)$$

For PUSCH repetition Type B, the starting symbol S relative to the start of the slot, and the number of consecutive symbols L counting from the symbol S allocated for the PUSCH are provided by startSymbol and length of the indexed row of the resource allocation table, respectively.

For PUSCH repetition Type A, the PUSCH mapping type is set to Type A or Type B.

For PUSCH repetition Type B, the PUSCH mapping type is set to Type B.

The UE shall consider the S and L combinations defined in table 6.1.2.1-1 of REF5, denoted as Table (2), as valid PUSCH allocations. It is noted that Table (2) describes Valid S and L combinations.

TABLE 2

| PUSCH mapping type | Normal cyclic prefix | | | Extended cyclic prefix | | |
|---|---|---|---|---|---|---|
| | S | L | S + L | S | L | S + L |
| Type A (repetition Type A only) | 0 | {4, . . . , 14} | {4, . . . , 14} | 0 | {4, . . . , 12} | {4, . . . , 12} |

TABLE 2-continued

| PUSCH mapping type | Normal cyclic prefix | | | Extended cyclic prefix | | |
|---|---|---|---|---|---|---|
| | S | L | S + L | S | L | S + L |
| Type B | $\{0, \ldots, 13\}$ | $\{1, \ldots, 14\}$ | $\{1, \ldots, 14\}$ for repetition Type A, $\{1, \ldots, 27\}$ for repetition Type B | $\{0, \ldots, 11\}$ | $\{1, \ldots, 12\}$ | $\{1, \ldots, 12\}$ for repetition Type A, $\{1, \ldots, 23\}$ for repetition Type B |

For PUSCH repetition Type A, when transmitting PUSCH scheduled by DCI format 0_1 or 0_2 in PDCCH with CRC scrambled with cell (C)-RNTI, MCS-C-RNTI, or configured scheduling (CS)-RNTI with new data indicator (NDI)=1, the number of repetitions K is determined as described in Syntax (7), below.

Syntax (6)

if numberOfRepetitions is present in the resource allocation table, the number of repetitions K is equal to numberOfRepetitions;

elseif the UE is configured with pusch-AggregationFactor, the number of repetitions K is equal to pusch-AggregationFactor;

otherwise K=1.

If a UE is configured with higher layer parameter pusch-TimeDomainAllocationListForMultiPUSCH, the UE does not expect to be configured with pusch-AggregationFactor.

For PUSCH repetition Type A, in case K>1, the same symbol allocation is applied across the K consecutive slots and the PUSCH is limited to a single transmission layer. The UE shall repeat the TB across the K consecutive slots applying the same symbol allocation in each slot. The redundancy version to be applied on the nth transmission occasion of the TB, where n=0, 1, . . . K−1, is determined according to table 6.1.2.1-2 of REF 5, denoted as Table (3), below. It is noted that Table 3 describes redundancy version for PUSCH transmission.

TABLE 3

| $rv_{id}$ indicated by the DCI scheduling the PUSCH | $rv_{id}$ to be applied to $n^{th}$ transmission occasion (repetition Type A) or $n^{th}$ actual repetition (repetition Type B) | | | |
|---|---|---|---|---|
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

In certain embodiments, when transmitting MsgA PUSCH on a non-initial UL BWP, if the UE is configured with startSymbolAndLengthMsgA-PO, the UE shall determine the S and L from startSymbolAndLengthMsgA-PO.

In certain embodiments, when transmitting MsgA PUSCH, if the UE is not configured with startSymbolAndLengthMsgA-PO, and if the time domain resource allocation (TDRA) list PUSCH-TimeDomainResourceAllocationList is provided in PUSCH-ConfigCommon, the UE shall use msgA-PUSCH-TimeDomainAllocation to indicate which values are used in the list. If PUSCH-TimeDomainResourceAllocationList is not provided in PUSCH-Config-Common, the UE shall use parameters S and L from REF5 table 6.1.2.1.1-2 or table 6.1.2.1.1-3 where msgA-PUSCH-TimeDomainAllocation indicates which values are used in the list.

For PUSCH repetition Type A, a PUSCH transmission in a slot of a multi-slot PUSCH transmission is omitted according to the conditions of [6, REF3].

For PUSCH repetition Type B, except for PUSCH transmitting CSI report(s) with no transport block, the number of nominal repetitions is given by numberOfRepetitions. For the n-th nominal repetition, n=0, . . . , numberOfRepetitions−1, the slot where the nominal repetition starts i is described in Equation (4), and the starting symbol relative to the start of the slot is given by $$\mod\left(S + n \cdot L, N_{symb}^{slot}\right).$$

The slot where the nominal repetition ends is described in Equation (5), and the ending symbol relative to the start of the slot is given by $$\mod\left(S + (n + 1) \cdot L - 1, N_{symb}^{slot}\right).$$

It is noted that K, is the slot where the PUSCH transmission starts, and $$N_{symb}^{slot}$$

is the number of symbols per slot as defined in REF1.

$$K_S + \left\lfloor \frac{S + n \cdot L}{N_{symb}^{slot}} \right\rfloor \qquad (4)$$

$$K_S + \left\lfloor \frac{S + (n + 1) \cdot L - 1}{N_{symb}^{slot}} \right\rfloor \qquad (5)$$

For PUSCH repetition Type B, the UE determines invalid symbol(s) for PUSCH repetition Type B transmission as follows. A symbol that is indicated as downlink by tdd-UL-DL-ConfigurationCommon or tdd-UL-DL-Configuration-Dedicated is considered as an invalid symbol for PUSCH repetition Type B transmission. For operation in unpaired spectrum, symbols indicated by ssb-PositionsInBurst in SIB1 or ssb-PositionsInBurst in ServingCellConfigCommon for reception of SS/PBCH blocks are considered as invalid symbols for PUSCH repetition Type B transmission. For operation in unpaired spectrum, symbol(s) indicated by pdcch-ConfigSIB1 in MIB for a CORESET for Type0-

PDCCH CSS set are considered as invalid symbol(s) for PUSCH repetition Type B transmission. For operation in unpaired spectrum, if numberOfInvalidSymbolsForDL-UL-Switching is configured, numberOfInvalidSymbolsForDL-UL-Switching symbol(s) after the last symbol that is indicated as downlink in each consecutive set of all symbols that are indicated as downlink by tdd-UL-DL-Configuration-Common or tdd-UL-DL-ConfigurationDedicated are considered as invalid symbol(s) for PUSCH repetition Type B transmission. The symbol(s) given by numberOfInvalidS-ymbolsForDL-UL-Switching are defined using the reference SCS configuration referenceSubcarrierSpacing provided in tdd-UL-DL-ConfigurationCommon. The UE may be configured with the higher layer parameter invalidSymbolPattern, which provides a symbol level bitmap spanning one or two slots (higher layer parameter symbols given by invalidSymbolPattern). A bit value equal to 1 in the symbol level bitmap symbols indicates that the corresponding symbol is an invalid symbol for PUSCH repetition Type B transmission. The UE may be additionally configured with a time-domain pattern (higher layer parameter periodicityAndPattern given by invalidSymbolPattern), where each bit of periodicityAndPattern corresponds to a unit equal to a duration of the symbol level bitmap symbols, and a bit value equal to 1 indicates that the symbol level bitmap symbols is present in the unit. The periodicityAndPattern can be {1, 2, 4, 5, 8, 10, 20 or 40} units long, but maximum of 40 msec. The first symbol of periodicityAndPattern every 40 msec/P periods is a first symbol in frame of mod 4=0, where P is the duration of periodicityAndPattern–r16 in units of msec. When periodicityAndPattern is not configured, for a symbol level bitmap spanning two slots, the bits of the first and second slots correspond respectively to even and odd slots of a radio frame, and for a symbol level bitmap spanning one slot, the bits of the slot correspond to every slot of a radio frame. If invalidSymbolPattern is configured, when the UE applies the invalid symbol pattern is determined as follows: If the PUSCH is scheduled by DCI format 0_1, or corresponds to a Type 2 configured grant activated by DCI format 0_1, and if invalidSymbolPatternIndicatorDCI-0-1 is configured,—if invalid symbol pattern indicator field is set 1, the UE applies the invalid symbol pattern; otherwise, the UE does not apply the invalid symbol pattern; if the PUSCH is scheduled by DCI format 0_2, or corresponds to a Type 2 configured grant activated by DCI format 0_2, and if invalidSymbolPatternIndicatorDCI-0-2 is configured, if invalid symbol pattern indicator field is set 1, the UE applies the invalid symbol pattern; otherwise, the UE does not apply the invalid symbol pattern; otherwise, the UE applies the invalid symbol pattern. If the UE is configured with multiple serving cells and is provided half-duplex-behavior='enable', and is not capable of simultaneous transmission and reception on any of the multiple serving cells, and indicates support of capability for half-duplex operation in CA with unpaired spectrum, and is not configured to monitor PDCCH for detection of DCI format 2-0 on any of the multiple serving cells, a symbol is considered as an invalid symbol in any of the multiple serving cells for PUSCH repetition Type B transmission if the symbol is indicated to the UE for reception of SS/PBCH blocks in any of the multiple serving cells by ssb-PositionsInBurst in SIB1 or ssb-PositionsIn-Burst in ServingCellConfigCommon, and symbol is considered as an invalid symbol in any of the multiple serving cells for PUSCH repetition Type B transmission with Type 1 or Type 2 configured grant except for the first Type 2 PUSCH transmission (including all repetitions) after activation if the symbol is indicated as downlink by tdd-UL-DL-ConfigurationCommon or tdd-UL-DL-ConfigurationDedicated on the reference cell, or the UE is configured by higher layers to receive PDCCH, PDSCH, or CSI-RS on the reference cell in the symbol.

For PUSCH repetition Type B, after determining the invalid symbol(s) for PUSCH repetition type B transmission for each of the K nominal repetitions, the remaining symbols are considered as potentially valid symbols for PUSCH repetition Type B transmission. If the number of potentially valid symbols for PUSCH repetition type B transmission is greater than zero for a nominal repetition, the nominal repetition consists of one or more actual repetitions, where each actual repetition consists of a consecutive set of all potentially valid symbols that can be used for PUSCH repetition Type B transmission within a slot. An actual repetition with a single symbol is omitted except for the case of L=1. An actual repetition is omitted according to the conditions in [6, REF5]. The redundancy version to be applied on the nth actual repetition (with the counting including the actual repetitions that are omitted) is determined according to REF5 table 6.1.2.1-2.

For PUSCH repetition Type B, when a UE receives a DCI that schedules aperiodic CSI report(s) or activates semi-persistent CSI report(s) on PUSCH with no transport block by a 'CSI request' field on a DCI, the number of nominal repetitions is always assumed to be 1, regardless of the value of numberOfRepetitions. When the UE is scheduled to transmit a PUSCH repetition Type B with no transport block and with aperiodic or semi-persistent CSI report(s) by a 'CSI request' field on a DCI, the first nominal repetition is expected to be the same as the first actual repetition. For PUSCH repetition Type B carrying semi-persistent CSI report(s) without a corresponding PDCCH after being activated on PUSCH by a 'CSI request' field on a DCI, if the first nominal repetition is not the same as the first actual repetition, the first nominal repetition is omitted; otherwise, the first nominal repetition is omitted according to the conditions in [6, REF5].

For PUSCH repetition Type B, when a UE is scheduled to transmit a transport block and aperiodic CSI report(s) on PUSCH by a 'CSI request' field on a DCI, the CSI report(s) is multiplexed only on the first actual repetition. The UE does not expect that the first actual repetition has a single symbol duration.

In certain embodiments, if a UE (such as the UE 116) transmits a PUSCH on active UL BWP b of carrier f of serving cell c using parameter set configuration with index j and PUSCH power control adjustment state with index 1, the UE determines the PUSCH transmission power $P_{PUSCH,b,f,c}(i,j,q_d,l)$ in PUSCH transmission occasion i as described in Equation (6).

$$P_{PUSCH,b,f,c}(i, j, q_d, l) =$$

$$\min \begin{cases} P_{CMAX,f,c}(i), \\ P_{O\_PUSCH,bf,c}(j) + 10\log_{10}\left(2^{\mu} \cdot M_{RB,bf,c}^{PUSCH}(i)\right) + \alpha_{b,f,c}(j) \cdot \\ PL_{b,f,c}(q_d) + \Delta_{TF,b,f,c}(i) + f_{b,f,c}(i, l) \end{cases} [dBm]$$

In certain embodiments, $PL_{b,f,c}(q_d)$ is a downlink pathloss estimate in dB calculated by the UE using RS index $q_d$ for a PUSCH transmission on the active DL BWP of carrier f of serving cell c. For example, if the UE is not provided PUSCH-PathlossReferenceRS and enableDefaultBeamPL-ForSRS, or before the UE is provided dedicated higher layer parameters, the UE calculates $PL_{bfc}(q_d)$ using a RS resource from an SS/PBCH block with same SS/PBCH block index as the one the UE uses to obtain MIB. For another example, if the PUSCH transmission is scheduled by a RAR UL grant, or for a PUSCH transmission for Type-2 random access procedure, the UE uses the same RS resource index $q_d$ as for a corresponding PRACH transmission.

In certain embodiments, if (i) the PUSCH transmission is scheduled by DCI format 0_0 on serving cell c, (ii) the UE is not provided a spatial setting for PUCCH resources on the active UL BWP of the primary cell REF5, and (iii) the UE is provided enableDefaultBearnPL-ForPUSCH0-0, then the UE determines a RS resource index $q_d$ providing a periodic RS resource configured with qcl-Type set to 'typeD' in the TCI state or the QCL assumption of a CORESET with the lowest index in the active DL BWP of the serving cell c.

In certain embodiments, if (i) the PUSCH transmission is scheduled by DCI format 0_0 on serving cell c, (ii) the UE is not provided PUCCH resources for the active UL BWP of serving cell c, and (iii) the UE is provided enableDefault-BearnPL-ForPUSCH0-0, then the UE determines a RS resource index $q_d$ providing a periodic RS resource configured with qcl-Type set to 'typeD' in the TCI state or the QCL assumption of a CORESET with the lowest index in the active DL BWP of the serving cell c.

In certain embodiments, if the PUSCH transmission is not scheduled by DCI format 0_0, and if the UE is provided enableDefaultBeamPL-ForSRS and is not provided PUSCH-PathlossReferenceRS and PUSCH-PathlossReferenceRS−r16, the UE uses the same RS resource index $q_d$ as for an SRS resource set with an SRS resource associated with the PUSCH transmission.

In certain embodiments, if the UE (i) is not provided pathlossReferenceRS or SRS-PathlossReferenceRS-Id, (ii) is not provided spatialRelationInfo, (iii) is provided enableDefaultBeamPL-ForSRS, and (iv) is not provided coresetPoolIndex value of 1 for any CORESET, or is provided coresetPoolIndex value of 1 for all CORESETs, in ControlResourceSet and no codepoint of a TCI field, if any, in a DCI format of any search space set maps to two TCI states REF2, then the UE determines a RS resource index $q_d$ providing a periodic RS resource configured with qcl-Type set to 'typeD' in (a) the TCI state or the QCL assumption of a CORESET with the lowest index in the active DL BWP, if CORESETs are provided in the active DL BWP of serving cell c and (b) the active PDSCH TCI state with lowest ID REF4 in the active DL BWP, if CORESETs are not provided in the active DL BWP of serving cell c.

In certain embodiments, if the UE (i) is not provided pathlossReferenceRSs, (ii) is not provided PUCCH-Spatial-RelationInfo, (iii) is provided enableDefaultBeamPL-For-PUCCH, and (iv) is not provided coresetPoolIndex value of 1 for any CORESET, or is provided coresetPoolIndex value of 1 for all CORESETs, in ControlResourceSet and no codepoint of a TCI field, if any, in a DCI format of any search space set maps to two TCI states REF2, then the UE determines a RS resource index $q_d$ providing a periodic RS resource configured with qcl-Type set to 'typeD' in the TCI state or the QCL assumption of a CORESET with the lowest index in the active DL BWP of the primary cell. For a PUCCH transmission over multiple slots, a same $q_d$ applies to the PUCCH transmission in each of the multiple slots.

In certain embodiments, if a UE (i) is not provided pathlossReferenceRSs in PUCCH-PowerControl, (ii) is provided enableDefaultBeamPL-ForPUCCH, (iii) is not provided PUCCH-SpatialRelationInfo, and (iv) is not provided coresetPoolIndex value of 1 for any CORESET, or is provided coresetPoolIndex value of 1 for all CORESETs, in ControlResourceSet and no codepoint of a TCI field, if any, in a DCI format of any search space set maps to two TCI states REF2, then a spatial setting for a PUCCH transmission from the UE is same as a spatial setting for PDCCH receptions by the UE in the CORESET with the lowest ID on the active DL BWP of the PCell. For a PUCCH transmission over multiple slots, a same spatial setting applies to the PUCCH transmission in each of the multiple slots.

If a UE determines that a Type 1 power headroom report for an activated serving cell is based on an actual PUSCH transmission then, for PUSCH transmission occasion i on active UL BWP b of carrier f of serving cell c, the UE computes the Type 1 power headroom report as described in Equation (7), below. In Equation (7), $P_{CMAX,f,c}(i)$, $P_{o\_PUSCH,b,f,c}(j)$, $$M^{PUSCH}_{RB,b,f,c}(i),$$

$\alpha_{b,f,c}(j)$, $PL_{b,f,c}(q_d)$, $\Delta_{TF,b,f,c}(i)$ and $f_{b,f,c}(i,l)$ are defined in REF3.

$$PH_{type1,b,f,c}(i, j, q_d, l) = \tag{7}$$
$$P_{CMAX,f,c}(i) - \{P_{o\_PUSCH,b,f,c}(j) + 10\log_{10}(2^{\mu} \cdot M^{PUSCH}_{RB,b,f,c}(i)) +$$
$$\alpha_{b,f,c}(j) \cdot PL_{b,f,c}(q_d) + \Delta_{TF,b,f,c}(i) + f_{b,f,c}(i, l)\}$$

In certain embodiments, if a UE is configured with multiple cells for PUSCH transmissions, where a SCS configuration $\mu_1$ on active UL BWP $b_1$ of carrier $f_1$ of serving cell $c_1$ is smaller than a SCS configuration $\mu_2$ on active UL BWP $b_2$ of carrier $f_2$ of serving cell $c_2$, and if the UE provides a Type 1 power headroom report in a PUSCH transmission in a slot on active UL BWP $b_1$ that overlaps with multiple slots on active UL BWP $b_2$, the UE provides a Type 1 power headroom report for the first PUSCH, if any, on the first slot of the multiple slots on active UL BWP $b_2$ that fully overlaps with the slot on active UL BWP $b_1$. If a UE is configured with multiple cells for PUSCH transmissions, where a same SCS configuration on active UL BWP $b_1$ of carrier $f_1$ of serving cell $c_1$ and active UL BWP $b_2$ of carrier $f_2$ of serving cell $c_2$, and if the UE provides a Type 1 power headroom report in a PUSCH transmission in a slot on active UL BWP $b_1$, the UE provides a Type 1 power headroom report for the first PUSCH, if any, on the slot on active UL BWP $b_2$ that overlaps with the slot on active UL BWP $b_1$.

If a UE is configured with multiple cells for PUSCH transmissions and provides a Type 1 power headroom report in a PUSCH transmission with PUSCH repetition Type B having a nominal repetition that spans multiple slots on active UL BWP $b_1$ and overlaps with one or more slots on active UL BWP $b_2$, the UE provides a Type 1 power headroom report for the first PUSCH, if any, on the first slot of the one or more slots on active UL BWP $b_2$ that overlaps with the multiple slots of the nominal repetition on active UL BWP $b_1$.

For a UE configured with EN-DC/NE-DC and capable of dynamic power sharing, if E-UTRA Dual Connectivity PHR REF5 is triggered, the UE provides power headroom of the first PUSCH, if any, on the determined NR slot as described in REF5.

If a UE is configured with multiple cells for PUSCH transmissions, the UE does not consider for computation of a Type 1 power headroom report in a first PUSCH transmission that includes an initial transmission of transport block on active UL BWP $b_1$ of serving cell $c_1$, a second PUSCH transmission on active UL BWP $b_2$ of carrier $f_2$ of serving cell $c_2$ that overlaps with the first PUSCH transmission if (i) the second PUSCH transmission is scheduled by a DCI format in a PDCCH received in a second PDCCH monitoring occasion, and (ii) the second PDCCH monitoring occasion is after a first PDCCH monitoring occasion where the UE detects the earliest DCI format scheduling an initial transmission of a transport block after a power headroom report was triggered, or (i) the second PUSCH transmission is after the first uplink symbol of the first PUSCH transmission minus $T'_{proc,2}=T_{proc,2}$ where $T_{proc,2}$ is determined according to REF4 assuming $d_{2,1}=1$, $d_{2,2}=0$, and with $\mu_{DL}$, corresponding to the subcarrier spacing of the active downlink BWP of the scheduling cell for a configured grant if the first PUSCH transmission is on a configured grant after a power headroom report was triggered.

If the UE determines that a Type 1 power headroom report for an activated serving cell is based on a reference PUSCH transmission then, for PUSCH transmission occasion i on active UL BWP b of carrier f of serving cell c, the UE computes the Type 1 power headroom report as described in Equation (8), below. In Equation (8), $\tilde{p}_{CMAX,f,c}(i)$ is computed assuming MPR=0 dB, A-MPR=0 dB, P-MPR=0 dB. $\Box T_C$=0 dB. MPR, A-MPR, P-MPR and $\Box T_C$ are defined in REF8, REF9, and REF10. The remaining parameters are defined in REF3 where $P_{O\_PUSCH,b,f,c}(j)$ and $\alpha_{b,f,c}(j)$ are obtained using $P_{O\_NOMINAL\_PUSCH,f,c}(0)$ and p0-PUSCH-AlphaSetId=0, $PL_{b,f,c}(q_d)$ is obtained using pusch-Pathloss-ReferenceRS-Id=0, and 1=0.

$$PH_{type1,b,f,c}(i,j,q_d,l)=\tilde{p}_{CMAX,f,c}(i)-\{P_{O\_PUSCH,b,f,c}(j)+\alpha_{b,f,c}(j)\cdot PL_{b,f,c}(q_d)+f_{b,f,c}(i,l)\}[dB] \quad (8)$$

f a UE is configured with two UL carriers for a serving cell and the UE determines a Type 1 power headroom report for the serving cell based on a reference PUSCH transmission, the UE computes a Type 1 power headroom report for the serving cell assuming a reference PUSCH transmission on the UL carrier provided by pusch-Config. If the UE is provided pusch-Config for both UL carriers, the UE computes a Type 1 power headroom report for the serving cell assuming a reference PUSCH transmission on the UL carrier provided by pucch-Config. If pucch-Config is not provided to the UE for any of the two UL carriers, the UE computes a Type 1 power headroom report for the serving cell assuming a reference PUSCH transmission on the non-supplementary UL carrier.

Throughout the disclosure, the terms "(UE) panel(s)" and "(UE) antenna port group(s)" are used interchangeably to refer to one or multiple UE panels, wherein a panel can refer to for example an antenna panel, an antenna array, or an antenna sub-array and so on, consisting of a number of antenna elements. In one example, a panel can be a physical panel or a virtual panel based on a virtualization of a set of physical antenna elements to virtual transmission entities, wherein the virtualization details and schemes can be left to UE implementation and not disclosed to the gNB. In one realization, a UE panel can be a set of antennas that can generate an independent (or partially independent) spatial transmission/reception filter or beam. In one example, a panel can be a receiver "Rx" panel or a transmission "Tx" panel. In one example, the set of Rx panels and the set of Tx panels can have full or partial overlap or can be mutually exclusive. For example, the set of UE Tx panels can be a (strict) subset of the set of Rx panels. In one example, a UE panel can be identified and indicated by the network with an explicit or implicit identifier. For example, a Tx panel can be indicated by an uplink transmission entity (UTE) identifier, or an Rx panel can be indicated by a downlink transmission entity (DTE) identifier. In one example, a panel can be associated with a reference signal (RS), or an RS resource, or an RS resource set, or an RS resource group, wherein an RS can be a DL RS such as SSB or CSI-RS or an UL RS such as SRS. For example, at least for a UE in connected mode, a UE panel can be associated with an SRS resource set. In one example, a panel can be associated with a set or group of UE antenna ports. In one example, UE panels can have same or different features, such as same or different number of antenna ports, same or different number of RF chains or PAs or low noise amplification (LNAs) connected to them, same or different baseband chains connected to them, same or different output power levels such as peak/average/min/max effective isotropic radiated power (EIRP) or TRP, and so on. In one example, UE panels can be associated with different capabilities such as different (beam) switching delays or different processing capabilities or timelines, and so on. A UE can have one or multiple Rx panels and one or more Tx panels. The UE can have one or multiple activated Tx panels for transmission (e.g., with an associated PA being already "warmed up") at any point in time. In one realization, the UE can transmit with a single Tx panel at any point in time, wherein the single Tx panel is the only activated Tx panel at that time (referred to as slow panel selection) or is one out of multiple activated Tx panels at that time (referred to as fast panel selection) wherein a panel selection can be based on a UE determination or gNB signaling. In another realization, the UE can transmit with two or multiple Tx panels at any point in time (referred to as simultaneous transmission on multiple panels "STxMP" or as simultaneous multi-panel transmission "SMPTx"). In yet another realization, the UE can both transmit and receive with two or multiple Tx/Rx panels at any point in time (referred to as simultaneous transmission and reception on multiple panels "STRxMP" or as simultaneous multi-panel transmission and reception "SMPTRx").

In one realization, in terms of RF functionality, a UE panel comprises a collection of TXRUs that is able to generate one analog beam (one beam may correspond to two antenna ports if dual-polarized array is used). A UE panels can constitute the same as well as different number of antenna ports, number of beams, and EIRP. No beam correspondence across different UE panels may be assumed. In some examples, each UE panel can comprise an independent unit of power control, FFT timing window, or timing advance. In some examples, the set of UE panels for UL transmission and the set of UE panels for DL receptions may be identical or at least partially shared, while in other examples, the two sets may be separate. In one example, UE's UL Tx panel(s) are assumed to be a same set or a subset of UE's DL Rx panel(s).

In one realization, a panel entity corresponds to one or more RS resources. For one RS resource, the corresponding panel entity may vary and is controlled by the UE, but a common understanding is maintained between gNB and UE about this correspondence. In one example, an RS resource can be mapped to multiple panels. In another example, the one or more RS resources may correspond to one or more RS resource set(s). For example, for CSI/beam reporting, the RS resource is an RS associated with measurement and/or reporting. In another example, for beam indication, the RS resource is a source RS for UL Tx spatial filter information.

To achieve uplink beam selection for multi-panel UEs, a set of UE panels can be activated, out of which a subset of activated UE panels can be selected for UE operation. For example, panel activation can refer to activation of L out of P available UE panel(s) at least for the purpose of DL and UL beam measurements, such as reception of DL measurement RS and transmission of SRS. Panel selection can refer to selection of 1 out of L activated UE panel(s) for the purpose of UL transmission. Fast uplink panel selection can be beneficial, for example, for MPE mitigation, UE power saving, UL interference management, supporting different configurations across panels, or UL multi-TRP operation. In some examples, the UE initiates an UL panel selection/activation. In other examples, the gNB initiates an UL panel selection/activation. In yet another example, combinations can be considered, for example, the UE performs panel selection and reports the activated UE panels to the gNB, and the gNB selects the UE panel for UL transmission.

In one realization, fast uplink panel selection can be via TCI state update, for example, based on MAC CE command only, or MAC CE command as well as a DCI format along with the necessary TCI state activation. In one example, an indication for an UL panel can be included in an UL TCI state. In one example, uplink panel selection can be based on a (previous) UE reporting, such as an UL panel indication as well as a UE reporting for a UE-panel state, for example, inactive, active for DL/UL measurement, active for DL reception only, active for UL transmission, or other combination(s) of UE-panel states.

The UE can configure its maximum output power. The configured UE maximum output power $P_{CMAX,f,c}$ for carrier f of a serving cell c is defined as that available to the reference point of a given transmitter branch that corresponds to the reference point of the higher-layer filtered RSRP measurement as specified in [TS 38.215].

The configured UE maximum output power $P_{CMAX,f,c}$ for carrier f of a serving cell c shall be set such that the corresponding measured peak EIRP $P_{UMAX,f,c}$ is within the following bounds as described in Equation (9) while the corresponding measured total radiated power $P_{TMAXf,c}$ is bounded by $P_{TMAXf,c} \leq TRP_{max}$.

$$P_{Powerclass}-MAX(MAX(MPR_{f,c}, A\text{-}MPR_{f,c})+\Delta MB_{P,n},$$
$$P\text{-}MPR_{f,c})-MAX\{T(MAX(MPR_{f,c}, A\text{-}MPR_{f,c})),T$$
$$(P\text{-}MPR_{f,c})\} \leq P_{UMAX,f,c} \leq EIRP_{max} \quad (9)$$

As described in Equation (9), $P_{Powerclass}$ being the UE power class, $EIRP_{max}$ being the applicable maximum EIRP, $\Delta MB_{P,n}$ being the peak EIRP relaxation, $TRP_{max}$ being the maximum TRP for the UE power class, and remaining parameters such as $MPR_{f,c}$ and A-$MPR_{f,c}$, all as specified in REF5. The Expression, maxUplinkDutyCycle-FR2, as defined in [TS 38.306], is a UE capability to facilitate electromagnetic power density exposure requirements. This UE capability is applicable to all FR2 power classes.

If the field of UE capability maxUplinkDutyCycle-FR2 is present and the percentage of uplink symbols transmitted within any 1 s evaluation period is larger than maxUplinkDutyCycle-FR2, the UE follows the uplink scheduling and can apply P-$MPR_{f,c}$.

If the field of UE capability maxUplinkDutyCycle-FR2 is absent, the compliance to electromagnetic power density exposure requirements are ensured by means of scaling down the power density or by other means.

It is noted that P-$MPR_{f,c}$ is the allowed maximum output power reduction. The UE shall apply P-$MPR_{f,c}$ for carrier f of serving cell c only for the cases described below. For UE conformance testing P-$MPR_{f,c}$ shall be 0 dB. Ensuring compliance with applicable electromagnetic power density exposure requirements and addressing unwanted emissions/self-defence requirements in case of simultaneous transmissions on multiple RAT(s) for scenarios not in scope of 3GPP RAN specifications. Additionally, ensuring compliance with applicable electromagnetic power density exposure requirements in case of proximity detection is used to address such requirements that require a lower maximum output power.

P-$MPR_{f,c}$ was introduced in the $P_{CMAX,f,c}$ equation such that the UE can report to the gNB the available maximum output transmit power. This information can be used by the gNB for scheduling decisions.

P-$MPR_{f,c}$ and maxUplinkDutyCycle-FR2 may impact the maximum uplink performance for the selected UL transmission path.

MPE P-MPR Reporting, as defined in [TS 38.306], is an optional UE capability to report P-$MPR_{f,c}$ when the reporting conditions configured by gNB are met. This UE capability is applicable to all FR2 power classes.

The tolerance $T(\Delta P)$ for applicable values of $\Delta P$ (values in dB) is specified in a Table in REF9.

Power headroom reports (PHR) are used to provide support for power-aware packet scheduling. In NR, three types of reporting are supported: a first one for PUSCH transmission, a second one for PUSCH and PUCCH transmission in an LTE Cell Group in EN-DC (see TS 37.340 [21]) and a third one for SRS transmission on SCells configured with SRS only. In case of CA, when no transmission takes place on an activated SCell, a reference power is used to provide a virtual report. To allow network to detect UL power reduction, the PHR reports may also contain Power Management Maximum Power Reduction (P-MPR, REF9) information that UE uses to ensure UE compliance with the MPE exposure regulation for FR2, which is set for limiting RF exposure on human body. Power headroom reports are transmitted using MAC signalling.

MPE P-MPR is the power backoff to meet the MPE FR2 requirements for a Serving Cell operating on FR2. If mpe-Reporting-FR2 is configured, and mpe-ProhibitTimer is not running: (i) the measured P-MPR applied to meet FR2 MPE requirements as specified in REF9 is equal to or larger than mpe-Threshold for at least one activated FR2 Serving Cell since the last transmission of a PHR in this MAC entity; or (ii) the measured P-MPR applied to meet FR2 MPE requirements as specified in REF9 has changed more than phr-Tx-PowerFactorChange dB for at least one activated FR2 Serving Cell since the last transmission of a PHR due to the measured P-MPR applied to meet MPE requirements being equal to or larger than mpe-Threshold in this MAC entity. In which case the PHR is referred below to as 'MPE P-MPR report'.

The Single Entry PHR MAC CE is identified by a MAC subheader with LCID as specified in REF5. It has a fixed size and consists of two octets defined as follows. R is the Reserved bit, and set to 0. PH indicates the power headroom level. The length of the field is 6 bits. The reported PH and the corresponding power headroom levels are specified in REF5. The corresponding measured values in dB are specified in REF11.

If mpe-Reporting-FR2 is configured and the Serving Cell operates on FR2, the MAC entity shall set the field P to 0 if the applied P-MPR value, to meet MPE requirements, as specified in REF9, is less than P-MPR_00 as specified in REF11 and to 1 otherwise. If mpe-Reporting-FR2 is not configured or the Serving Cell operates on FR1, this field indicates whether power backoff is applied due to power management (as allowed by P-MPR$_c$ as specified in REF5, REF9, and REF10). The MAC entity shall set the P field to 1 if the corresponding $P_{CMAX,f,c}$ field would have had a different value if no power backoff due to power management had been applied.

The field $P_{CMAX,f,c}$, indicates the $P_{CMAX,f,c}$ (as specified in REF3) used for calculation of the preceding PH field. The reported $P_{CMAX,f,c}$ and the corresponding nominal UE transmit power levels are specified in REF5. The corresponding measured values in dBm are specified in REF11.

If mpe-Reporting-FR2 is configured, and the Serving Cell operates on FR2, and if the P field is set to 1, the field MPE indicates the applied power backoff to meet MPE requirements, as specified in REF9. The MPE field indicates an index to Table 6.1.3.8-3 of REF5 (shown in Table (4), below) and the corresponding measured values of P-MPR levels in dB are specified in REF11. The length of the field is 2 bits. If mpe-Reporting-FR2 is not configured, or if the Serving Cell operates on FR1, or if the P field is set to 0, R bits are present instead. Table (4) shows the Effective power reduction for MPE P-MPR.

TABLE 4

| MPE | Measured P-MPR value |
|-----|----------------------|
| 0 | P-MPR_00 |
| 1 | P-MPR_01 |
| 2 | P-MPR_02 |
| 3 | P-MPR_03 |

Table 10.1.26.1-1 of REF11 defines the FR2 P-MPR report mapping. This is shown in Table (5), below, which describes mapping of FR2 P-MPR.

TABLE 5

| Reported value | Measured quantity value | Unit |
|----------------|-------------------------|------|
| P-MPR_00 | 3 □ PMP-R < 6 | dB |
| P-MPR_01 | 6 □ PMP-R < 9 | dB |
| P-MPR_02 | 9 □ PMP-R < 12 | dB |
| P-MPR_03 | PMP-R ≥ 12 | dB |

MPE reporting can also apply to multiple-entry PHR MAC CE, which is usually used for CA operation.

MPE mitigation can refer to minimizing the UL coverage loss due to the UE having to meet the MPE regulation. For MPE mitigation, one or more of the following operations may be needed: MPE event detection by the UE (or the gNB); UE reporting associated with an MPE and/or a potential/anticipated MPE event if the UE selects a certain UL spatial resource, e.g., corresponding to DL or UL RS; gNB signaling in response to the reported MPE event, such as indication of an alternative beam/panel selection, and UE behavior after receiving the gNB signaling, such as UL transmission from the alternative beam or panel.

A UE report of an MPE event can include an MPE metric along with an indication of a beam/panel on which the MPE event has occurred or is anticipated to occur. An MPE metric can include one or more of the following: P-MPR, virtual PHR, L1-RSRP/L1-SINR with and without MPE effect, estimated max UL RSRP, and so on. In some examples, an MPE metric can be beam-/panel-level or beam-/panel-specific. A beam/panel indication for an MPE event can include one or more of the following: SSB resource indicator (SSBRI), channel state information reference signal resource indicator (CRI), UL TCI state, joint TCI state, SRS resource set, PUCCH resource group, explicit panel ID, and so on. In some examples, if a UE initiates an MPE report or sends the MPE report based on an event/condition that the UE determines, the UE expects an acknowledgement from the gNB about reception of the UE MPE report. In one example, if the UE sends a single MPE report for multiple beams, the UE can use differential MPE reporting, such as an indication of differential MPE metrics in the same report.

MPE mitigation can be based on fast UL panel selection, initiated by the UE or indicated by the gNB. In one example, a fast UL panel selection can be based on a TCI states update, such as by a DCI format or a MAC CE command for beam indication.

Various embodiments and enhancement examples described throughout the present disclosure for uplink (UL) transmissions can be also applied to MPE handling for sidelink (SL) channels or signals, such as physical sidelink shared channel (PSSCH), physical sidelink feedback channel (PSFCH), and so on.

The following embodiments of the present disclosure, denoted as E-0, describe MPE determination.

In certain embodiments, a UE (such as the UE 116) can determine an RF exposure issue or event, herein referred to as an MPE issue or event, for an UL transmission based on an MPE state or an MPE level, wherein the MPE issue/event or the MPE state/level can be specific to a UE Tx beam-/panel corresponding to the UL transmission by the UE. The UE can use various methods to determine an MPE issue for an UL transmission, such as an applicable P-MPR, an actual or virtual PH, or a modified RSRP or SINR.

The MPE state/level can correspond to an existing or an anticipated MPE issue/event. The MPE state/level can correspond to a Tx beam/panel that the UE has actually used for an UL transmission, or a Tx beam that the UE is configured/indicated to use for the UL transmission, or a potential Tx beam that the UE can/may use for the UL transmission.

In one realization, an UL transmission can correspond to an uplink transmission before RRC connection, such as a Msg1/A PRACH, a Msg3/A PUSCH, a PUCCH transmission that includes HARQ-ACK feedback information corresponding to Msg4/B PDSCH, and any PUSCH/PUCCH transmission before receiving dedicated RRC configuration. In another realization, an UL transmission can correspond to an uplink transmission after RRC connection such as a PUSCH that is scheduled by a DCI format, a configured-grant PUSCH (CG-PUSCH), a PUCCH, or an SRS, and so on. In both realizations, an UL transmission can correspond to any repetition(s) or retransmission(s), including HARQ retransmission(s), of the aforementioned transmissions.

The MPE state, or exposure state, can refer to one attribute from a set of attributes such as "without MPE (issue)" or "with MPE (issue)" or "excessive/high/large MPE (issue)" or "intermediate MPE (issues)" or "small/low/mild MPE (issues)" and so on, wherein the attribute describes whether or not or qualitatively how much a transmission power for an UL transmission as determined by a legacy uplink power control formula would exceed regulatory limits, for example in terms of MPE, and would then require application of power back-off such as P-MPR. The MPE state can be beam-/panel specific, such as an MPE state corresponding to a UE Tx beam or a UE Tx panel. For example, a UE can have a MPE state to be "with MPE issue" for an UL transmission using a first Tx beam/panel, while the UE can have a MPE state to be "without MPE issue" for the UL transmission using a second Tx beam/panel. Herein, the first and second beams can correspond to a same DL RS, such as a same SSB or a same CSI-RS associated with the PRACH or can correspond to different DL RSs. In one example, an MPE state can be associated with an indication for the beam/panel, such as an SSBRI or a CRI or an ID for a panel entity, and so on.

The MPE level can refer to a value, e.g., in dB, that captures a level of an MPE issue, such as a value by which an UL transmission power as determined by a legacy uplink power control formula or without considering any (regulatory) restrictions would exceed regulatory limits. For example, an MPE level can correspond to a power back-off value such as a P-MPR value that a UE needs to apply to meet the regulatory limits. The MPE level can be beam-/panel specific, such as an MPE level corresponding to a UE Tx beam or a UE Tx panel. For example, a UE can have a MPE level equal to X dB for an UL transmission using a first Tx beam/panel and a MPE level equal to Y dB for the UL transmission using a second Tx beam/panel, wherein the values X and Y can be different. Herein, the first and second beams can correspond to a same DL RS, such as a same SSB or a same CSI-RS or can correspond to different DL RSs. In such cases, an MPE level can be associated with an indication for the beam/panel, such as an SSBRI or a CRI or an ID for a panel entity, and so on. In one example, a beam-/panel-specific MPE level can correspond to a power back-off value such as a P-MPR value that a UE needs to apply to meet regulatory limits in a certain direction associated with the beam/panel.

In one example, the MPE level is used only when a UE determines MPE issues for a beam/panel, such as when the UE determines an MPE state for a beam/panel to be "with MPE issue" or "excessive/high/large MPE (issue)" or "intermediate MPE (issues)"; a reference value such as zero (or minus infinity dB) can be used as MPE level otherwise.

In another example, the MPE level can be used also when a UE determines small/no MPE issues for a beam/panel, such as when the UE determines an MPE state for a beam/panel to be "without MPE issue" or with "small MPE (issues)", wherein the MPE can be such that, after power reduction, the beam/panel remains the preferred one for PRACH transmission. In the latter case, the MPE level refers to a value by which a transmission power for the UL transmission as determined by a legacy uplink power control formula is smaller from the regulatory limits such as an MPE issue/event. In such cases, the MPE level can be a negative number.

In a first approach, the MPE level can correspond to an actual or virtual PH or a PHR.

In one realization, the MPE level can correspond to an actual or virtual Type-1/2/3 PH or PHR that refer to PUSCH, PUCCH (or PUSCH+PUCCH), or SRS power headroom reports, respectively, as described in REF5. Herein, the PH can correspond to a UE before or after receiving (dedicated) RRC configuration.

In one example, the MPE level can correspond to a modified version of an actual or virtual Type-1/2/3 PH or PHR. For example, a PH value may be computed by assuming: one of the following four options. In a first option, a PH value may be computed by assuming all power reduction terms such as MPR, A-MPR, P-MPR, $\Delta T_C$ can have a possibly non-zero value as (actually) determined by the UE for the UL transmission, as in the legacy uplink power control and PH formula. In a second option, a PH value may be computed by assuming all power reduction terms are set to zero, such as MPR=0 dB, A-MPR=0 dB, P-MPR=0 dB, and $\Delta T_C$=0 dB. In a third option, a PH value may be computed by assuming all power reduction terms except for P-MPR are set to zero, for example, MPR=0 dB, A-MPR=0 dB, and $\Delta T_C$=0 dB, while P-MPR can have a possibly non-zero value as (actually) determined by the UE for the UL transmission, as in the legacy uplink power control and PH formula. In a fourth option, a PH value may be computed by assuming P-MPR=0 dB, while all power reduction terms except for P-MPR can have a possibly non-zero value, for example, MPR, A-MPR, and $\Delta T_C$, as (actually) determined by the UE for the UL transmission, as in the legacy uplink power control and PH formula.

In another realization, an MPE level for an UL transmission can correspond to actual or virtual Type-1 PH, or a modified variation thereof, that is computed for a PUSCH transmission before or after dedicated higher layer configuration. For example, before RRC connection, a pathloss reference when determining a Type-1 PH can be based on a same SSB that the UE used for a corresponding PRACH transmission or based on a different SSB that the UE determines for mitigation of MPE for the Msg3/A PUSCH transmission, independently from an SSB selected for MPE mitigation of Msg1/A PRACH. In another example, a pathloss value can be Rx beam-/panel-specific, so taking possibly multiple different values for a same SSB corresponding to multiple Rx beams/panels. For a modified virtual Type-1 PH, various options can be assumed for the power reduction terms such as MPR, A-MPR, P-MPR, $\Delta T_C$, as described above with respect to the four options.

In a second approach, an MPE level can correspond to a new PH for a PRACH transmission, which can apply to a UE before or possibly after (dedicated) RRC configuration.

In one realization, the MPE level can correspond to an "actual PRACH power headroom". For a PRACH transmission occasion i on active UL BWP b of carrier f of serving cell c, the UE computes the actual Type 4 PH as described in Equation (10).

$$PH_{type4,b,f,c}(i)=P_{CMAX,f,c}(i)-\{P_{PRACH,target,f,c}+PL_{b,f,c}\}\ \text{[dB]} \tag{10}$$

In Equation (10), $P_{CMAX,f,c}(i)$ is a UE configured maximum output power as defined in REF5, REF5, and REF10. In particular, when determining $P_{CMAX,f,c}(i)$, the UE applies the actual P-MPR power back-off term as necessary to meet regulatory requirements such as MPE. Therefore, the $P_{CMAX,f,c}(i)$ value reflects the MPE situation at the UE for the corresponding beam/panel. In one example, the UE determines the parameters in the above actual PRACH PH in a beam-/panel-specific manner, such as beam-/panel-specific PRACH target reception power (including any power ramp-up value), or beam-/panel-specific pathloss (PL) value. The actual PRACH PH can take a positive or negative value.

In another realization, the MPE level can correspond to a "virtual PRACH power headroom". For a PRACH transmission occasion i on active UL BWP b of carrier f of serving cell c, the UE computes the virtual Type 4 PH as described in Equation (11).

$$PH_{type4,b,f,c}(i)=\tilde{P}_{CMAX,f,c}(i)-\{P_{PRACH,target,f,c}+PL_{b,f,c}\}\ \text{[dB]} \tag{11}$$

In Equation (11), $\tilde{P}_{CMAX,f,c}(i)$ is a reference UE configured maximum output power that can be computed based on various options for selection of values for power back-off term such as MPR, A-MPR, P-MPR, $\Delta T_C$, as described earlier under four options, described above. In one example, the UE determines the parameters in the virtual PRACH PH in a beam-/panel-specific manner, such as beam-/panel-specific PRACH target reception power (including any power ramp-up value), or beam-/panel-specific PL value. In one example, a value of $P_{PRACH,target,f,c}$ for a virtual PRACH PH can be determined based on a most recent value of the power ramp-up counter. In another example, a value of $P_{PRACH,target,f,c}$ can be determined by incrementing a most recent value of the power ramp-up counter by 1, as if the UE is attempting a new PRACH transmission. In yet another example, the UE discards a value of the power ramp-up counter and does not include any power ramp-up in the value of $P_{PRACH,target,f,c}$ when determining a virtual PRACH PH, and only consider a value of preambleReceivedTargetPower that is configured by higher layers such as by a SIB in a cell-specific manner. The virtual PRACH PH can take a positive or negative value.

When determining an MPE level based on actual or virtual PRACH PH, in one option, the UE determines the MPE level separately for the initial PRACH transmission and for any PRACH retransmissions, so that MPE is separately handled for each PRACH transmission. In another option, the UE determines the MPE level only for the initial PRACH transmission, and applies the determined MPE level, and any corresponding behaviors, for all PRACH retransmissions until the UE receives a random-access response. In particular, any power ramping is not considered/applied when determining MPE levels via actual/virtual PRACH PH.

In one example, unlike other power headroom types, the UE may not report a PH corresponding to initial/random access procedure such as an actual or virtual PRACH PH or a Type-1 PH associated with a Msg3/A PUSCH to the gNB, and only use it for UE-specific procedures such as MPE mitigation during the initial/random access procedure. In another example, the UE can report such PHs to the gNB, for example, by multiplexing on the Msg1/A PRACH or on Msg3/A PUSCH transmission; in this case we can refer to it as a(n) actual/virtual PRACH PHR or a Type-1 PHR during initial access.

In certain embodiments, when a power headroom reporting for MPE mitigation is configured, before or after RRC connection, an MPE level reporting based on an actual or virtual PRACH PHR or Type-1/2/3 PHR can be triggered by gNB indication or by UE determination, for example, based on existing PHR trigger conditions, or based on new MPE reporting trigger conditions, such as when one or more of the following three conditions are satisfied: The first condition specifies that a value of pathloss associated with the UL transmission (and corresponding UE Tx/Rx beams) has changed more than a threshold such as phr-Tx-PowerFactorChange dB. The second condition specifies that a value of PHR (or a corresponding P-MPR value) is equal to or larger/smaller than a threshold such as phr-Threshold or we-Threshold. The third condition specifies that a value of PHR (or a corresponding P-MPR value) has changed more than phr-Tx-PowerFactorChange dB.

Herein, a PHR can refer to a PRACH PHR or Type-1/2/3 PHR. In addition, all the thresholds mentioned in the trigger conditions above can be predetermined in the specifications for system operation or can be configured by higher layer signalling such as by a SIB.

In another realization, the MPE level can correspond to a modified signal quality metric such as a modified RSRP or modified SINR. An RSRP or SINR can refer to an L1/L3-filtered signal quality such as L1-RSRP, or L1-SINR, or L3-filtered RSRP or SINR. The RSRP or SINR can be associated with a reference signal such as SSB or CSI-RS or SRS. The RSRP or SINR can be beam-/panel-specific, for example a first RSRP or SINR measured on/by a first UE beam/panel, and a second RSRP or SINR measured on/by a second UE beam/panel, wherein the first and second measurement values can be different even for a same reference signal. A modification of RSRP or SINR can refer to an adjustment of the RSRP or SINR by, for example, an operation to combine a measured RSRP or SINR with a power-back off term such as a P-MPR that the UE needs to apply to meet the regulatory requirements such as MPE. For example, the UE can determine a modified signal quality by adding or subtracting an applicable P-MPE or PH value with/from a measured signal quality such as RSRP or SINR. For example, the UE can determine a modified RSRP as mdf-RSRP=RSRP+P-MPR, or mdf-RSRP=RSRP−P-MPR, or in general, mdf-RSRP=RSRP+MPE, or mdf-RSRP=RSRP−MPE, wherein "mdf-RSRP" stands for the modified RSRP, and MPE can refer to any parameter that reflects the MPE level such as actual or virtual PH value and so on. Similar expressions can be used for a modified SINR. In another example, the UE can determine a modified RSRP or SINR by scaling, multiplication, or division of a measured signal quality such as RSRP or SINR with/by an applicable P-MPR or PH value, or with a scaling factor that is based on the applicable P-MPR or PH value. For example, mdf-RSRP=RSRP*a_MPE, wherein a_MPE stands for the scaling factor to capture the MPE effect, for example, based on the applicable P-MPR or PH value. Similar operations can be defined for SINR and other channel/signal quality metrics. The operation can be in the linear or dB scale. In one example, a modified RSRP or SINR can represent an UL RSRP estimate corresponding to an estimated received signal/channel quality at the gNB.

In one example, an MPE level can be based on multiple values corresponding to multiple MPE metrics such as a pair or combination of several MPE metrics and corresponding values. For example, an MPE level can include both a P-MPR or PH and a (modified) RSRP.

In one example, the UE can use (or report) an MPE range instead of an MPE level. For example, the UE can be provided with N=4 MPE ranges, such as P-MPR ranges or power headroom ranges or (modified) RSRP ranges and so on. Herein, the MPE ranges can be predetermined in the specifications for the system operation or can be provided by higher layers such as by system information. For a measured/determined MPE level, the UE determines an MPE range from the multiple MPE ranges that includes the measured/determined MPE level. In one example, a UE behavior for MPE mitigation, such as those considered throughout the present disclosure, can be based on boundary values or min/max/median/average values of a corresponding MPE range. In another example, a UE behavior for MPE mitigation, such as those considered throughout the present disclosure, can be based on a mapping among MPE ranges and a set of UE actions. For example, the UE performs a first action from the set of actions when a measured/determined MPE level belongs to a first MPE range, and the UE performs a second action from the set of actions when the measured/determined MPE level belongs to a second MPE range. In yet another example, when the UE needs to report an MPE, the UE can report an index for an MPE range or can report a representative value such as min/max/median/average values of a corresponding MPE range.

The embodiments in the present disclosure are described with reference to MPE mitigation for FR2 but same/similar mechanisms can be applied for handling and mitigation of any regulatory requirement(s) or network enforced limitation(s) that restrict(s) a transmission power for a UE or prevents the UE from a transmission in a/any/another frequency band/range, such as specific absorption rate (SAR) requirements in FR1, or MPE-like requirements for frequency bands/ranges beyond 52.6 GHz, such as FR2, FR3, FR4, and so on. Such requirements or limitations can be omnidirectional or can be towards a certain direction or in a certain area, for example, corresponding to a beam/panel, such as a UE Tx or Rx beam/panel, or associated with a downlink or uplink reference signal, such as an SSB index or an "SSB area", or a CSI-RS/SRS resource or resource set. In such cases and scenarios, references to "MPE" and variants thereof, such as "MPE state" or "MPE level" or "MPE threshold" and so on, can be replaced with the corresponding terms for the parameter/event that describes the requirements or limitations.

The following embodiments of the present disclosure, denoted as E-1, describe scenarios for repetition in presence of MPE.

In certain embodiments, a UE (such as the UE 116) can operate with a repetition scheme for an uplink transmission to achieve coverage enhancement, while the UE is mitigating an existing or anticipated MPE issue/event associated with the uplink transmission. The repetition of the uplink transmission can be configured/indicated by the gNB or can be determined by the UE, before or after the UE determines the MPE issue/event. Therefore, the UE needs to consider the impact on MPE issue before an uplink repetition scheme is configured/indicated/determined, or the UE can attempt to adjust a previously configured/indicated/determined uplink repetition scheme after an MPE issue/event is detected. In addition, an MPE issue/event can change over time, therefore a UE that operates with uplink repetition can consider such MPE change across different repetitions.

An uplink transmission can include an uplink transmission before (dedicated) RRC configuration, such as a Msg1/A PRACH, a Msg3/A PUSCH, a PUCCH transmission that includes HARQ-ACK feedback information corresponding to Msg4/B PDSCH, or any other PUSCH/PUCCH transmission before receiving dedicated RRC configuration. In another realization, an UL transmission can correspond to an uplink transmission after RRC connection, such as a PUSCH that is scheduled by a DCI format, a configured-grant PUSCH (CG-PUSCH), a PUCCH, or an SRS, and so on. In both realizations, an UL transmission can correspond to repetition(s) or retransmission(s), including HARQ retransmission(s), if any, of the aforementioned transmissions.

In one scenario, the UE already experiences a coverage issues such as a downlink (DL) coverage issues due to low signal/channel quality, for example, small RSRP. Therefore, the UE already needs coverage enhancement and is configured/indicated for uplink repetition. In addition, the UE determines that the UE has MPE issues, for example, a spatial transmission filter/beam for an UL transmission has MPE issues, so that uplink (UL) coverage issue is even more severe than DL coverage situation. In such a case, the UE adjust the configured/indicated repetition scheme per UE determination or by reporting the MPE issue and requesting the gNB for such adjustment.

In another scenario, the UE has no DL coverage issues, for example, the UE determines a large RSRP, therefore a repetition scheme may not be needed for downlink reception. However, the UE determines that the UE has MPE issues for the uplink, for example, a spatial transmission filter/beam for an UL transmission has MPE issues, so that the UE may experience UL coverage issues. Accordingly, the UE may need coverage enhancement, for example, via repetition for the uplink transmission to mitigate the MPE issue/event. In one example, the UE may have no alternative UL beam(s) without MPE issues. In another example, the UE may have alternative UL beam(s) without MPE issues but may not prefer to operate with the alternative UL beam(s), for example, because the alternative UL beam(s) correspond to a smaller DL RSRP, while the original UL beam with MPE issue corresponds to a larger DL RSRP.

In all scenarios and examples, an RSRP can refer to an L1-RSRP or a L3-filtered RSRP corresponding to a DL/UL/SL reference signal such as an SSB or a CSI-RS or an SRS. In one example, RSRP can be UE-beam-/panel-specific, so that the UE determines a first RSRP when using a first UE Tx/Rx beam or panel for transmission/reception of the reference signal and determines a second RSRP when using a second UE Tx/Rx beam or panel for transmission/reception of the reference signal, wherein the first and second RSRPs are different, while the RSRPs are associated with a same reference signal.

In all scenarios and examples, an MPE issue/event can change over time, for example, over a time scale of one or multiple repetitions of an uplink transmission. In one example, the UE determines an MPE issue/event for first repetition(s) from a set of repetition(s), while the UE determines no MPE issues/event for second repetition(s) from the set of repetition(s). Therefore, any MPE mitigation method can apply. In a first method, only to the first repetition(s), and not the second repetition(s). In a second method, commonly to both the first and second repetition(s), without considering the MPE change between the first and second repetition(s). In a third method, commonly to both the first and second repetition(s), but with adjustments that consider the MPE change between the first and second repetition(s). In a fourth method, separately to the first repetition(s) and the second repetitions, for example, using a first mitigation method with a first set of parameter values for the first repetition(s), and using a second mitigation method with a second set of parameter values for the second repetition(s), wherein the first and second set of parameters are different.

The following embodiments of the present disclosure, denoted as E-2, describe determining a number of repetitions in presence of MPE. This is described in the following examples and embodiments, such as those of FIG. 6.

FIG. 6 illustrates an example method 600 for determining a number of repetitions for an UL signal/channel according to embodiments of the present disclosure.

The steps of the method 600 of FIG. 6 can be performed by any of the UEs 111-119 of FIG. 1, such as the UE 116 of FIG. 3. The method 600 is for illustration only and other embodiments can be used without departing from the scope of the present disclosure.

In certain embodiments, a UE (such as the UE 116) can determine a number of repetitions, or adjustments to a configured/indicated number of repetitions, for an uplink transmission based on an MPE state/level/range that the UE determines for the uplink transmission.

In a first realization, the UE is configured a mapping from a pair of: (i) a signal/channel quality metric (such as an RSRP value or an RSRP range or a coverage enhancement (CE) level or a CE mode); and (ii) an MPE metric (such as an MPE state or an MPE value or an MPE range), to a number of repetitions for an uplink transmission. For example, the mapping is described in Equation (12). For an alternative example, the mapping can be expressed as described in Equation (13).

$$(\text{RSRP range}, \text{MPE range}) \rightarrow \text{number of repetitions} \qquad (12)$$

$$\text{number of repetitions} = f(\text{RSRP range}, \text{MPE range}) \qquad (13)$$

It is noted that in Equation (13), $f(x, y)$ is a bi-variate function. Herein, an MPE state/level/range can be based on an applicable P-MPR or an actual/virtual power headroom, and so on, as described in embodiment E-0. Similar expression can be used wherein RSRP is replaced by other signal/channel quality metrics such as CE level/mode.

In a second realization, the UE is configured a mapping between: (i) a modified or adjusted signal/channel quality metric (such as a modified RSRP value/range or a modified CE level/mode), and (ii) a number of repetitions for an uplink transmission. For example, the mapping can be expressed as described in Equation (14) or Equation (15).

$$\text{modified RSRP range} \rightarrow \text{number of repetitions, and} \qquad (14)$$

$$\text{number of repetitions} = f(\text{modified RSRP range}) \qquad (15)$$

It is noted that in Equation (15), f(x) is a univariate function. Herein, a modified RSRP can refer to a measured RSRP value that is adjusted based on an MPE state/level/range, as described in embodiment E-0. Similar expression can be used wherein modified RSRP is replaced by other modified signal/channel quality metrics such as modified CE level/mode. Similar, a modified CE level/mode refers to a determined or indicated CE level/mode that is adjusted based on an MPE state/level/range, as described in embodiment E-0.

For example, the UE selects a first number of repetitions for an UL transmission when a UE determines a first RSRP range and a first MPE range, and the UE selects a second number of repetitions for the UL transmission when the UE determines a second RSRP range and a second MPE range. Herein, the first and second number of repetitions can be different when at least one of the following holds: the first RSRP range is different from the second RSRP range; or the first MPE range is different from the second MPE range.

In another example, the UE selects a first number of repetitions for an UL transmission when a UE determines a first modified RSRP in a first range and selects a second number of repetitions for the UL transmission when the UE determines a second modified RSRP in a second range, wherein the first and second number of repetitions can be different.

The method 600 as illustrated in FIG. 6 describes an example procedure for determining a number of repetitions for an UL signal/channel based on a modified RSRP that reflects an associated RSRP and MPE level jointly.

In step 610, a UE (such as the UE 116) is configured a mapping among modified RSRP ranges and CE levels for an UL signal/channel. In one example, the UL signal/channel includes at least a PRACH transmission such as a PRACH corresponding to a CF-RA procedure.

In step 620, the UE is configured a mapping among CE levels and number of repetitions for an UL signal/channel. In one example, the mapping can include other transmission parameters such as time-frequency resources for the UL signal/channel, for example, ROs for a PRACH transmission.

In step 630, the UE determines an RS (and corresponding UE Rx beams) associated with the UL signal/channel. In one example, the RS is an SSB (or CSI-RS) associated with a PRACH transmission.

In step 640, the UE measures RSRP for the RS (and corresponding Rx beam(s)) associated with the UL signal/channel.

In step 650, the UE measures MPE level for Tx beam(s) corresponding to the RS/Rx beam(s).

In step 660, The UE determines respective modified RSRP for the RS and corresponding Rx and Tx beam(s) based on the measured RSRP and MPE level. In one example, the modified RSRP refers to a largest RSRP among all UE Tx and Rx beams corresponding to the determined RS.

In step 670, the UE determines a CE level, and a corresponding number of repetitions, for the UL signal/channel based on the configured mappings.

In step 680, the UE transmits the UL signal/channel with the determined number of repetitions. In one example, the UE can transmit the UL signal/channel using a spatial transmission filter associated with the determined RS and in transmission occasion(s) from time-frequency resources configured for the determined CE level. In one example, the determined number of repetitions refers to a preferred number of repetitions for the UL signal/channel that can be different from a configured/indicated number of repetitions for the UL signal/channel.

Herein, RSRP can refer to an RSRP for a reference signal associated with the UL transmission. For example, for an UL transmission before RRC connection or for an UL transmission associated with a contention-based random access (CB-RA) after RRC connection, such as a Msg1/A PRACH transmission or a Msg3/A PUSCH transmission, RSRP can refer to an RSRP for an SSB or a CSI-RS associated with a corresponding PRACH transmission. In this example, the associated RS can be determined by the UE from a set of RSs provided by higher layers such as by system information or common/dedicated RRC configuration. In another example, for a PUSCH/PUCCH/SRS transmission after (dedicated) higher layer configuration, an RSRP can refer to an RSRP for a DL/UL RS that is QCL with the PUSCH/PUCCH/SRS, or a DL/UL RS that is a reference spatial relation or beam for a DL/UL/joint TCI state corresponding to the PUSCH/PUCCH/SRS, such as an SSBRI or a CRI or an SRI or a CSI-RS resource set index or an SRS resource set index and so on. In this example, the DL/UL reference signal associated with the UL transmission can be configured to the UE by higher layer configuration or can be indicated to the UE via L1/L2 signaling.

In one example, the UE can use other signal/quality metrics instead of RSRP, such as SINR, or SNR, or RSRQ, or RSSI, and so on.

Herein, a CE level can correspond to a range for a DL (or UL) coverage metric, such as a range for pathloss value, which in turn determines a level or a parameter value for a scheme that is necessary to enhance the UE coverage, associated with the UL transmission. For example, the UE determines a first CE level for an UL transmission when the UE determines that a pathloss value associated with the UL transmission falls in a first range and determines a second CE level for the UL transmission when the UE determines that the pathloss value associated with the UL transmission falls in a second range.

The UE can be configured a predetermined set of CE levels provided in the specifications for system operation, such as CE levels {0,1,2,3}, or with a configured set of CE levels provided by higher layers such as by system information or common/dedicated higher layer configuration. Similar, the corresponding ranges for the coverage metric, such as pathloss value ranges, can be predetermined in the specifications for system operation, or can be configured by higher layer. A scheme for coverage enhancement can refer to, for example, uplink repetition or transmission power boosting, and so on.

Herein, a CE mode can correspond to a subset of CE levels from the set of predetermined or configured CE levels. For example, the UE can operate with CE mode A or CE mode B, wherein CE mode A refers to CE levels {0,1}, and CE mode B refers to CE levels {2,3}. The mapping between CE levels and CE modes can be predetermined in the specifications for system operation or can be provided by higher layer configuration.

In one example, a CE level/mode can be indicated by the gNB via L1/L2 signaling such as by a PDCCH order that triggers a RA procedure, or by higher layer configuration. For example, the UE can start from a first CE level/mode that is indicated by the gNB, and the UE can determine a second CE level/mode that is an immediately next CE level/mode after the first CE level/mode, wherein 'next' can refer to a next smaller/larger CE.

Various parameters for an uplink repetition scheme in presence of MPE can be UE-beam-/panel-specific. For example, a signal/channel quality such as RSRP, or a path-loss value, or a CE level/mode can be UE-beam-/panel-specific. In another example, an MPE state/level/range, such as an applicable P-MPR or an actual/virtual power head-room can be UE-beam-/panel-specific. Accordingly, a corresponding number of repetitions can be UE-beam-/panel-specific as well. For example, the UE can determine a first RSRP or a first CE level/mode or a first MPE level when using a first UE Rx/Tx beam or panel, while the UE can determine a second RSRP or a second CE level/mode or a second MPE level and therefore a first number of repetitions when using a first UE Rx/Tx beam or panel, and determine a second RSRP or a second CE level/mode or a second MPE level and therefore a second number of repetitions when using a second UE Rx/Tx beam or panel, even when the first and second UE Rx/Tx beams or panels can be associated with a same RS.

For a UE before (dedicated) higher layer configuration, the UE can determine a number of repetitions for a PRACH transmission based on a signal/channel quality level such as RSRP for an SSB (or NZP CSI-RS) associated with the PRACH and an MPE state/level/range, for example, using the first realization or the second realization for the mapping to the number of repetitions.

For other UL transmissions during initial/random access procedures, such as Msg3/A PUSCH or a PUCCH transmission that includes a HARQ ACK feedback information corresponding to a Msg4/B PDSCH and so on, the UE can determine a number of repetitions using the first or second realization described above.

In one example, when a UE transmits a PRACH transmission with a first number of repetitions, the UE can transmit other UL transmissions during initial/random access procedures, such as Msg3/A PUSCH or a PUCCH transmission that includes a HARQ ACK feedback information corresponding to a Msg4/B PDSCH and so on, with: (i) the same first number of repetitions as for the (most recent) corresponding PRACH transmission; (ii) a second number of repetitions, that is an offset/factor compared to the first number of repetitions, wherein the offset can be determined based on (modified) RSRP change over time, or MPE state/level/range change over time; (iii) a third number of repetitions, that the UE determines separately/independently from the first number of repetitions, using the first or second realization described above; or (iv) a fourth number of repetitions, that is indicated to the UE via L1/L2 signaling, such as via a DCI format (1_0) that schedules a RAR/Msg2/MsgB PDSCH transmission, or a RAR UL grant that is included in the RAR/Mags2/MsgB PDSCH, or a DCI format (1_0) that schedules a Msg4 PDSCH, or multiplexed in the Msg4 PDSCH, or via other DL transmissions during initial/random access procedure before the UE receives (dedicated) higher layer configuration.

In one example, the UE determines the offset/scaling values for the second number of repetitions as described above, based on gNB indication in the RAR UL grant or in Msg2/4/B PDCCH or PDSCH. For example, the UE is configured with a set of 4 offset/scaling values, such as {Y−2, Y, Y+2, Y+4} or {Y, Y/2, Y/4, Y/8}, wherein 'Y' denotes a number of repetitions for the corresponding PRACH transmission. Then, the UE determines the second number of repetitions for Msg3/A PUSCH, and other such UL transmission based on an indication, such as a field in a DCI format that schedules a Msg2/B or a RAR UL grant, that indicates a value from the set of 4 offset/scaling values. The field can be a new field or can be an existing field such as TDRA or TPC command and so on that indicates a value from a TDRA table or a TPC command table that jointly indicates the number of repetitions along with TDRA value or the TPC command value.

In another example, the UE determines the second number of repetitions as described above using an offset/scaling value that is determined based on a predetermined or configured mapping between the MPE state/level/range variation over time and the offset/scaling values that the UE needs to apply to the PRACH number of repetitions.

In yet another example, the UE receives an indication for the fourth number of repetitions for Msg3/A PUSCH or other UL transmissions following a PRACH as described above, and the UE determines a number of repetitions for the Msg3/A PUSCH, or such other UL transmissions based on an offset/scaling value that the UE applies to the fourth number of repetitions as indicated by the gNB. For example, the UE uses a predetermined or configured mapping between the MPE state/level/range change over time and the offset/scaling values that the UE needs to apply to the fourth number of repetitions as indicated by the gNB.

In certain embodiments, the UE (such as the UE 116) can determine the number of repetitions for such UL transmissions during initial/random access procedure based on an RSRP or a modified RSRP for: (i) an SSB (or NZP CSI-RS) associated with the PRACH; or (ii) a second/different SSB (or a second/different NZP CSI-RS) determined separately for the UL transmission due to, for example, coverage enhancement reasons to improve the corresponding DL RSRP, or MPE change since the time of the PRACH transmission that have made the SSB (or NZP CSI-RS) not suitable for the other UL transmissions following PRACH.

In one example, when the UE is not indicated a number of repetitions for the UL transmissions following a PRACH transmission, or the UE determines a non-zero offset value or a non-unity scaling factor to apply to a number of repetitions that is indicated for the UL transmissions, the UE reports a determined/adjusted number of repetitions. The UE can include the report for the determined/adjusted number of repetitions in the UL transmission, for example, using a MAC-CE included in a PUSCH or multiplexed on a PUSCH/PUCCH similar to a UCI. In one example, the UE includes such report in all repetitions of the UL transmissions.

Similar, a UE (such as the UE 116) can apply repetitions to an UL transmission after (dedicated) higher layer configuration, wherein a number of repetitions can be based on an MPE state/level/range. The UE can be already configured for repetitions, such as for a configured grant PUSCH or for a PUCCH configured with repetitions, or is indicated a number of repetitions by a scheduling DCI format, such as a number of repetitions for a PUSCH that is scheduled by a DCI format, or a number of repetitions for a PUCCH that is triggered by a DCI format, for example, to include HARQ ACK feedback information corresponding to a PDSCH scheduled by the DCI format. Repetition can also be applied to an SRS, wherein a number of repetitions can be provided by higher layers or by L1/L2 signaling such as by a MAC-CE that activates a semi-persistent SRS or a DCI format that triggers an aperiodic SRS.

In one example, the UE can be provided with a predetermined or configured mapping among MPE states/levels/ ranges or MPE change and an offset/scaling for a number of repetitions for the UL transmission. For example, the UE can adjust a number of repetitions for a PUSCH/PUCCH/SRS based on the determined MPE state/level/range or MPE change, and the predetermined or configured mapping. For example, the UE can apply N repetitions or can increase a number of repetitions by an offset M or a scaling factor L when the UE determines an MPE state/level/range has changed by W dB s compared to a baseline MPE state/level/ range. For example, the UE can be provided information of allowed adjustments that the UE can autonomously apply, such as allowed value ranges for the parameters M or L corresponding to value(s) N.

In the methods and examples above, before or after higher layer configuration, a modified RSRP or variations thereof can be used instead of an MPE state/level/range or variations thereof.

In the methods and examples above, before or after higher layer configuration, a mapping among RSRP values/ranges or modified RSRP values/ranges or MPE states/levels/ ranges with a number of repetitions can be provided only for one RSRP value/range or one modified RSRP value/range. In such case, when the UE determines that an UL transmission has an RSRP or modified RSRP with a different value or in a different range, the UE determines a number of repetitions for the UL transmissions based on a predetermined or configured rule. For example, the UE adjusts the number of repetitions by an offset/scaling parameter, such as an increase/decrease of a number of repetition by M repetitions or by a factor L for a difference of W dBs for the RSRP or modified RSRP or MPE state/level/range compared to corresponding value in the provided mapping.

In the methods and examples above, before or after higher layer configuration, a mapping among RSRP values/ranges or modified RSRP values/ranges or MPE states/levels/ ranges with a number of repetitions can be BWP-specific or UL-carrier-specific. For example, for a same RSRP value/ range or a same modified RSRP value/range or for a same MPE state/level/range, the UE can determine a different number of repetitions for a first BWP such as an initial BWP compared to a second BWP, or for a first UL carrier such as a normal uplink carrier (NUL) compared to a second UL carrier such as a supplementary uplink carrier (SUL). Such BWP-specific or UL-carrier-specific configurations can be applied to cell-specific configurations for a UE before RRC connection and be applied to UE-specific configurations for a UE after RRC connection.

For the case of repetitions for PRACH and other UL transmission associated with initial/random access procedure, a number of repetitions and corresponding configurations and mappings can be RA-type-specific, such as different number of repetitions configured/indicated for a 4-step RA (also known as, a Type-1 RA) procedure, compared to a 2-step RA (also known as, a Type-2 RA) procedure.

In one example, a configuration or mapping for a number of repetitions can be RS-specific. For example, for a same value of RSRP and MPE, a number of repetitions for an UL signal/channel associated with an SSB can be larger than a number of repetitions for an UL signal/channel associated with a CSI-RS.

Although FIG. 6 illustrates the method 600 various changes may be made to FIG. 6. For example, while the method 600 is shown as a series of steps, various steps could overlap, occur in parallel, occur in a different order, or occur multiple times. In another example, steps may be omitted or replaced by other steps. For example, steps of the method 600 can be executed in a different order.

The following embodiments of the present disclosure, denoted as E-3, describe increasing a number of repetitions or early termination of repetitions in presence of MPE. This is described in the following examples and embodiments, such as those of FIG. 7.

FIG. 7 illustrates an example method 700 for requesting additional repetitions for an UL signal/channel due to MPE issues according to embodiments of the present disclosure.

The steps of the method 700 of FIG. 7 can be performed by any of the UEs 111-119 of FIG. 1, such as the UE 116 of FIG. 3. The method 700 is for illustration only and other embodiments can be used without departing from the scope of the present disclosure.

In certain embodiments, for a UE (such as the UE 116) that is configured/indicated repetitions for transmission of an UL signal/channel, the UE can transmit the UL signal or channel with an increased or reduced number of repetitions compared to a configured/indicated number of repetitions, based on an MPE state/level/range corresponding to the UL transmission. Such increase or reduction of number of repetitions can be based on a UE determination of an MPE state/level/range before or at the time of transmission compared to a reference MPE state/level/range or can be based on a UE determination of a change to an MPE state/level/ range after the start and during the UL repetitions. An increase or reduction of number of repetitions can be left to UE determination (per configured mappings) or can be indicated by the gNB upon UE request for such change.

In one example, the UE can be provided with a predetermined or configured mapping among MPE states/levels/ ranges or MPE change and an offset/scaling for a number of repetitions for the UL transmission. For example, the UE can adjust a number of repetitions for a PUSCH/PUCCH/SRS based on the determined MPE state/level/range or MPE change, and the predetermined or configured mapping. For example, the UE can apply N repetitions or can increase a number of repetitions by an offset M or a scaling factor L when the UE determines an MPE state/level/range has changed by W dBs compared to a baseline MPE state/level/ range.

In one example, the UE cannot adjust a number of repetitions autonomously, but can request for additional repetitions compared to a number of repetitions that is configured/indicated by the gNB. Such request can additionally include an MPE report. Such request can be included in a PUSCH, for example, as a new UCI multiplexed on the PUSCH or as a MAC CE included in the PUSCH. In another example, such request can be included in a PUCCH that is dedicated to the request or can be included in a PUCCH that multiplexes multiple UCIs, such as a PUCCH that includes a HARQ ACK for a PDSCH or a PDCCH or a CSI report. In response to such UE request, the gNB can indicate a new number of repetitions for a specific UL transmission or a group of UL transmissions, such as all UL transmissions within a predetermined or configured/indicated time duration, such as X msec or Y slots/frames. A gNB indication can be using a DL MAC CE included in a PDSCH or included in a UE-specific DCI format in a PDCCH, or in a (group-common) DCI format that is monitored in a common search space. For example, such indication for an increase of a number of repetitions can be included in a DCI format 2_1 or 2_4 or variations thereof.

In another example, the UE can perform early termination of repetitions for an UL transmission, before or after higher layer configuration, for example, due to change in (DL) RSRP or modified RSRP, or due to change in MPE state/level/range. For example, if the UE determines that a value of RSRP or modified RSRP is increased, the UE can transmit the UL signal or channel with a smaller number of repetitions. In another example, if the UE determines that a value of MPE state/level/range is improved (decreased or increased based on the MPE metric selected for operation/reporting), the UE can transmit the UL signal or channel with a smaller number of repetitions. For example, the UE can apply can reduce a number of repetitions by an offset M or a scaling factor L when the UE determines an MPE state/level/range has changed by W dB s compared to a baseline MPE state/level/range. In one example, there can be a predetermined or configured mapping between a value of an increase in (modified) RSRP or MPE change or pathloss change over time, and an offset/scaling for reducing a number of repetitions for the UL signal or channel to perform early termination of repetitions. In one example, when a UE performs early termination of repetitions for an UL signal or channel, the UE reports such early termination to the gNB. For example, the UE indicates a value of an offset/scaling that the UE applies to the original configured/indicated number of repetitions, or a number of repetitions that the UE intends to transmit the UL signal or channel instead of the original configured/indicated number of repetitions. The UE reports an early termination of repetitions corresponding to an UL/signal or channel.

In one example, the UE cannot perform early termination of repetitions autonomously, but can request for a reduced number of repetitions compared to a number of repetitions that is configured/indicated by the gNB. Such request can additionally include an MPE report. Such request can be included in a PUSCH or a PUCCH, similar to the methods described above for requesting additional number of repetitions. In response to such UE request, the gNB can indicate a reduced number of repetitions for a specific UL transmission or a group of UL transmissions, such as all UL transmissions within a predetermined or configured/indicated time duration, such as X msec or Y slots/frames. The gNB can use various indication methods such as a DL MAC CE or a DCI format monitored in a UE-specific search space (USS) or a CSS, similar to the methods described above for requesting an additional number of repetitions.

In one example, a UE determination or a gNB indication of early termination of repetitions does not apply to a specific UL signal or channel, rather can apply to any UL signal or channel that is transmitted in a certain time duration. For example, such early termination can be applied for a predetermined or configured/indicated time duration, such as X msec or Y slots/frames, or until a new UE determination or gNB indication regarding (modified) RSRP change or MPE change or pathloss change.

The method 700, as illustrated in FIG. 7 describes an example procedure for requesting additional repetitions for an UL signal/channel due to MPE issues.

In step 710, a UE (such as the UE 116) is configured/indicated a number of repetitions for an UL signal/channel. In step 720, the UE is configured a mapping among modified RSRP ranges and offset values for number of repetitions for the UL signal/channel. In step 730, the UE is provided an RS associated with the UL signal/channel. In step 740, the UE measures RSRP for the RS and MPE level for the UL signal/channel associated with RS. In step 750, the UE determines modified RSRP for the RS based on the measured RSRP and MPE level. In step 760, the UE determines an offset value for the number of repetitions for the UL signal/channel based on the determined modified RSRP and the configured mapping. In step 770, the UE indicates the offset value to the gNB and requests for additional repetitions for the UL signal/channel.

Although FIG. 7 illustrates the method 700 various changes may be made to FIG. 7. For example, while the method 700 is shown as a series of steps, various steps could overlap, occur in parallel, occur in a different order, or occur multiple times. In another example, steps may be omitted or replaced by other steps. For example, steps of the method 700 can be executed in a different order.

The following embodiments of the present disclosure, denoted as E-4, describe handling missed repetitions due to MPE.

In certain embodiments, for a UE (such as the UE 116) that is configured/indicated a number of repetitions for an UL signal or channel, when a UE cannot transmit a repetition from the configured/indicated number of repetitions due to a change to an MPE state/level/range during the repetitions, the UE can consider the missed repetitions for determination of UL transmission characteristic(s), such as counting a number of repetitions, or determination of a redundancy version, and so on.

A UE (such as the UE 116) may not transmit a repetition of a signal/channel since an MPE situation corresponding to the UL transmission at the time of the repetition deteriorates, such as an MPE state/level/range falling below or above a reference state/level/range. For example, a P-MPR applied to a repetition can be larger than a predetermined or configured threshold, or alternatively a transmission power for the repetition can be smaller than a minimum power level, so that the UE can select not to transmit the repetition. In another example, a modified RSRP corresponding to an UL repetition can be smaller than a predetermined or configured threshold, such as below a minimum reliability level for reception at the gNB, so the UE can select not to transmit the repetition. Since MPE can be beam-/panel-specific, the UE can transmit a first repetition of a first UL transmission that has no MPE issues, while the UE cannot transmit a second repetition of a second UL transmission that is experiencing MPE issues.

When a UE does not/cannot transmit a repetition of an UL signal or channel due to MPE issues, in one option, the UE counts the missed repetition towards the configured/indicated number of repetitions. In another option, the UE does not count the missed/omitted repetition towards the configured/indicated number of repetitions, so the UE takes additional resources to compensate for the missed repetition(s).

A UE transmits repetitions of an UL channel such as a PUSCH with same or different redundancy versions (RVs). For example, the UE can determine an RV for a PUSCH repetition based a predetermined or configured RV pattern, such as {0,2,3,1} or {0,3,0,3} or 10,0,0,01 or permutations thereof based on an RV value indicated by the gNB. In one example, the UE determines an RV for an n-th PUSCH repetition as the $(\mathrm{mod}(n-1,4)+1)^{th}$ value in the configured RV sequence. When a UE does not/cannot transmit a repetition of an UL signal or channel due to MPE issues, in one option, the UE counts any missed/omitted repetition(s) when applying the RV pattern/rule to determine an RV for next PUSCH repetition(s). In another option, the UE does not count the missed/omitted repetition(s) when applying the RV pattern/rule to determine an RV for next PUSCH repetition(s).

In one example, a UE shall satisfy MPE requirements regardless of when an MPE issue/event is detected. For example, the UE shall apply a suitable P-MPR for an UL transmission even if the MPE issue is detected in a same slot as a slot in which the UE intends to transmit the UL signal or channel. In another example, the UE can be provided a processing time, so that the UE needs to satisfy MPE requirements, such as application of suitable P-MPR, when the MPE issue/event is detected at least a number of N symbols or M slots before the UL transmission. For example, the UE shall apply a suitable P-MPR for an UL transmission for any MPE issues/event that are detected no later than N=2 symbols or M=1 slot before an UL transmission. In one example, a value of M or N can depend on the numerology of the BWP in which the UE transmits the UL signal or channel. In another example, a value of M or N can depend on a numerology of an active DL/UL BWP of a scheduling cell in which a PUSCH or PUCCH is scheduled or triggered. In one example, such timeline threshold can be expressed in term of a PUSCH processing time $T_{proc,2}$ or a fraction thereof, such as ½ or ¼ thereof, or a modified version thereof, for example, with certain parameters set to zero. In another example, the values M or N can be based on a UE capability.

When a transmission occasion for a first repetition of a first UL signal/channel on a first UL carrier or cell overlaps with a transmission occasion for a second repetition of a second UL signal/channel on a second UL carrier or cell, and the UE needs to drop the first repetition of the first UL signal/channel due to MPE issues, the UE can use a (−n unused) transmission power determined for the omitted first repetition for transmission of the second repetition of the second UL signal/channel. The first UL carrier or cell can be same as or different from the second UL carrier or cell.

In one example, if a UE needs to drop multiple consecutive UL repetitions due to persistent MPE issues, for example, drop more than [N] consecutive repetitions, the UE can report a 'persistent MPE issue' to the gNB or to the higher layers. In such case, for a UE before RRC connection, the UE may/can stop the RA procedure and report a RA issue or persistent MPE issue to higher layers. For a UE in RRC connected state, the UE can indicate such 'persistent MPE issue' to the gNB, for example, using a scheduling request (SR) or a new UCI on a PUCCH, or using a UL MAC CE or a new UCI multiplexed on a PUSCH, or using a PRACH transmission.

The following embodiments of the present disclosure, denoted as E-5, describe resources for uplink repetition in presence of MPE.

In certain embodiments, a UE (such as the UE 116) can be configured with transmission occasions, including a number of repetitions, for an UL signal/channel that are CE-level-specific or CE-mode-specific, wherein the UE determines a CE level, or a CE mode based on an MPE state/level/range corresponding to the UL signal/channel. For example, the UE is configured with a first number of repetitions and a corresponding first set of transmission occasions for transmission of the UL signal/channel with a first CE level/mode or a first MPE state/level/range, and the UE is configured with a second number of repetitions and a corresponding second set of transmission occasions for transmission of the UL signal/channel with a second CE level/mode or a second MPE state/level/range. Such CE-/

MPE-specific configuration applies at least to PRACH transmission, configured grant PUSCH, and periodic or semi-persistent PUCCH or SRS.

A CE-/MPE-specific configuration can be beneficial for system operation, so that the gNB can allocate sufficient time-frequency resources for each CE level/mode or each MPE state/level/range, without a need for overbooking resources. In addition, upon using time-frequency resources corresponding to a certain resource group, the gNB can determine the corresponding CE level/mode or MPE state/level/range for the UE without need for explicit MPE reporting by the UE.

In one example, the UE can be configured a first RACH occasion (RO) configuration for a first CE level/mode or a first MPE state/level/range and configured a second RO configuration for a second CE level/mode or a second MPE state/level/range. The first RO configuration can correspond to a first number of repetitions, and the second RO configuration can correspond to a second number of repetitions. When the UE determines that a pathloss value for the PRACH transmission is associated with a first CE level/ mode or when the UE determines that a modified RSRP or an MPE state/level for the PRACH transmission corresponds to a first MPE state/range, the UE transmits a PRACH in RO(s) from the first RO configuration. When the UE determines that a pathloss value for the PRACH transmission is associated with a second CE level/mode or when the UE determines that a modified RSRP or an MPE state/level for the PRACH transmission corresponds to a second MPE state/range, the UE transmits a PRACH in RO(s) from the second RO configuration.

A UE can transmit a PRACH with a number of repetitions in consecutive ROs that are associated with a same SSB. Herein, consecutive ROs refer to ROs that are adjacent in time and frequency domain. For example, the UE transmits PRACH repetition in FDMed ROs in a first RACH slot and, if necessary, transmits remaining RACH repetitions in FMDed ROs in a second RACH slot that is adjacent to the first RACH slot, and so on, such that all ROs are associated with the same SSB. The UE can transmit the PRACH repetitions in legacy ROs or in new ROs configured for PRACH repetition. For example, new ROs can include extensions of legacy ROs in time or frequency domain. The UE transmits a same PRACH preamble in all ROs corresponding to PRACH repetition. In another example, the UE can transmit different PRACH preambles in different ROs corresponding to PRACH repetition. For example, the UE transmits a first PRACH preamble in FDMed ROs in a first RACH slot and transmits a second PRACH preamble in FDMed ROs in a second RACH slot.

In one example, a UE (such as the UE 116) transmits a number of PRACH repetitions with a same Tx beam/spatial transmission filter. In another example, the UE can transmit a number of PRACH repetitions with different Tx beams/ spatial transmission filters, so long as the Tx beams correspond to a same SSB or CSI-RS. Changing a Tx beam/panel across PRACH repetitions can be beneficial, for example, when a previous Tx beam/panel used for a previous PRACH repetition starts to experience MPE issues, and the UE needs to switch to a different Tx beam/panel for a next PRACH repetition.

In one example, when a UE (such as the UE 116) is configured/indicated for PRACH with a number of repetitions via system information or common/dedicated RRC configuration or L1/L2 signaling such as PDCCH order, when the UE detects an MPE issue/event for a repetition from the number of repetitions: (i) the UE can transmit the PRACH with a sufficiently low transmission power that meets the MPE requirements; or (ii) the UE can select a new/different Tx beam or a new/different SSB (or CSI-RS) for the repetition, such that the new Tx beam or SSB (or CSI-RS) has no MPE issues; or (iii) the UE can drop the repetition; or (iv) the UE can drop the repetition, and stop the RA procedure, and report an MPE issue to higher layers.

In one example, the UE can select some of the above options, such as new beam/RS selection or stopping the RA procedure, only if the UE has experienced MPE issues/ events for at least N PRACH repetitions, wherein N is provided by higher layer configuration such as by system information.

In one example, the UE needs to transmit all PRACH repetitions associated with a same SSB or CSI-RS. Therefore, if the UE detects MPE issues before starting PRACH repetitions, the UE can select a new/different SSB or CSI-RS and apply it for all the PRACH repetitions. If the UE determines an MPE issue during the PRACH repetitions, the UE cannot change a selected SSB, so the UE needs to transmit all PRACH repetitions without MPE issues in ROs that are associated with the selected SSB or to drop any PRACH repetitions with MPE issues. In one example, the UE can transmit a first PRACH with a first number of repetitions associated with a first SSB or CSI-RS and transmit a second PRACH with a second number of repetitions associated with a second SSB or CSI-RS.

In one example, the UE can perform one or more of the above behaviors for other UL transmissions during a RA procedure, such as a Msg3/A PUSCH or a PUCCH that includes HARQ-ACK feedback information for a Msg2/B PDSCH.

In one example, for an RA procedure, such as for a PDCCH order PRACH or for a CF-RA: (i) if the UE is configured/indicated an SSB or a CSI-RS for RO selection or for selection of PRACH spatial transmission filter, and (ii) if the UE is also configured/indicated to transmit PRACH with a number of repetitions, and (iii) if the UE determines that the configured/indicated SSB has MPE issues for a PRACH repetition from the configured/indicated number of repetitions, then one of the following options occurs. In one option, the UE can transmit the PRACH with a sufficiently low transmission power that meets the MPE requirements, or in another option, the UE can drop the PRACH repetition. In one example, the UE is not expected to select a new/ different SSB for association with the PRACH repetition. In another example, when the UE is configured/indicated multiple SSBs or multiple CSI-RSs for RO selection or for selection of PRACH spatial transmission filter, and the UE determines an MPE issue for a PRACH repetition associated with a first SSB or CSI-RS from the multiple SSBs or multiple CSI-RSs, the UE can transmit the PRACH repetition associated with a second SSB or CSI-RS from the multiple SSBs or multiple CSI-RSs.

In one example, for an RA procedure such as for a PDCCH order PRACH or for a CF-RA, wherein a UE is configured/indicated a number of repetition for a PRACH transmission by a serving gNB, in one option, the UE transmits the PRACH with the configured/indicated number of repetitions, without counting a number of dropped/ missed/omitted PRACH repetitions that the UE cannot/does not transmit due to MPE issues. In another option, the UE can consider the configured/indicated number of repetitions as a baseline/reference value for a reference MPE state/ level/range or for a reference value of a modified RSRP, so the UE can transmit the PRACH with an increased (or reduced) number of repetitions when the UE determines an MPE state/level/range or a modified RSRP value/range that is different from the corresponding reference value(s). For example, the UE can be provided with a predetermined or configured mapping or rule to determine an offset value or a scaling factor to be applied to the configured/indicated number of repetitions, based on a difference of the determined MPE level or modified RSRP level with the corresponding reference value(s).

In one example, when a UE transmits a PRACH with more (or less) number of repetitions compared to a configured/indicated number of repetitions due to MPE issues, the UE reports the selected number of PRACH repetitions to the gNB. For example, the UE can multiplex the information about the selected number of repetition as an UL MAC CE or a UCI on Msg1/A PRACH or Msg3/A PUSCH or can implicitly indicate by selecting a PRACH preamble or an RO from a group of PRACH preambles or a group of ROs, respectively. Such grouping of preambles or ROs can be provided by higher layer configuration such as by system information.

Various methods and examples above for MPE mitigation can also apply to an UL transmission after RRC connection, such as a PUSCH/PUCCH/SRS with repetition. In one example, the UE can drop some repetitions of a PUSCH/ PUCCH/SRS with MPE issues and transmit the PUSCH/ PUCCH/SRS with a number of repetitions less than a configured/indicated number of repetitions. In another example, the UE is not expected to transmit a PUSCH/ PUCCH/SRS with a number of repetitions that is larger than a number of repetitions. In one example, the UE can report MPE issues to the gNB and request for configuration/ indication of additional repetitions. In one example, a gNB response to a UE request for additional repetitions for a PUSCH/PUCCH/SRS can be by a compact indication of additional resources, wherein a compact indication can include an allocation in which some parameters for the additional repetitions are indicted by the gNB, while other parameters are same as the original repetitions, without any new indication. For example, the UE is indicated new values for TDRA or frequency domain resource allocation (FDRA) for the new repetitions, but the UE can transmit the new repetitions with a same MCS or a same MIMO characteristics such as same TCI state or TPMI, as the original repetitions.

The following embodiments of the present disclosure, denoted as E-6, describe beam/RS/precoder selection for repetitions in presence of MPE. This is described in the following examples and embodiments, such as those of FIG. 8.

FIG. 8 illustrates an example method 800 for changing a beam/RS/precoder for a group of repetitions or dropping a group of repetitions that experience MPE issues according to embodiments of the present disclosure.

The steps of the method 800 of FIG. 8 can be performed by any of the UEs 111-119 of FIG. 1, such as the UE 116 of FIG. 3. The method 800 is for illustration only and other embodiments can be used without departing from the scope of the present disclosure.

In certain embodiments, a UE (such as the UE 116) can be configured/indicated to transmit an UL repetition with beam/RS/precoder sweeping, wherein the UE can transmit a first group of repetitions associated with a first beam/RS/ precoder and transmit a second group of repetitions associated with a second beam/RS/precoder. Such beam/RS/precoder sweeping can be originally for MPE mitigation reasons or can be due to other reasons (for example, MIMO transmission schemes, such as spatial diversity or spatial multiplexing schemes, with or without multi-TRP/beam/panel operation) but impacted by MPE issues/event. The UE should transmit the UL repetitions associated with beams/RSs/precoders that do not cause MPE issues.

When a UE is configured/indicated to transmit an UL repetition with beam/RS/precoder sweeping, and the UE determines an MPE issue/event for a repetition from the number of repetition associated with a first beam/RS/precoder from the set of set of beams/RSs/precoders, in one option, the UE can skip/drop the repetition. In another option, the UE can transmit the UL repetition associated with the first beam/RS/precoder, but with a suitably low transmission power that satisfies the MPE/P-MPR requirements. In yet another option, the UE can transmit the repetitions associated with a second beam/RS/precoder from the set of set of beams/RSs/precoders that has no MPE issues. The second beam/RS/precoder can be a reference/default beam/RS/precoder or can be a beam/RS/precoder with an index that is closest to an index for the first beam/RS/precoder. In one example, the UE reports the MPE issue and the selection of an alternative (namely the second) beam/RS/precoder to the gNB. In one example, if the UE determines a dropping of an UL repetition or a selection of an alternative beam/RS/precoder for an UL repetition, the UE applies such behavior for all repetitions within the corresponding repetition group.

The method 800, as illustrated in FIG. 8, describes an example procedure for changing a beam/RS/precoder for a group of repetitions or dropping a group of repetitions that experience MPE issues.

In step 810, a UE (such as the UE 116) is configured/indicated multiple beams/RSs/precoders for an UL signal/channel. In step 820, the UE is configured a first repetition group associated with a first beam/RS/precoder. In step 830, the UE determines an MPE issue for a repetition from the first repetition group associated with the first beam/RS/precoder. In step 840, the UE determines whether there is a second beam/RS/precoder from the multiple beams/RSs/precoders that has no MPE issues. In response to the UE determining that a second beam/RS/precoder, the UE in step 850 transmits the (repetition from the) first repetition group associated with the second beam/RS/precoder. In response to the UE determining that no such second beam/RS/precoder, the UE in step 860 drops the (repetition from the) first repetition group.

A beam/RS/precoder sweeping for an UL repetition refers to a change in association of UL repetitions with a beam/RS/precoder, so that the UE can determine a spatial transmission filter or a transmission occasion or an applied MIMO transmission scheme or characteristics thereof for transmission of an UL repetition based on the corresponding beam/RS/precoder for the repetition. For example, the UE determines a first spatial transmission filter or a first precoder or a first transmission occasion based on a first beam/RS/precoder and determines a second spatial transmission filter or a second precoder or a second transmission occasion based on a second beam/RS/precoder. In one example, different beams/RSs/precoders can correspond to transmission by multiple UE Tx beam/panels or reception by multiple TRPs at the gNB or multiple transmission/reception paths between the UE and the gNB due to multi-path properties of the communication channels, including line-of-sight (LOS) or non-line-of-sight (NLOS) aspects.

Before RRC connection, a UE can be configured by higher layer configuration such as by system information to transmit UL signals/channels with multiple groups of repetitions, wherein each group can be associated with a different SSB (or CSI-RS). Herein, UL channels refer to a Msg1/A PRACH, a Msg3/A PUSCH, a PUCCH that includes HARQ-ACK feedback information corresponding to a Msg4/B PDSCH, and so on. For example, the UE can transmit a first group of PRACH or Msg3 PUSCH repetitions associated with a first SSB and a second group of PRACH or Msg3 PUSCH repetitions associated with a second SSB.

After RRC connection, the UE can be configured/indicated to transmit UL signals/channels with multiple groups of repetitions, wherein each group can be associated with a different SSB or CSI-RS or SRS or other DL/UL reference signals. Herein, UL signals/channels refer to PUSCH, PUCCH, SRS, and so on. The information about repetition groups can be provided to the UE by higher layers such as by dedicated RRC configuration or indicated by L1/L2 signaling such as a MAC CE or a scheduling DCI format or a beam indication DCI format. For example, the UE can transmit a first group of PUSCH repetitions associated with a first CSI-RS and a second group of PUSCH repetitions associated with a second CSI-RS. In one example, an association can be among UL repetition groups with different spatial transmission filters/beam, DL/UL/joint TCI states, or QCL assumption. In another example, an association can be among UL repetition groups with different DL/UL precoders, such as different TPMIs.

Each group of repetitions can include one or more repetitions. Different repetition groups can include same or different number of repetitions. When all repetition groups have a same size, a mapping among the SSBs (or CSI-RSs) and the repetition groups can be expressed in terms of an (L, M, N)—tuple, wherein a parameter L can indicate a number of SSBs (or CSI-RSs) used for beam sweeping, a parameter M can indicate a total number of repetitions, and a parameter N can indicate a size of each repetition group.

The UE can be provided with a mapping among the beams/RSs/precoders and the repetition groups, such as a sequential, an alternating/cyclic mapping. For example, a sequential mapping with L=2 SSBs can refer to a mapping such as {SSB #1, SSB #1, SSB #2, SSB #2} so that the UE transmits a first N=2 repetitions associated with SSB #1 and a second N=2 repetitions associated with SSB #2; the UE can continue the repetitions with the same mapping, that is, a third N=2 repetitions associated with SSB #1 and a fourth N=2 repetitions associated with SSB #2, and so on.

An alternating/cyclic mapping with L=2 SSBs can refer to a mapping such as {SSB #1, SSB #2, SSB #1, SSB #2} so that the UE transmits a first and third repetitions associated with SSB #1 and transmits a second and fourth repetitions associated with SSB #2. The UE can continue the repetitions with the same mapping, that is, a $5^{th}$ and a $7^{th}$ repetition associated with SSB #1 and a $6^{th}$ and $8^{th}$ repetition associated with SSB #2, and so on.

Similar mapping can be considered for Tx/Rx beams, QCL assumptions, UL or joint TCI states, uplink precoders such as TPMIs, and so on.

Although FIG. 8 illustrates the method 800 various changes may be made to FIG. 8. For example, while the method 800 is shown as a series of steps, various steps could overlap, occur in parallel, occur in a different order, or occur multiple times. In another example, steps may be omitted or replaced by other steps. For example, steps of the method 800 can be executed in a different order.

The following embodiments of the present disclosure, denoted as E-7, describe beam/RS/precoder selection across different transmissions with repetitions in presence of MPE.

This is described in the following examples and embodiments, such as those of FIGS. 9 and 10.

Figure 10:
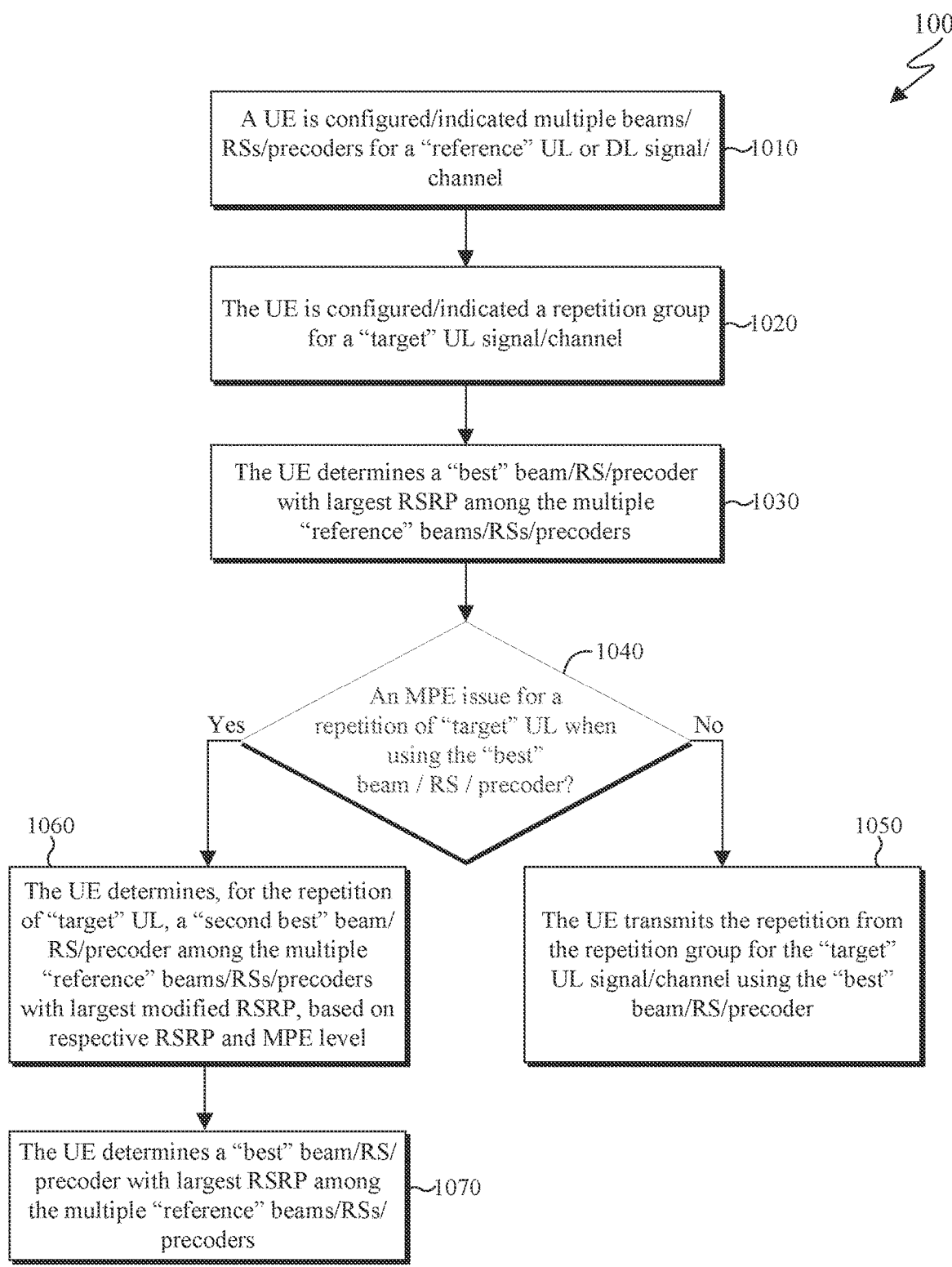
FIG. 10 illustrates an example method for selecting an alternative beam/reference signal/precoder (such as a "second best" beam/RS/precoder) for repetitions of a "target" UL signal/channel according to embodiments of the present disclosure.

FIG. 9 illustrates an example method 900 for dropping a repetition of a "target" UL signal/channel when a beam/reference signal/precoder for a "reference" signal/channel causes MPE issues for the "target" UL signal/channel according to embodiments of the present disclosure. FIG. 10 illustrates an example method 1000 for selecting an alternative beam/reference signal/precoder (such as a "second best" beam/RS/precoder) for repetitions of a "target" UL signal/channel according to embodiments of the present disclosure;

The steps of the method 900 of FIG. 9 and the method 1000 of FIG. 10 can be performed by any of the UEs 111-119 of FIG. 1, such as the UE 116 of FIG. 3. The methods 900 and 1000 are for illustration only and other embodiments can be used without departing from the scope of the present disclosure.

In certain embodiments, when a UE (such as the UE 116) is configured/indicated repetition with beam/RS/precoder sweeping for a "target" UL transmission that follows a spatial transmission filter of a "reference" UL/DL transmission which is also configured/indicated repetition with beam/RS/precoder sweeping, the UE considers MPE issues/events determined for the repetitions of the "reference" UL/DL transmissions or the repetitions of the "target" UL transmissions. Such behavior is beneficial, for example, when an MPE state/level/range changes over time in a time scale that is smaller than a time gap between the "reference" transmissions and the "target" transmissions.

In one example, a "reference" UL transmission can be a Msg1/A PRACH transmission, and a corresponding "target" UL transmission can be a Msg3/A PUSCH transmission. For example, the UE transmits a Msg3/A PUSCH with a same spatial transmission filter as a Msg1/A PRACH.

In one example, a "reference" transmission can be a PDCCH/CORESET with a lowest index in an active BWP, and a corresponding "target" UL transmission can be a PUSCH/PUCCH that is not configured a TCI state or a spatial relation. In such a case, the PDCCH/CORESET beam is referred to as a "default" beam, and the PUSCH/PUCCH is told to follow the default beam. For example, the UE transmits a PUSCH/PUCCH with a same spatial transmission filter as PDCCH/CORESET with the lowest index in the active BWP.

When the reference transmission is configured/indicated repetitions with beam/RS/precoder sweeping, and the target transmission is also configured/indicated repetitions with beam/RS/precoder sweeping, and none of the repetitions have MPE issues, for each group of the repetitions for the "target" UL transmission: (i) in a first option, the UE follows a beam/RS/precoder for the respective repetition group of the corresponding "reference" DL/UL transmission; or (ii) in a second option, the UE follows a "best" beam/RS/precoder among all repetition groups of the corresponding "reference" DL/UL transmission.

A "best" beam/RS/precoder in the second option can refer to, for example, a DL beam/RS/precoder for which the UE measures a highest channel/signal quality such as a largest RSRP or SINR or a smallest pathloss. In another example, a "best" beam/RS/precoder can refer to a DL beam/RS/precoder that is associated with an UL transmission filter with minimum/maximum MPE value or largest modified RSRP. In one example, a "best" beam/RS/precoder can refer to an UL beam/RS/precoder that is indicated by the gNB. In one example, a "best" beam refers to a Rx or Tx panel or beam that the UE uses for a DL reception or UL transmission.

When the reference transmission is configured/indicated repetitions with beam/RS/precoder sweeping, and the target transmission is also configured/indicated repetitions with beam/RS/precoder sweeping, and: (i) the UE operates with the first option above, namely, the UE follows, for each group of the repetitions for the "target" UL transmission, a beam/RS/precoder for the respective repetition group of the corresponding "reference" DL/UL transmission; and (ii) the UE determines an MPE issue/event for an UL transmission associated with a beam/RS/precoder corresponding to a repetition group from the configured/indicated repetition groups for the "reference" DL/UL transmission; then the UE can drop one or multiple or all repetitions from the respective repetition group of the "target" UL transmission that follow the beam/RS/precoder associated with the "reference" DL/UL transmission for which the UE has determined the MPE issue/event.

For example, the UE transmits a Msg1/A PRACH with two repetition groups corresponding to two SSBs, and accordingly the UE transmits Msg3/A PUSCH with two repetition groups corresponding to the same two groups, including a same order/mapping among the two SSB and the two repetition groups. Then, if the UE determines that a Msg3/A PUSCH transmission associated with a first SSB can lead to an MPE issue/event, the UE can drop a first repetition group corresponding to the first SSB, including at least some repetitions in the first repetition group that experience the MPE issue/event. In one example, the UE can drop all repetitions of the first repetition group if the UE determines an MPE issue/event for at least K repetitions from the first repetition group, wherein K can be a predetermined or configured threshold/value.

The method 900, as illustrated in FIG. 9 describes an example procedure for dropping a repetition of a "target" UL signal/channel when a beam/RS/precoder for a "reference" signal/channel causes MPE issues for the "target" UL signal/channel.

In step 910, a UE (such as the UE 116) is configured/indicated a beam/RS/precoder for a "reference" UL or DL signal/channel. In step 920, the UE is configured/indicated a repetition group for a "target" UL signal/channel. In step 930, the UE determines whether there is an MPE issue for a repetition from the repetition group for the "target" UL signal/channel associated with the beam/RS/precoder for the "reference" UL or DL signal/channel. In response to the UE determining that an MPE issue for a first repetition from the repetition group for the "target" UL signal/channel, the UE drops the first repetition (step 940). In response to the UE determining that there is no MPE issue for a second repetition from the repetition group for the "target" UL signal/channel, the UE transmits the second repetition associated with the beam/RS/precoder for the "reference" UL or DL signal/channel (step 950). In one example, when one repetition from the repetition group experiences an MPE issues, the UE drops all repetitions from the repetition group.

When the reference transmission is configured/indicated repetitions with beam/RS/precoder sweeping, and the target transmission is also configured/indicated repetitions with beam/RS/precoder sweeping, and: (i) the UE operates with the second option above, namely, the UE follows, for each group of the repetitions for the "target" UL transmission, a "best" beam/RS/precoder among all repetition groups of the corresponding "reference" DL/UL transmission; and (ii) the UE determines an MPE issue/event for an UL transmission associated with the "best" beam/RS/precoder corresponding to the "reference" DL/UL transmission; then the UE can transmit a "target" UL transmission with repetitions that follow a "second best" beam/RS/precoder among all repetition groups of the corresponding "reference" DL/UL transmission. Herein, a "second best" beam/RS/precoder can refer to a second DL or UL beam/RS/precoder, with a corresponding largest RSRP, among all configured/indicated beams/RSs/precoders except for the first beam/RS/precoder, and not associated with any MPE issues.

For example, the UE receives PDCCH/CORESET with the lowest index with two repetition groups associated two different beams/RSs, such as two SSBs or CSI-RSs. The UE measures the two SSBs or the two CSI-RSs and determines an SSB or CSI-RS with the largest RSRP to be a "best" SSB or CSI-RS, which is also a "default" beam for the active BWP. Accordingly, the UE transmits a PUSCH/PUCCH without a dedicated configuration/indication for a spatial transmission filter, with repetitions associated with the "default" beam, which is the "best" beam. If the UE determines that a PUSCH/PUCCH repetition associated with the "best" beam has MPE issues, the UE transmits the PUSCH/PUCCH repetition associated with a "second best" beam, such as an SSB or CSI-RS with a second largest RSRP and without MPE issues, or alternatively, with a second largest modified RSRP.

In one example, when a UE operates with an alternative beam, such as a second best beam, for repetitions of a target UL transmission, the alternative beam can correspond to an alternative UE Tx beam/panel without MPE issues that is associated with a same DL/UL RS as the best beam. In one example, the UE changes an association of the PUSCH/PUCCH only for one or more repetitions that have MPE issues. In another example, the UE changes an association of the PUSCH/PUCCH for all repetitions if at least K repetition(s) have MPE issues, wherein K can be a predetermined or configured threshold.

In one example, when the UE determines an MPE issue/event for at least 'K' beams/RSs/precoders associated with the DL/UL "reference" transmissions or for at least T repetitions from the configured/indicated number of repetitions, the UE discards the beams/RSs/precoders associated with the reference transmission, and operate with a beam/RS/precoder sweeping that is separately configured/indicated for the target UL transmission, namely, separate from the beams/RSs/precoders associated with the "reference" DL/UL transmission.

The method 1000 as illustrated in FIG. 10 describes an example procedure for selecting an alternative beam/RS/precoder (such as a "second best" beam/RS/precoder) for repetitions of a "target" UL signal/channel when a "best" beam/RS/precoder for a "reference" signal/channel causes MPE issues for the "target" UL signal/channel.

In step 1010, a UE (such as the UE 116) is configured/indicated multiple beams/RSs/precoders for a "reference" UL or DL signal/channel. In step 1020, the UE is configured/indicated a repetition group for a "target" UL signal/channel. In step 1030, the UE determines a "best" beam/RS/precoder with largest RSRP among the multiple "reference" beams/RSs/precoders.

In step 1040, the UE determines whether there is an MPE issue for a repetition from the repetition group for the "target" UL signal/channel when using the "best" beam/RS/precoder. In response to the UE determining that there is no MPE issue for the repetition of the "target" UL signal/channel when using the "best" beam/RS/precoder (as determined in step 1040), the UE in step 1050 transmits the repetition from the repetition group for the "target" UL signal/channel using the "best" beam/RS/precoder. In response to the UE determining that there is an MPE issue for the repetition of the "target" UL signal/channel when using the "best" beam/RS/precoder (as determined in step 1040), the UE in step 1060 determines, for the repetition of "target" UL, a "second best" beam/RS/precoder among the multiple "reference" beams/RSs/precoders with largest modified RSRP, based on respective RSRP and MPE level. Thereafter, in step 1070 the UE transmits the repetition from the repetition group for the "target" UL signal/channel using the "second best" beam/RS/precoder.

Although FIG. 9 illustrates the method 900 and the FIG. 10 illustrates the method 1000 various changes may be made to FIGS. 9 and 10. For example, while the method 900 and the method 1000 are shown as a series of steps, various steps could overlap, occur in parallel, occur in a different order, or occur multiple times. In another example, steps may be omitted or replaced by other steps. For example, steps of the method 900 and the method 1000 can be executed in a different order.

The following embodiments of the present disclosure, denoted as E-8, describe a transmission power for repetitions in presence of MPE. This is described in the following examples and embodiments, such as those of FIG. 11.

FIG. 11 illustrates an example method 1100 for transmitting a number of UL repetition with a same "reference" power level according to embodiments of the present disclosure.

The steps of the method 1100 of FIG. 11 can be performed by any of the UEs 111-119 of FIG. 1, such as the UE 116 of FIG. 3. The method 1100 is for illustration only and other embodiments can be used without departing from the scope of the present disclosure.

In certain embodiments, when a UE is configured/indicated a number of repetitions for an UL signal/channel, and the UE determines that one or more repetition(s) from the number of repetitions have MPE issues, the UE determines a transmission power for the repetitions by taking into account the MPE issue for the one or more repetition(s). Accordingly, the UE can determine a same or different transmission power across different repetitions.

In a first realization, the UE transmits all repetitions of the UL signal/channel with a same transmission power. Since an MPE state/level/range for the UL signal/channel can change across different repetitions, the UE needs to drop any repetitions with MPE issues that require a large power back off such as a large P-MPR to satisfy the MPE requirements, and therefore need to be transmitted with a transmission power that is smaller than other repetitions, including those without MPE issues. Therefore, the UE determines a transmission power for all repetitions before the repetitions start and maintains the same transmission power across all repetitions, except for some repetitions with (excessive) MPE issues that are dropped. In a first example, the UE determines the transmission power based on an MPE state/level/range for an earliest repetition from the number of repetitions. In a second example, the UE determines the transmission power based on an MPE state/level/range for an earliest repetition from the number of repetitions, offset by a predetermined or configured/indicated value that captures an estimated minimum/maximum/average MPE change across the number of repetitions. Therefore, the UE determines a smaller transmission power, compared to the first example, to account for potential changes to the MPE state/level/range across the repetitions, but with the aim to drop fewer repetitions, compared to the first example.

The method 1100, as illustrated in FIG. 11, describes an example procedure for transmitting a number of UL repetition with a same "reference" power level, and dropping any repetition(s) that cannot be transmitted with the same "reference" power level due to high MPE/P-MPR value(s).

In step 1110, a UE (such as the UE 116) is configured/indicated a number of repetitions for an UL signal/channel. In step 1120, the UE determines a "reference" transmission power for the number of repetitions, possibly applying an offset to consider MPE/P-MPR changes across the repetitions. In step 1130, the UE determines, for a repetition from the number of repetitions, a preferred transmission power based on an MPE/P-MPR value for the repetition. In step 1140, the UE determines whether the preferred transmission power for the repetition is smaller than the "reference" transmission power. In response to the UE determining that the preferred transmission power for the repetition is not smaller than the "reference" transmission power (as determined in step 1140), the UE in step 1150 transmits the repetition with the "reference" transmission power. Alternatively, in response to the UE determining that the preferred transmission power for the repetition is smaller than the "reference" transmission power (as determined in step 1140), the UE in step 1160 drops the repetition.

In a second realization, the UE can transmit different repetitions with different transmission powers. For example, the UE can transmit a first repetition without MPE issues with a first transmission power level based on a small/zero P-MPR power backoff, and transmit a second repetition with MPE issues with a second transmission power level based on a large P-MPR power backoff. Therefore, the UE transmits the second repetition with a smaller transmission power compared to the first repetition. It is noted that, the UE still maintains a same transmission power across all symbols of a/each transmission occasion. According to the second realization, the UE would need to drop few/no repetitions due to MPE issues or MPE changes over time, since the UE determines a transmission power for each repetition separately. In one example, the UE can be configured/indicated a threshold for a minimum allowed transmission power, so that any repetition below the threshold needs to be dropped. Therefore, the UE can transmit repetitions with different transmission power levels, so long as corresponding transmission power levels are determined to be above the threshold, but the UE needs to drop any repetition(s) with corresponding transmission power levels determined to be below the threshold. In one example, for the second realization, the gNB configures/indicates the UE to operate with enhanced DMRS schemes, such as additional DMRS per repetitions or across repetitions. In one example, when the UE operates per the second realization, the UE shall include DMRS for all repetitions, and the gNB is not expected to perform joint channel estimation across different repetitions or corresponding slots.

In one example, when the UE is configured/indicates to transmit an UL signal or channel with a number of repetition, and the repetitions correspond to two or multiple different TRPs, for example, corresponding to two or multiple DL/UL/joint TCI states or two or multiple pathloss references, in a modification of the first realization, the UE can maintain a same transmission power level across all repetitions that correspond to a same TRP. For example, the UE can transmit a first subset of repetitions associated with a first DL/UL/joint TCI states or a first pathloss reference using a first transmission power and transmit a second subset of repetitions associated with a second DL/UL/joint TCI states or a second pathloss reference using a second transmission power, wherein the first and second transmission power levels can be different. This applies, for example, to the case of beam/RS/precoder sweeping considered in Embodiments E-6 and E-7, wherein the UE can transmit all repetitions within each repetition group using a same transmission power, but the UE can transmit different repetition groups using different transmission power levels.

In one example, a same or different power level in this embodiment, such as in the first and second realization and examples thereof, can refer to a received power. For example, in a modification of the first realization, the UE can transmit the repetitions with same or different transmission power levels, so long as the UE determines/estimates that all repetitions are received at the gNB with a same transmission power level.

Although FIG. 11 illustrates the method 1100 various changes may be made to FIG. 11. For example, while the method 1100 is shown as a series of steps, various steps could overlap, occur in parallel, occur in a different order, or occur multiple times. In another example, steps may be omitted or replaced by other steps. For example, steps of the method 1100 can be executed in a different order.

The following embodiments of the present disclosure, denoted as E-9, describe a handling of overlapping transmissions with or without repetitions in presence of MPE. This is described in the following examples and embodiments, such as those of FIG. 12.

FIG. 12 illustrates an example method 1200 for assigning priority levels among overlapping UL transmissions in the presence of MPE issues according to embodiments of the present disclosure.

The steps of the method 1200 of FIG. 12 can be performed by any of the UEs 111-119 of FIG. 1, such as the UE 116 of FIG. 3. The method 1200 is for illustration only and other embodiments can be used without departing from the scope of the present disclosure.

In certain embodiments, when a UE (such as the UE 116) is configured/indicated to transmit multiple UL signals/channels in overlapping symbols of a slot (or overlapping symbols across different slots), and the UE is provided with or determines priority levels for the multiple overlapping UL transmissions, the UE considers any MPE issues/events corresponding to any of UL transmissions, in addition to the priority levels, when prioritizing among the multiple the multiple overlapping and potentially dropping some of them, if necessary. When one or more of the multiple overlapping UL transmissions are also configured/indicated respective number of repetitions, the UE can apply such prioritization/dropping due to MPE reasons separately for each repetition or jointly across all repetitions.

In one realization, when a first PUSCH/PUCCH transmission with a higher priority level overlaps with a second PUSCH/PUCCH with a lower priority level, but the UE determines that the first PUSCH/PUCCH has MPE issues, the UE can prioritize the second PUSCH/PUCCH over the first PUSCH/PUCCH and can drop the first PUSCH/PUCCH, if necessary (such as when the UE can only transmit one overlapping UL transmission).

The method 1200, as illustrated in FIG. 12, describes an example procedure for assigning priority levels among overlapping UL transmissions in the presence of MPE issues.

In step 1210, a UE (such as the UE 116) is configured/indicated a higher priority level for a first UL transmission and a lower priority level for a second UL transmission. In step 1220, the UE determines that the first and second UL transmissions overlap in at least one symbol. In step 1230, the UE determines whether there is an MPE issue for the first UL transmission. In response to the UE determining that there is no MPE issue for the first UL transmission, the UE in step 1240 prioritizes/transmits the first UL (and possibly drops the second UL subject to UE capability for a maximum number of overlapping UL transmissions). In response to the UE determining that there is an MPE issue for the first UL transmission, the UE in step 1250 prioritizes/transmits the second UL (and possibly drops the first UL subject to UE capability for a maximum number of overlapping UL transmissions).

In one example, when a first PUSCH/PUCCH transmission with a higher priority overlaps with a second PUSCH/PUCCH with a lower priority, and (i) the UE is configured/indicated a first number of repetitions for the first PUSCH/PUCCH and a second number of repetitions for the second PUSCH/PUCCH, and (ii) the UE determines an MPE issue/event for one or more repetitions from the first number of repetitions of the first PUSCH/PUCCH, and (iii) at least a repetition from the one or more repetitions with MPE issues of the first PUSCH/PUCCH overlap with a repetition of the second PUSCH/PUCCH, then the UE can prioritize the repetition of the second PUSCH/PUCCH over the overlapping repetition with MPE issues of the first PUSCH/PUCCH and can drop the repetition with MPE issues of the first PUSCH/PUCCH, if necessary (such as when the UE can only transmit one overlapping UL transmission per UE capability).

In one example, the UE determines a prioritization/dropping for each repetition separately. For example, when the UE prioritize a repetition of the second PUSCH/PUCCH compared to an overlapping repetition with MPE issues of the first PUSCH/PUCCH, and possibly drops the repetition with MPE issues of the first PUSCH/PUCCH, the UE can still prioritize a different repetition without MPE issues of the first PUSCH/PUCCH that overlaps with a different repetition of the second PUSCH/PUCCH, and possibly drop the corresponding repetition of the second PUSCH/PUCCH.

In one example, the UE determines a prioritization/dropping jointly across all repetitions. For example, when the UE prioritize a repetition of the second PUSCH/PUCCH compared to an overlapping repetition with MPE issues of the first PUSCH/PUCCH, the UE applies such prioritization to all repetitions of the second PUSCH/PUCCH that overlap with repetitions of the first PUSCH/PUCCH (with or without MPE issues), and the UE possibly drops all overlapping repetitions with or without MPE issues of the first PUSCH/PUCCH, if necessary (such as when the UE can only transmit one overlapping UL transmission per UE capability).

The above example continues to apply even for the case that the second PUSCH/PUCCH is not configured/indicated a second number of repetitions, that is, only one repetition. In one example, multiple repetitions of a PUSCH/PUCCH can overlap with multiple different PUSCHs/PUCCHs with higher or lower priority levels, so the UE can determine a prioritization/dropping separately compared to the multiple different PUSCHs/PUCCHs, when additionally considering the MPE impact.

The UE can still maintain a same determination for prioritization/dropping of any/all repetitions of the PUSCH/PUCCH overlapping with a certain PUSCH/PUCCH from the multiple PUSCHs/PUCCHs, while the UE can determine different prioritization/dropping for the PUSCH/PUCCH compared to different PUSCHs/PUCCHs from the multiple PUSCHs/PUCCHs. For example, the UE can drop a first subset of repetitions of the PUSCH/PUCCH with MPE issues (for at least one repetition from the first subset of repetitions) that overlap with a first PUSCH/PUCCH with lower priority level but can prioritize a second subset of repetitions of the PUSCH/PUCCH without MPE issues that overlap with a second PUSCH/PUCCH with lower priority.

In one example, the UE determines a prioritization/dropping separately for each repetition of the PUSCH/PUCCH.

Although FIG. 12 illustrates the method 1200 various changes may be made to FIG. 12. For example, while the method 1200 is shown as a series of steps, various steps could overlap, occur in parallel, occur in a different order, or occur multiple times. In another example, steps may be omitted or replaced by other steps. For example, steps of the method 1200 can be executed in a different order.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for transmitting a first channel, the method comprising:
   identifying first information for a set of ranges of exposure values;
   receiving second information for:
       a first downlink reference signal (DL RS),
       a set of ranges of reference signal received power (RSRP) values for the first DL RS,
       a set of numbers of repetitions, and
       a mapping among:
           the set of ranges of RSRP values,
           the set of ranges of exposure values, and
           the set of numbers of repetitions;
   determining:
       a first RSRP value for the first DL RS,
       a first spatial filter corresponding to the first DL RS,
       a first exposure value for the first spatial filter, and
       a first number of repetitions from the set of numbers of repetitions based on the first RSRP value, the first exposure value, and the mapping; and
   transmitting the first channel with the first number of repetitions using the first spatial filter.

2. The method of claim 1, wherein the first exposure value corresponds to at least one of:

a power management maximum power reduction (P-MPR), and an actual or virtual power headroom (PH).

3. The method of claim 1, further comprising:
determining:
a first range of RSRP values, from the set of ranges of RSRP values, that includes the first RSRP value, and
a first range of exposure values, from the set of ranges of exposure values, that includes the first exposure value, wherein the first number of repetitions is mapped to the first range of RSRP values and the first range of exposure values.

4. The method of claim 1, further comprising:
determining:
an offset value or a scaling factor based on the first exposure value,
a second RSRP value as a sum of the first RSRP value and the offset value or as a product of the first RSRP value and the scaling factor, and
a first range of RSRP values, from the set of ranges of RSRP values, that includes the second RSRP value, wherein the first number of repetitions is mapped to the first range of RSRP values.

5. The method of claim 1, further comprising:
determining a second number of repetitions to be one of:
the first number of repetitions,
a sum of the first number of repetitions and an offset value, or
a product of the first number of repetitions and a scaling factor; and
transmitting a second channel with the second number of repetitions,
wherein:
the first channel is a physical random access channel (PRACH),
the second channel is a physical uplink shared channel (PUSCH) or a physical uplink control channel (PUCCH) and is transmitted after the first channel, and
the offset value or the scaling factor is provided by an indication in a random access response (RAR) or a downlink control information (DCI) format that schedules transmission of the second channel.

6. The method of claim 1, further comprising:
receiving third information for:
a number of sets of time-frequency resources, and
a mapping among:
the set of ranges of RSRP values,
the set of ranges of exposure values, and
the number of sets of time-frequency resources; and
determining:
a first range of RSRP values, from the set of ranges of RSRP values, that includes the first RSRP value,
a first range of exposure values, from the set of ranges of exposure values, that includes the first exposure value, and
a first set of time-frequency resources, from the number of sets of time-frequency resources, that is mapped to the first range of RSRP values and the first range of exposure values,
wherein transmitting the first channel with the first number of repetitions comprises transmitting the first channel with the first number of repetitions in resources from the first set of time-frequency resources.

7. The method of claim 1, further comprising:
determining:
a second spatial filter corresponding to the first DL RS,
a second exposure value for the second spatial filter, and
a second number of repetitions, from the set of numbers of repetitions, based on the first RSRP value and the second exposure value; and
transmitting the first channel with the second number of repetitions using the second spatial filter.

8. The method of claim 1, further comprising:
receiving third information for a second DL RS;
determining:
a second RSRP value for the second DL RS,
a second spatial filter corresponding to the second DL RS,
a second exposure value for the second spatial filter, and
a second number of repetitions, from the set of numbers of repetitions, based on the second RSRP value and the second exposure value; and
transmitting the first channel with the second number of repetitions using the second spatial filter.

9. A user equipment (UE) comprising:
a processor configured to identify first information for a set of ranges of exposure values; and
a transceiver operably coupled to the processor, the transceiver configured to receive first information for:
a first downlink reference signal (DL RS),
a set of ranges of reference signal received power (RSRP) values for the first DL RS,
a set of numbers of repetitions for transmission of a first channel, and
a mapping among:
the set of ranges of RSRP values,
the set of ranges of exposure values, and
the set of numbers of repetitions;
wherein the processor is further configured to determine:
a first RSRP value for the first DL RS,
a first spatial filter corresponding to the first DL RS,
a first exposure value for the first spatial filter, and
a first number of repetitions from the set of numbers of repetitions based on the first RSRP value, the first exposure value, and the mapping, and
wherein the transceiver is further configured to transmit the first channel with the first number of repetitions using the first spatial filter.

10. The UE of claim 9, wherein the first exposure value corresponds to at least one of:
a power management maximum power reduction (P-MPR), and
an actual or virtual power headroom (PH).

11. The UE of claim 9, wherein:
the processor is further configured to determine:
a first range of RSRP values, from the set of ranges of RSRP values, that includes the first RSRP value, and
a first range of exposure values, from the set of ranges of exposure values, that includes the first exposure value, wherein the first number of repetitions is mapped to the first range of RSRP values and the first range of exposure values.

12. The UE of claim 9, wherein:
the processor is further configured to determine:
an offset value or a scaling factor based on the first exposure value, a second RSRP value as a sum of the first RSRP value and the offset value or as a product of the first RSRP value and the scaling factor, and a first range of RSRP values, from the set of ranges of RSRP values, that includes the second RSRP value, wherein the first number of repetitions is mapped to the first range of RSRP values.

13. The UE of claim 9, wherein:

the processor is further configured to determine a second number of repetitions to be one of:

the first number of repetitions, a sum of the first number of repetitions and an offset value, or a product of the first number of repetitions and a scaling factor, the transceiver is further configured to transmit a second channel with the second number of repetitions, the first channel is a physical random access channel (PRACH), the second channel is a physical uplink shared channel (PUSCH) or a physical uplink control channel (PUCCH) and is transmitted after the first channel, and the offset value or the scaling factor is provided by an indication in a random access response (RAR) or a downlink control information (DCI) format that schedules transmission of the second channel.

14. The UE of claim 9, wherein:

the transceiver is further configured to receive third information for:

a number of sets of time-frequency resources, and a mapping among:

the set of ranges of RSRP values, the set of ranges of exposure values, and the number of sets of time-frequency resources;

the processor is further configured to determine:

a first range of RSRP values, from the set of ranges of RSRP values, that includes the first RSRP value, a first range of exposure values, from the set of ranges of exposure values, that includes the first exposure value, and a first set of time-frequency resources, from the number of sets of time-frequency resources, that is mapped to the first range of RSRP values and the first range of exposure values; and the transceiver is further configured to transmit the first channel with the first number of repetitions in resources from the first set of time-frequency resources.

15. The UE of claim 9, wherein:

the processor is further configured to determine:

a second spatial filter corresponding to the first DL RS, a second exposure value for the second spatial filter, and a second number of repetitions, from the set of numbers of repetitions, based on the first RSRP value and the second exposure value; and the transceiver is further configured to transmit the first channel with the second number of repetitions using the second spatial filter.

16. The UE of claim 9, wherein:

the transceiver is further configured to receive third information for a second DL RS, the processor is further configured to determine:

a second RSRP value for the second DL RS, a second spatial filter corresponding to the second DL RS, a second exposure value for the second spatial filter, and a second number of repetitions, from the set of numbers of repetitions, based on the second RSRP value and the second exposure value; and the transceiver is further configured to transmit the first channel with the second number of repetitions using the second spatial filter.

17. A base station comprising:

a processor configured to identify first information for a set of ranges of exposure values, and a transceiver operably coupled to the processor, the transceiver configured to:

transmit second information for:

a first downlink reference signal (DL RS), a set of ranges of reference signal received power (RSRP) values for the first DL RS, a set of numbers of repetitions for reception of a first channel, and a first mapping among:

the set of ranges of RSRP values, the set of ranges of exposure values, and the set of numbers of repetitions; and receive the first channel with a first number of repetitions from the set of numbers of repetitions.

18. The base station of claim 17, wherein an exposure value, from the set of ranges of exposure values, corresponds to at least one of:

a power management maximum power reduction (P-MPR), and an actual or virtual power headroom (PH).

19. The base station of claim 17, wherein the transceiver is further configured to:

transmit third information for:

a number of sets of time-frequency resources, and a second mapping among:

the set of ranges of RSRP values, the set of ranges of exposure values, and the number of sets of time-frequency resources; and receive the first channel in resources from a first set of time-frequency resources, wherein the first set of time-frequency resources is from the number of sets of time-frequency resources.

20. The base station of claim 17, wherein the transceiver is further configured to:

transmit an indication of an offset value or a scaling factor; and receive a second channel with a second number of repetitions, wherein:

the first channel is a physical random access channel (PRACH), the second channel is a physical uplink shared channel (PUSCH) or a physical uplink control channel (PUCCH) and is received after the first channel, and the indication is provided in a random access response (RAR) or a downlink control information (DCI) format that schedules reception of the second channel, and the second number of repetitions is one of:

the first number of repetitions, a sum of the first number of repetitions and the offset value, or a product of the first number of repetitions and the scaling factor.

* * * * *